United States Patent [19]
Nagle et al.

[11] Patent Number: 6,051,096
[45] Date of Patent: Apr. 18, 2000

[54] CARBONIZED WOOD AND MATERIALS FORMED THEREFROM

[76] Inventors: Dennis C. Nagle, 10237 Breconshire Rd., Ellicott City, Md. 21042; Christopher E. Byrne, 1335 8 Wellhaven Cir., Owings Mills, Md. 21117

[21] Appl. No.: 08/678,084

[22] Filed: Jul. 11, 1996

[51] Int. Cl.⁷ .................................................. C09J 5/00
[52] U.S. Cl. ............................................................ 156/311
[58] Field of Search .................................. 428/17, 537.1; 156/311

[56] References Cited

U.S. PATENT DOCUMENTS

| | | | |
|---|---|---|---|
| 568,323 | 9/1896 | Acheson | 423/448 |
| 1,237,521 | 8/1917 | Jennison | 427/315 |
| 1,483,733 | 2/1924 | Kozelek | 427/227 |
| 3,053,775 | 9/1962 | Abbott | 502/420 |
| 3,107,152 | 10/1963 | Ford et al. | 423/447.2 |
| 3,235,353 | 2/1966 | Rupli | 65/262 |
| 3,294,489 | 12/1966 | Millington et al. | 423/447.4 |
| 3,313,596 | 4/1967 | Hogg, Jr. et al. | 423/447.8 |
| 3,508,871 | 4/1970 | Cory | 423/447.8 |
| 3,508,872 | 4/1970 | Stuetz et al. | 423/447.9 |
| 3,927,157 | 12/1975 | Vasterling | 264/29.1 X |
| 4,170,668 | 10/1979 | Lee et al. | 427/223 |
| 4,252,863 | 2/1981 | Song | 144/361 X |
| 4,455,183 | 6/1984 | Suchomel | 144/358 X |
| 4,472,245 | 9/1984 | Halm | 428/537.1 |
| 4,678,715 | 7/1987 | Giebeler et al. | 428/537.1 |
| 5,143,748 | 9/1992 | Ishikawa et al. | 427/569 |
| 5,208,099 | 5/1993 | Maiwald-Hiller et al. | 428/306.6 |
| 5,279,879 | 1/1994 | Takezawa et al. | 428/110 |
| 5,685,986 | 11/1997 | Yamada et al. | 428/537.1 X |

OTHER PUBLICATIONS

Page 192 and the Title Page and Verso of the Title Page of Merriam–Webster Collegiate Dictionary—Tenth Edition.

De Boer, J. H., "The Influence Of Van Der Waals' Forces And Primary Bonds On Binding Energy, Strength and Orientation, With Special Reference To Some Artificial Resins," *Trans. Faraday Soc.*, vol. 32, pp. 10–38 (1936).

Brooks, J. D. et al., "The Formation Of Some Graphitizing Carbons," *Chemistry and Physics of Carbon*, vol. 4, pp. 243–286 (1968).

Bacon, R., "An Introduction to Carbon/Graphite Fibers," *Applied Polymer Symposia*, No. 9, pp. 213–214 (1969).

Shindo, A. et al., "Carbon Fibers form Cellulose Fibers," *Applied Polymer Symposia*, No. 9, pp. 271–84 (1969).

Bacon, R. et al., Physical Properties of High Modulus Graphite Fibers Made from a Rayon Precursor, Applied Polymer Symposia, No. 9, pp. 285–92 (1969).

Fitzer, E. et al., The Chemistry Of The Pyrolytic Conversion Of Organica Compounds To Carbon, *Chemistry and Physics of Carbon*, vol. 7, pp. 237–383 (1971).

Bacon, R., "Carbon Fibers From Rayon Precursors," *Chemistry and Physics of Carbon*, vol. 9, pp. 1–102 (1975).

Marsh, H. et al., "The Formation Of Graphitizable Carbons Via Mesophase: Chemical and Kinetic Considerations," *Chemistry and Physics of Carbon*, vol. 15, pp. 230–286 (1979).

Jain et al., "Processing of Bamboo Fiber Reinforced Plastic Composites," *Materials and Manufacturing Processes*, vol. 9, No. 5, pp. 813–828 (1994).

*Primary Examiner*—Archene Turner
*Attorney, Agent, or Firm*—Alan G. Towner; Eckert Seamans Cherin & Mellott, LLC

[57] ABSTRACT

A method of carbonizing cellulose-containing plants is disclosed. Wood is used as a precursor material which is carbonized under controlled temperature and atmosphere conditions to produce a porous carbon product having substantially the same cellular structure as the precursor wood. The porous carbonized wood may be used for various applications such as filters, or may be further processed to form carbon-polymer or carbon—carbon composites. The carbonized wood may also be converted to a ceramic such as silicon carbide. Additional processing may be used to form ceramic-metal or ceramic—ceramic composites.

59 Claims, 31 Drawing Sheets

600 °C HTT     1550 °C HTT

SiC fibers

SiC/Si tube

CARBONIZED WOOD AND MATERIALS FORMED THEREFROM

BACKGROUND OF THE INVENTION

1. Field of the Invention

The present invention relates to carbonized plants, and more particularly relates to the fabrication of materials using wood and other naturally fibrous plants as precursor materials. The carbonization process retains the anatomical features of the precursor plant while converting the composition of the plant to primarily carbon. The carbonized wood may then be formed to the desired shape. The shaped carbon product may be used to form composites such as carbon—carbon and carbon-polymer composites. The shaped carbon product may alternatively be converted to ceramic compositions, or further processed to form ceramic-containing composites such as ceramic-metal and ceramic—ceramic composites.

2. Background Information

Carbonization of wood for the manufacture of charcoal has been practiced since the beginning of history. Destructive distillation was practiced by the ancient Chinese. The Egyptians, Greeks and Romans carbonized wood and distilled the volatiles for embalming purposes and the filling of joints in wooden ships. In ancient times wood charcoal was used for the removal of odors, medicinal purposes, domestic cooking fuel, the making of gunpowder and the refining of ores. The Industrial Revolution brought about a heavy demand for charcoal, especially for the making of iron. Up until the late 1800's the largest portion of manufactured wood charcoal went into the reduction of iron ores. Today, coal derived cokes are used.

For many centuries charcoal was made in open air pits in the Western world. This entailed tightly piling bolts of air dried wood end to end forming a conical mound. This mound was then covered with several inches of leaves, grass, needles, branches or moss depending upon what was available. An additional few inches of dirt or sod then capped off the mound. Openings were left at the base for air supply and up the center to allow smoke to escape. The mound was then ignited at the base through an opening. The mound tender made certain just enough air entered to allow a smoldering combustion which could take from one to several weeks to complete.

The production of wood charcoal became a major industry by the end of the nineteenth century. The conventional open pit methods wasted the by-product gasses that are released when wood is thermally decomposed. An entire industry was formed around the distillation of the vapors evolved from wood carbonization. In the U.S. two branches of the industry formed due to the fact that denser hardwoods give different products than the lighter, more resinous softwoods. The products from destructive distillation of hardwoods included wood alcohol (methanol), acetate of lime and charcoal. The softwoods gave turpentine, tar, wood oils and charcoal. These products were made possible by carbonizing wood in a container designed such that the evolved gasses could be captured and distilled.

The first development beyond the open pit method was the use of brick kilns designed to both contain the wood charge and provide a means to tap into the exhaust. The brick kiln method meant a faster production rate since mounds were not needed and rapid loading was possible. This was also an asset for the iron industry which was rapidly expanding. The heat needed for decomposition was obtained from the wood charge itself, just as in the open pit method. One drawback of the brick kiln was that a large portion of the evolved vapors were lost through the bricks, thus giving limited yields.

The first high efficiency device for collecting carbonized wood vapors was the small cylindrical retort made of cast iron or steel measuring some 4 ft in diameter and 9 ft in length, capable of holding about two thirds of a cord. These were installed horizontally as pairs with batteries of 10 or more pairs in long rows enclosed by brick. Heating was able to be provided externally from below the retorts and fuel was typically in the form of charcoal, coal, wood gas, wood oil, wood tar or wood alone. A single run took about twenty four hours to complete. The vapors were collected and distilled in the form of pyroligneous acid which was later refined to produce acetic acid, methanol, acetone, furfural, tars and oils.

The cylindrical retort evolved into a large rectangular steel retort enabling the use of cars for loading and unloading. A common size was 50 ft long by 8 ft high and 6 ft wide. These retorts held more than ten cords of wood and considerably increased production rates while reducing the amount of labor involved. After a twenty four hour carbonization cycle the cars were removed to cooling retorts and held for another one or two days. Once removed from a cooling retort the cars were allowed to sit in the open for another two days thus giving a total time, from wood to marketable charcoal, of about ninety six hours. Some of the larger wood carbonization and distillation plants consumed as much as 200 cords per day.

In the beginning of the twentieth century wood charcoal and its distillation products had fallen behind the products derived from coal and petroleum in several of the markets. Eventually, due to dwindling supplies of wood and the availability of higher grades of coals, the metallurgical market share became dominated by coal derived cokes. The demand for wood charcoal began to decline in the late 1800's. Petroleum based products also began to take over some of the markets dominated by wood distillation products.

Currently in the U.S., the only significant markets for wood carbonization products are activated carbons and charcoal briquettes.

Thermal degradation of wood has been studied with the intent of gaining information on its ignition characteristics. In the U.S. wood is used on a large scale in construction, especially for residential housing. Increased public concern over fire safety has prompted forest product industries to investigate methods for eliminating or reducing the ignition temperatures of wood and wood based products. The most common approach was chemical treatment to suppress various decomposition reactions. Progress in many cases was limited due to the potential for production of poisonous, or noxious fumes when products did finally ignite. Additional problems such as degradation of wood mechanical properties and bonding characteristics has hindered wide scale manufacture of fire retardant products. In the 1980's construction grade fire resistant plywood entered the market and was widely installed as roof sheathing in many regions of the U.S. Unfortunately, the release to market was premature as the product suffered from ply delamination resulting in product recall and much negative publicity.

Several U.S. patents address wood treatment methods. U.S. Pat. No. 1,237,521 to Jennison discloses impregnating wood with preservatives such as tar.

U.S. Pat. No. 1,483,733 to Kozelek discloses the production of wood for musical instruments by heating the wood in air to a temperature of from 450 to 550° F. (232 to 288° C.). The heat treated wood, which has a yellow color, may then be treated with varnish prior to making the musical instrument.

U.S. Pat. No. 3,508,872 to Stuetz et al. discloses a process for the production of graphite fibrils using wood splinters less than 0.5 inch in length as a starting material. The splinters are first heated in air at 150 to 400° C., and are then charred at 2000 to 3000° C. The resulting graphite fibrils are then incorporated in a binder to form a composite.

U.S. Pat. No. 3,927,157 to Vasterling discloses the production of carbon—carbon composites using wood pulp as a starting material. Carbohydrate sugars are first chemically extracted from the wood, followed by heating the wood pulp at increasing temperatures of up to at least 3800° F. The fibers are then mixed with a carbonizable binder and the mixture is heated to form the carbon—carbon composite.

U.S. Pat. No. 4,170,668 to Lee et al. discloses a method for pre-charring the surface of wood in order to retard fire and rot.

U.S. Pat. No. 4,678,715 to Giebeler et al. discloses the impregnation of wood with thermosetting polymers.

U.S. Pat. No. 5,143,748 to Ishikawa et al. discloses the surface treatment of wood with a plasma to impart water repellency.

The manufacture of graphite products is well known. Molded graphites are conventionally produced by a compaction process using a mixture of carbon filler with an organic binder which is heat treated to produce parts such as large electrodes used in metallurgical processes. In the late 1800's, E. G. Acheson patented a process for manufacturing molded graphite parts which uses an electric resistance furnace for heat treatment of green products at temperatures adequate for graphitization to occur (about 3000° C.). This was a significant development as it enabled carbon electrodes with relatively low resistivity to be produced. Many improvements have since been made and the applications for molded graphites has increased significantly since then. In the 1940's, Enrico Fermi first used molded graphite as a moderator for a self sustaining nuclear reaction. Other modern applications of molded graphites include use as a refractory, electric motor brushes, electrical resistance heating elements in high temperature furnaces, rocket nose cones, rocket exit cones and various other aerospace components.

Unlike molded graphites, glass-like carbons do not readily graphitize and exhibit isotropic properties. Glass-like carbons are used as vessels in chemical processing or analytical chemistry. They are also used as crucible material for the melting of noble metals and special alloys, especially in dental technology. Glass-like carbons in the form of small spheres are being considered for uses as catalyst supports. In addition, glass-like carbons are being produced in the form of open-cell foams.

Carbon foams are a fairly recent addition to the family of solid carbon materials. These are glass-like carbons produced in the form of an open pore foam. They are reported as having potential applications including catalyst supports, battery anodes, micro-porous membranes for filtration, supercapacitor electrodes, low mass structural materials and composites.

There are several reported processes and precursors used to produce carbon foams, also referred to as reticulated carbons. A polymer which is highly cross-linked and does not go through a fluid state is the first criteria for selecting a precursor. Some of the polymers of choice are furfuryl alcohol, phenolics, polyacrylonitrile, polyurethane, resorcinol and others. In one process an inorganic is removed by leaching after carbonization, leaving a replica carbon which is then freeze-dried. Other carbon foams are produced by the blowing of bubbles into a variety of liquid polymers.

Pyrolytic carbons and pyrolytic graphites are different in that they are produced by chemical vapor deposition (CVD) from organic vapors. They also differ from other forms of solid carbons in that the main application is as a coating. Pyrolytic graphite was first produced in the late nineteenth century and was used for lamp filaments. Although produced as a coating, it can be made thick enough such that after removal from the substrate it has sufficient mechanical integrity to stay together. Some applications of these films, which vary in degree of crystallographic order, are heart valves and dental implants, coatings on molded graphite parts, coatings on fibers—especially ceramic fibers which are reactive with their composite matrix, coatings on optical fibers for improved abrasion resistance and infiltration coating of carbon fiber preforms for the manufacture of carbon—carbon composites (also termed chemical vapor infiltration, CVI).

Carbon fibers have been produced using polyacrylonitrile (PAN) as a precursor. Fibers of ultrahigh modulus having a modulus of elasticity greater than 50% (>500 GPa) of the value of $C_{11}$ for graphite single crystals have been made.

During the 1970's progress was made in the use of pitch as a less expensive carbon fiber precursor. These precursors are capable of producing carbon fibers of ultra high modulus but, in general, of lower strength than those derived from PAN. The main difference between carbon fibers derived from pitch and those from PAN lies in the degree of crystallization and structural morphology of the solid carbon fibers. In general, PAN derived carbon fibers are non-graphitic while pitch derived carbon fibers are graphitic. While some present day applications utilize pitch based carbon fibers the majority of the market is taken by carbon fibers derived from PAN.

Carbon black and lampblack are forms of solid carbons produced by thermal decomposition of organics resulting in the formation of solid particles in the gas phase. Their difference lies primarily in the organic precursor and the size and atomic structure of the resulting solid carbons. Lampblack is produced from the burning of oils, tars or resins in an oxygen limited environment. Carbon black is manufactured by incomplete combustion of a gas. Lampblack is one of the oldest forms of manufactured carbon, and the first known commercial process for making nano-particles. It was made by collecting the smoke from an oil lamp. Lampblack is still used today as a black pigment in inks and paints.

Carbon black is produced by the channel process or the thermal process. In the channel process, small flames of natural gas impinge upon a cool metal surface in the form of a channel, a rotating disk or a roller. The carbon powder forms on the cool surface and is then exposed to a high temperature to oxidize the particle surface. The thermal process, also termed "cracking", produces carbon black by thermal decomposition of natural gas in the oxygen free environment of a preheated chamber. Acetylene black is a special type of carbon black which is derived from the thermal decomposition of acetylene. Carbon black is used commercially in large quantities for the reinforcement of rubber in the tire industry.

Activated carbons are processed solid carbons with a highly developed porous structure and large internal specific surface area (>1000 m²/g). These processed solid carbons, which were developed as improved adsorbents for the decolorization of sugar, can be produced by heat treatment in the presence of steam or carbon dioxide. An alternate method for producing activated carbon is to impregnate various vegetable matter with salts prior to carbonization. These processes are still used today, with some modifications, for the production of activated carbons from a diverse group of organic precursors.

It is known that the presence of certain metals or metallic compounds during heat treatment of a non-graphitic carbon can cause graphitization to occur at temperatures well below what is otherwise required. It has also been established that non-graphitizable carbons may be transformed into graphitic carbons by heat treatment with additions of metallic compounds. This phenomenon has been given the name catalyzed graphitization.

Solid carbon as a structural material finds many applications. Many of these applications make use of the refractory properties of solid carbons. The combination of thermal stability, thermal shock resistance and high strength and stiffness at very high temperatures make solid carbon materials unique. One major disadvantage is their sensitivity to high temperature oxidation.

Monolithic carbon or carbon particulate composites are not reliably used in structural applications due to their brittle mechanical behavior, flaw sensitivity, variable properties and difficulties in fabrication of complex large components. Carbon fiber reinforced carbon matrix composites have been developed to overcome some of those limitations. Commonly referred to as carbon—carbon composites, these fiber reinforced materials are now being used in some of the most severe environments.

Applications for carbon—carbon composites include rocket nozzles, rocket reentry heat shields, shuttle nose cone, brake pads and rotors in aircraft and race cars. Other applications include refractory molds and dies, high temperature engines, corrosion resistant structural materials, heat exchanger tubes and biomaterials. Many applications utilize a three-dimensional reinforcement to achieve the properties desired.

The properties of solid carbons with identical composition can vary considerably. The reinforcing phase is generally required to have high stiffness and strength. Conventional PAN based fibers meet these requirements and are predominately used for both carbon-polymer and carbon—carbon composites.

The matrix carbon phase is typically derived from the carbonization of cross-linked polymers such as phenolics. These produce high carbon yields and a carbon phase which has distinctly different properties from the reinforcing fibers. The fiber-matrix bond is a critical factor in determining the mechanical properties of the composite. If the bond is too strong, crack deflection and fiber pull-out do not occur and the material exhibits little toughness.

Processing of carbon—carbon composites is typically accomplished by two different methods, polymer impregnation followed by carbonization, or chemical vapor infiltration (CVI). CVI entails the use of a carbonaceous gas, such as methane, which is allowed to infiltrate a heated carbon fiber preform where it decomposes, leaving a carbon residue on fiber surfaces. Its disadvantage is that often pores become choked off leaving closed porosity in the final composite. It also greatly increases manufacturing costs. Most commercial processes use polymer impregnation/carbonization.

Preforms of woven carbon fibers are conventionally impregnated with polymers by resin transfer molding techniques. Phenolics in an organic solvent can fully penetrate the carbon fiber weave. After solvent evaporation, phenolic carbonization is carried out. Yields of 60% are typically obtained from phenolics. The first carbonization step results in a composite with considerable porosity and a second, and possibly third, impregnation/carbonization sequence is necessary. Carbonization may be performed in a mold to limit distortion of the preform.

Another method for producing carbon—carbon composites is to start with a pre-impregnated carbon fiber weave and form the desired shape. Carbonization, and additional impregnation/carbonization steps are then performed. Other polymers, pitch for example, are used as precursors to achieve different matrix properties.

Fiber reinforced polymer composites have found widespread use in recent years. The largest market, by volume, is in the fabrication of boat hulls. This market is dominated by glass fiber composites. Carbon fiber composites are becoming less expensive and more competitive in some applications. Much of the development of carbon reinforced polymers (CRP) has been supported by the aerospace and aviation industries where specific stiffness and specific strength are critical issues. This development has led to diverse use in applications ranging from sports equipment to advanced aircraft components.

One of the advantages inherent in use of CRP's is that structures can be designed with a material tailored to the particular demands of the application. Composite properties can be made with varying degrees of anisotropy so an exact fit of material property to structure can be made. Complex shapes are also possible using composites since the structure is formed at the same time the material is made. This is made possible by use of several manufacturing approaches.

Manufacturing with carbon fiber composites is conventionally done by stacking woven or continuous fiber pre-pregs, by infiltrating mats or weaves with resins, by extrusion of chopped fibers mixed with polymers and by spraying fibers and resin into molds. Techniques have been refined such that composites of very high quality are becoming common in high performance applications. However, high performance composites are expensive, partially as a result of the costs incurred in forming a final product from the constituent materials. Stacking of pre-pregs is often done by hand thus adding substantially to final product costs. Polymer infiltration often causes fiber swimming and shifting of weaves. Infiltration often results in considerable porosity in the final product. These defects in composites severely limits their structural worth in safety critical applications.

Ceramic materials are often processed by complex procedures to attain a material with properties specific to an application. Some of those properties include high hardness, high stiffness and strength, corrosion resistance and a wide range of thermal and electrical properties. Ceramics are known for retaining these properties at high temperatures, making them useful in refractory applications. Silicates, oxides, nitrides and carbides are some of the fundamental ceramic materials manufactured today.

Many carbides are important industrial materials. These include calcium carbide, iron carbide, silicon carbide, boron carbide, tungsten carbide, titanium carbide and niobium carbide. These are all synthetic industrial materials. Silicon carbide has received considerable attention for use as a high performance structural material where good strength and toughness retention, oxidation and thermal shock resistance, and high thermal conductivity are demanded at temperatures approaching 1400° C.

Granular silicon carbide is manufactured by the Acheson process, the same as is used for the production of molded graphite parts. In this process, the green solid carbon, usually in the form of large cylinders, are laid out horizontally and packed in granular coke. The mound is then covered with sand (silica). Large water cooled electrodes are fixed at each end of the stack. High current is then passed through the stack which becomes self resistance heated. Temperatures of 2000–3000° C. are generated which graphitizes the solid carbon. At the same time a reaction between the silica and coke packing produces silicon carbide. Traditionally the metallurgical, abrasive and refractory industries are the largest users of silicon carbide. It has also been used for resistance heating elements, in electronic devices and in applications where resistance to nuclear radiation is advantageous.

Traditional ceramic processes for making monolithic products involves the sintering, or densification, of ceramic powders by high temperature heat treatment. This involves both surface and bulk diffusion mechanisms to attain full densification. Sintering results in shrinkage from the green state, making necessary the machining of a hard material when close tolerances are called for. Oxide ceramics are typically processed this way.

Carbides and nitrides do not readily sinter due to limited diffusion in the covalently bonded solids. Many industrial applications make use of a metallic phase which acts as a glue holding together carbide particles (cermets). Other processes for producing monoliths involve high pressure sintering (HIP) or reaction bonding of particles, e.g., reaction bonded silicon nitride.

In some cases ceramic monoliths are manufactured directly from precursors without forming intermediate powders. Chemical vapor deposition is used for producing ceramic coatings. As another example, silicon carbide fibers are produced by pyrolysis of organometallic polymer fiber precursors. The Yajima process entails the use of polysilane polymers which are thermolized to form carbosilane, a polymer with a backbone of mostly alternating silicon and carbon atoms. The carbosilane is drawn into a fiber which is oxidized to promote cross-linking, then heat treated to approximately 1200° C. to form a silicon carbide fiber with a low degree of crystallinity. These fibers (Nicalon®) are used as reinforcements in high performance ceramic composites.

A relatively new approach for making monolithic ceramics of net shape utilizes carbon foams as a precursor for the reaction conversion to a carbide. Silicon and silicon-refractory metal alloys are used as an infiltrant to form a carbide by reaction at high temperatures. Depending on the void volume of the precursor carbon foam, silicon carbide monoliths with varying degrees of porosity or residual infiltrant have been produced with little or no bulk dimensional change. Porous silicon carbide foam has been considered for high temperature filters and surface combustion plates. It can also be used as a substrate to carry materials such as boron nitride used in semiconductor doping applications.

In summary, many different types of carbon-containing materials are known. The carbonization of wood has been practiced for thousands of years. However, there is still a lack of disclosure of the use of monolithic structures made from carbonized wood. Specifically, no studies have been found relating to methods by which relatively large pieces of wood can be carbonized while retaining their mechanical integrity. Further, no information relating to the production of large crack-free charcoal has been reported. In addition, no study of the reduction in dimensions of wood as a result of carbonization has been done. Measurement of resulting char mechanical properties can not be found in the literature. Furthermore, the successful production of composite materials and ceramics based on carbonized wood having the original structure of the precursor wood has not been achieved. The present invention has been developed in view of the foregoing and other deficiencies of the prior art.

SUMMARY OF THE INVENTION

The process of the present invention involves the selection of an appropriate plant based on its composition and anatomical features. The plant is treated under controlled atmosphere and temperature to yield a porous monolith of different composition from the biological precursor. In many applications, this monolith will be nearly all carbon, but may contain other elements as well. The porous carbon monolith may then be formed to a final net shape depending on the particular application.

In one embodiment, the carbonized wood may be further converted to form various materials. For example, the porous carbon monolith may be impregnated with a polymer to form a carbon-polymer composite. A high char yielding polymer may be used with a second carbonization step to yield a carbon—carbon composite. Infiltration and reaction with molten metals can produce a net shaped carbide ceramic. Additional processing may be used to produce ceramic—ceramic or ceramic reinforced metal composites. As another example, the carbonized wood may be infiltrated and reacted with metal oxides to convert the carbon to ceramic.

An object of the present invention is to provide a method of carbonizing wood while retaining its anatomical features. The method involves the treatment of fibrous plant material under controlled atmosphere, pressure, and temperature conditions to convert the composition of the plant to carbon while maintaining the cellular structure of the plant.

Another object of the present invention is to provide a monolith of carbonized wood which is formed into a desired net shape.

A further object of the present invention is to provide a method of making a carbon-polymer composite using carbonized wood as a precursor.

Another object of the present invention is to provide a carbon—carbon composite by infiltrating carbonized wood with a carbon-forming material such as high char forming polymer, and performing a second carbonization step to produce a carbon—carbon composite.

A further object of the present invention is to provide a method of forming ceramic materials from carbonized wood. Carbonized wood having the anatomical features of the precursor plant material may be reacted to form a porous ceramic structure. The pores may optionally be filled with ceramic or metal material to yield ceramic—ceramic or ceramic-metal composites.

These and other objects of the present invention will become apparent from the following detailed description.

DETAILED DESCRIPTION OF THE PREFERRED EMBODIMENTS

Figure 1:
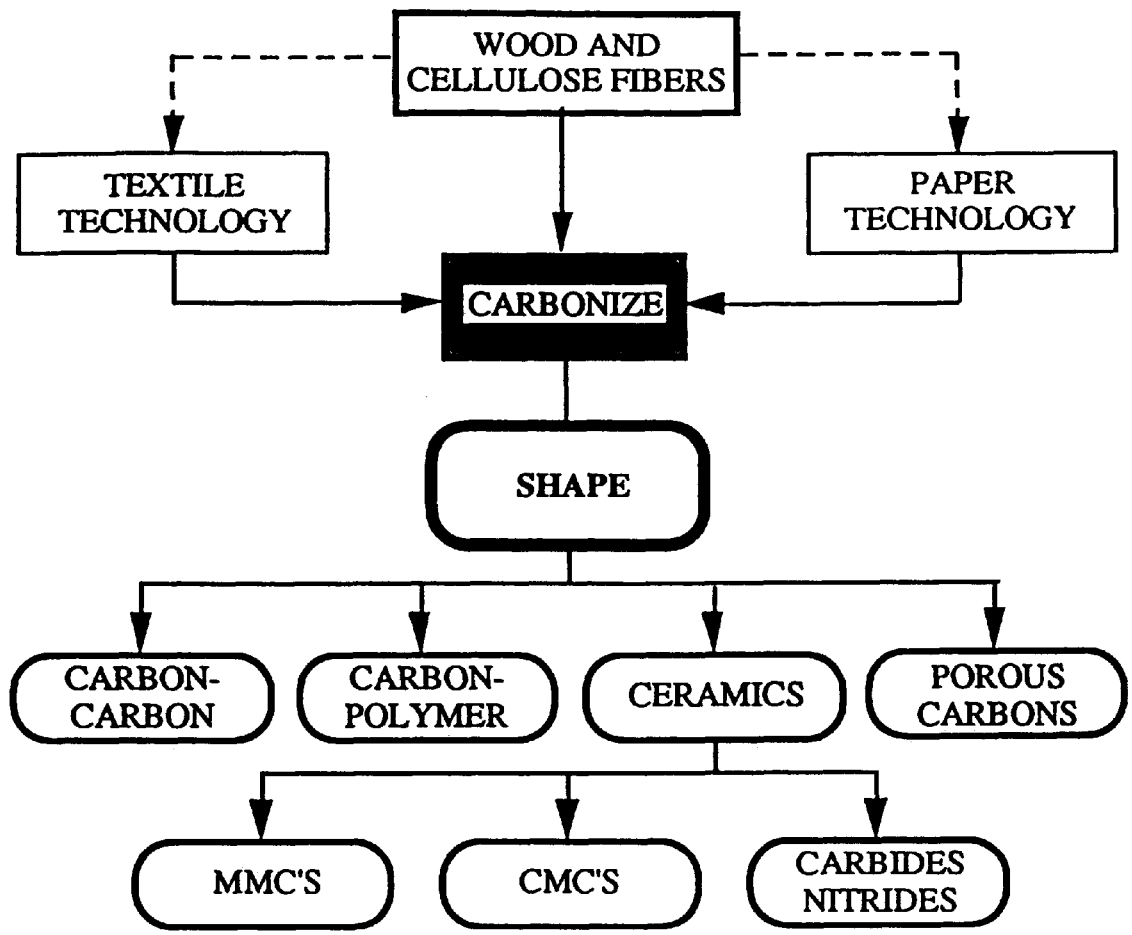
FIG. 1 is a schematic diagram illustrating various aspects of the present invention.

FIG. 1 schematically illustrates various aspects of the present invention. Wood or other cellulose-containing plants are carbonized under controlled conditions, with the carbonized product retaining substantially the same macrostructure as the precursor plant material. The carbonized product may then be formed to the desired shape by conventional working or cutting methods such as sawing, sanding, drilling, turning, milling, routing and the like. The shaped porous carbon material may be used for various applications such as shaped activated carbon, refractory insulation and high temperature filters. Alternatively, the shaped carbon monolith may be further processed to form carbon-containing composites including carbon—carbon and carbon-polymer composites. Such composite materials may be used for applications such as lightweight structures, furniture, brake shoes, sports equipment, high temperature tubing, brake rotors and the like.

In another embodiment, the shaped carbon monolith may be at least partially converted to a ceramic such as carbide or nitride. These ceramic-containing materials substantially retain the porous cellular structure of the carbonized wood. Such porous ceramic materials may be used for refractory insulation, abrasives, high temperature filters, etc.

In a further embodiment, the porous ceramic structure may be infiltrated with various materials including metals and ceramics to provide composite materials for applications such as lightweight structures, cutting tools, armour, propellers, turbine blades and the like.

The present invention provides a novel processing approach for the manufacture of porous carbons, composites and ceramics using wood and other naturally fibrous plants as precursors. The process has the potential for producing industrially important materials at a reduced cost due to its simplicity, and the fact that it makes use of a renewable resource.

In accordance with the present invention, "carbonized wood" means a predominantly carbon-containing material formed from wood or other similar cellular plant matter comprising at least 70 weight % carbon, preferably at least 80 weight % carbon. More preferably, the carbonized wood comprises greater than about 90 weight % carbon, most preferably greater than about 95 weight % carbon. Where the carbon is provided in the form of graphite, the carbonized wood typically comprises about 99 weight % carbon.

The carbonization process of the present invention typically results in substantial weight loss of the wood precursor material. For kiln-dried wood having about 12 weight % water, the carbonization process typically results in a weight loss of at least 40 weight %. Typical weight losses range from about 60 to about 80 weight % depending on the particular wood species. For many structural applications, a weight loss of about 60 weight % is satisfactory, while for applications such as activated carbon, a weight loss of about 85 weight % is preferred.

The carbonization process of the present invention decomposes organic constituents of the precursor wood to obtain carbon residue. Preferably, at least about 80% of the organic constituents comprising C—H bonds are decomposed to carbon, more preferably at least 90 weight %. Most preferably, at least about 95 weight % of the organic constituents are decomposed to carbon, with 99 weight % being particularly preferred.

In accordance with the present invention, "graphitization" means the conversion of carbon from a substantially amorphous structure to a substantially crystalline structure, as identified by the occurrence of the 002 X-ray diffraction peak.

The following steps are used in accordance with a preferred embodiment of the invention. A suitable plant is carbonized under highly controlled conditions to obtain a solid carbon which retains substantially all of the anatomical features of the precursor. The plant precursor preferably comprises virgin wood which has not been processed other than by kiln drying and cutting to shape. The carbonized wood is then shaped to the net shape of the desired final product. Next, the shaped carbon may be converted to a final product. Conversion may produce carbon-polymer composites, carbon—carbon composites, ceramics and ceramic composites. Alternatively, the shaped carbonized material may be used without subsequent conversion.

Carbon in the solid state has several polymorphs each with distinct characteristics. The guidelines of the International Committee for Characterization and Terminology of Carbon (ICCTC) are used herein. Solid carbon as used herein includes glass-like carbon, non-graphitic carbon, graphitic carbon, carbon fiber and others.

The polymorph of carbon termed graphite is anisotropic in nature due to the mixed bonding of the structure and the crystal symmetry. There are two polytypes: hexagonal and rhombohedral. Natural graphites generally contain more than 90% of the hexagonal form with the remainder rhombohedral. The hexagonal polytype is the thermodynamically stable form of graphite.

The carbon atoms in graphite have both σ- and π- bonding and form a two-dimensional hexagonal lattice in the basal plane. These layers are stacked together with ABAB registry and bound by weak van der Waals forces arising from the delocalized π- bonds. Within the basal plane atoms are bound by the covalent $sp^2$ hybrid (σ-) bond which gives the crystal great stiffness and strength perpendicular to the c-axis. Along the c-axis stiffness and strength is low. The layers readily shear and cleave.

Electrical and thermal properties are also directionally dependent in graphite. The delocalized electrons are capable of charge transport in the basal plane but not perpendicular to it. Thus the electrical conductivity has a metallic character to it in the basal plane. Thermal conductivity is also high in the basal plane owing to the stiff covalent bonds. Thermal conductivity along the basal plane is about 200 times greater than perpendicular to it. When little phonon scattering occurs, as in a highly ordered single crystal, the thermal conductivity can be as high as 4180 W/mK along the basal plane.

Thermal expansion in graphite is also highly anisotropic. Unlike most metals, the thermal expansion is negative along the basal plane at temperatures up to 400° C. above which it becomes slightly positive. In the c-direction, however, thermal expansion is positive with a coefficient of $25 \times 10^{-6}/°$ C. at 0° C. This substantial anisotropy in thermal expansion can lead to high internal stresses with temperature excursions.

Other forms of solid carbon are composed of mostly elemental carbon as a mixture of well ordered, but small, crystallites surrounded by less ordered regions. These crystallites may have two- or three-dimensional long range order as determined by diffraction techniques. The degree of crystallographic order varies depending on precursor material and processing conditions. These solid carbons are either non-graphitic or graphitic, the former being further grouped into graphitizable or non-graphitizable categories. They may exhibit anisotropic properties or be essentially isotropic.

The distinction between solid carbon and graphitic carbon is primarily made on the basis of degree of crystallinity. Solid carbons, though comprised of very small crystalline regions of graphitic nature, are either amorphous, non-graphitic or graphitic when characterized by x-ray diffraction. The term solid carbon covers all natural and synthetic materials which are mainly comprised of the element carbon. Amorphous carbons are those in which there is no long range order in the solid carbon. Non-graphitic carbon has two-dimensional long range order. Graphitic carbons show three-dimensional long range crystallographic order, albeit of varying degrees depending upon the material, and therefore show distinct peaks when x-ray diffraction is used. Both forms, non-graphitic and graphitic carbons, may have anisotropic properties.

In accordance with the present invention, monolithic carbonized wood can be produced without forming cracks usually associated with activated charcoal. As described more fully below, controlled atmosphere and heating rates produce thermal decomposition which avoids crack formation. Substantially all of the anatomical features of the precursor wood species are retained in the carbonized wood. The resulting solid carbons are easily machined to exact dimensions using standard tools and procedures.

The advantages of using carbonized wood as a precursor for composites are realized when its directional morphology and properties are utilized. Unlike fiber reinforced materials, carbonized wood offers a monolithic porous structure for infiltration of a second phase. This structure does not necessitate the use of molding for polymer or metal transfer and eliminates the problems associated with fiber swimming. The highly aligned cells offer anisotropy of mechanical properties and permeability. The natural porosity of the carbonized wood can be used to obtain uniform infiltration of a polymer. The porosity of the carbonized wood can also be utilized for a solid carbon filter, adsorbent or catalysis substrate. Furthermore, net-shape processing can be obtained by shaping the carbonized wood to exact dimensions before converting to a composite.

In accordance with one embodiment, materials processing using carbonized wood produces industrially important ceramics such as SiC, $Si_3N_4$, $B_4C$, AlN and the like. This method allows the production of advanced ceramics of net shape. The process utilizes inexpensive precursors, eliminates the need for special handling and sintering of powders and minimizes the machining of a hard ceramic by allowing a carbonized solid material to be shaped prior to conversion to the ceramic. A ceramic which retains the cellular features of the precursor wood may be produced. For example, a SiC micro-honeycomb ceramic may be produced which has potential applications for high temperature filters or as a catalyst support. Silicon carbide ceramics may also be produced which contain residual Si infiltrant. The resulting composite may optionally be nitrided to form a ceramic/ceramic composite.

Figure 2:
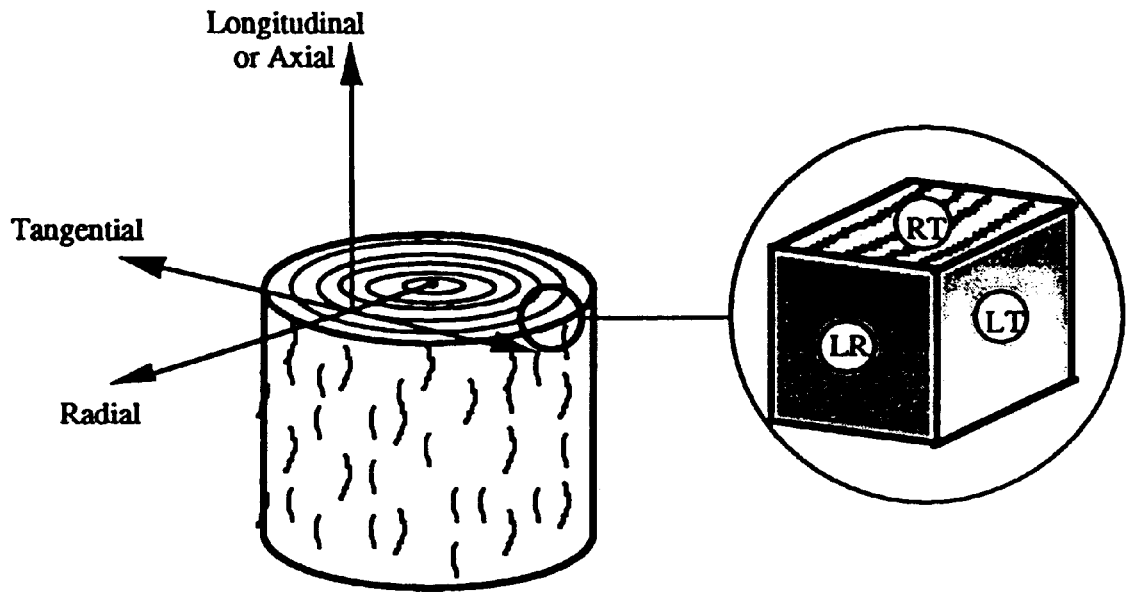
FIG. 2 is a partially schematic cross-sectional view of a piece of wood illustrating the longitudinal, radial and tangential directions, including an exploded portion showing directional planes of the wood.

FIG. 2 is a partially schematic perspective view of a tree cross-section showing the longitudinal or axial, tangential, and radial orientations of the wood. The wood includes different directional planes, labelled as longitudinal-radial (LR), longitudinal-tangential (LT) and radial-tangential (RT), as shown in the exploded view of FIG. 2.

Figure 3:
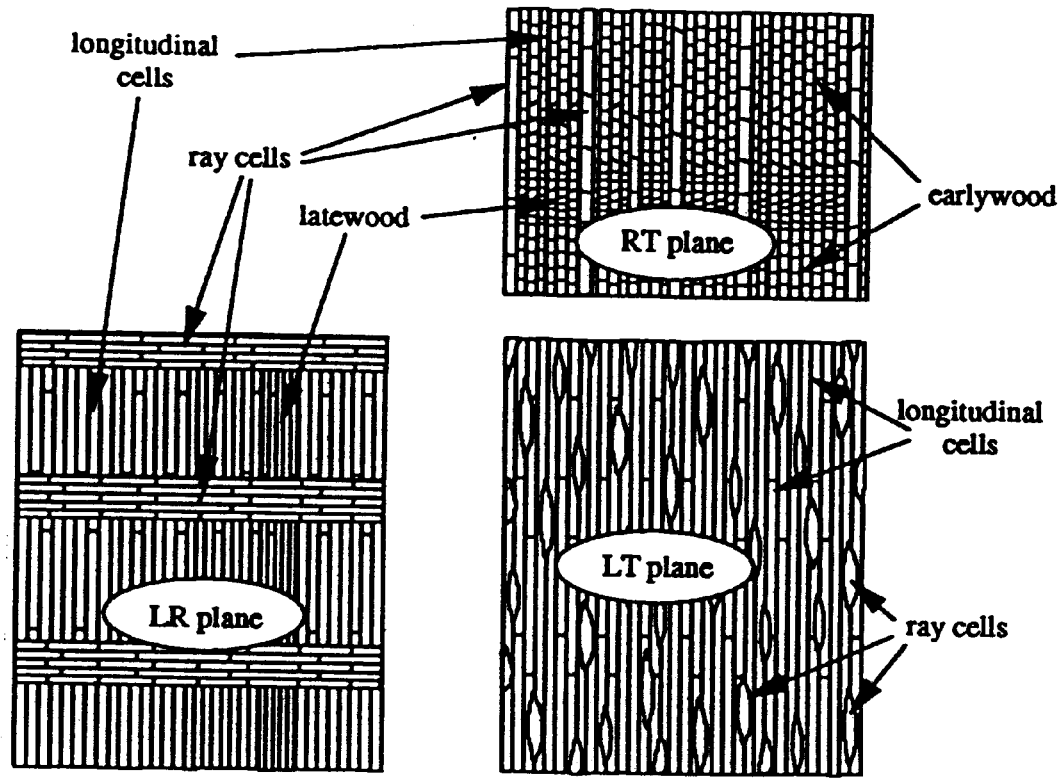
FIG. 3 is a partially schematic illustration of different directional planes found in a typical piece of wood.

FIG. 3 illustrates the cellular structure of a typical piece of wood in the LR, LT and RT planes. The wood comprises longitudinal cells and ray cells, as well as earlywood and latewood regions. The elongated cells of the precursor wood, as well as the cells of the carbonized wood produced in accordance with the present invention, typically have aspect ratios of greater than 2 to 1, usually greater than 10 to 1 up to 100 to 1 and higher.

Both hardwoods and softwoods are comprised of elongated tubular cells aligned with the axis of the tree trunk as shown in FIGS. 2 and 3. These are referred to as longitudinal cells, fibers or tracheids. The longitudinal cells give the grain direction, which corresponds to the direction in which most wood splits or cleaves. Longitudinal cells vary in length from one species to another but in general are longer in softwoods than in hardwoods. Additional ray cells extend from the center (pith) of the trunk radially outward to the cambium layer. These ray cells are therefore perpendicular to the longitudinal cells. There are many more longitudinal cells than ray cells, the proportion varies between species. Softwood ray cells on average occupy about 10% of the wood volume, hardwood ray cells about 20%.

Hardwoods differ in cellular structure from softwoods in several ways and in general tend to have a more complex anatomy. The most distinct feature is that hardwoods typically contain fluid conducting pores (vessel elements) arranged parallel to the axis of the tree. Softwoods do not have these special pores but are capable of fluid conduction solely via tracheids. The hardwoods are grouped into ring porous, diffuse porous and semi-ring porous depending upon the arrangement of vessel elements. For example, in a ring porous wood such as red oak (*Quercus rubra*) the pores are closely packed in the inner portion of the earlywood giving that region very low bulk density. In diffuse porous basswood (*Tilia americana*) the pores are evenly distributed throughout an annual ring such that little variation in bulk density occurs as a result of the vessel elements. Finally, an intermediate arrangement of pores termed semi-ring porous is exemplified by butternut (*Juglans cinerea*).

The majority of mature wood cells are dead and hollow. The resulting tissue (secondary xylem) is composed of cell walls and voids (lumens). Typical softwoods by volume contain about 90% to 95% fibrous cells (fibers, tracheids or longitudinal cells). These cells are square to rectangular in cross section, have closed tapering ends, and are arranged such that their ends overlap adjacent cells. They are also arranged in aligned radial rows. The widths of the fibers are generally about 35 to 50 microns. They are typically about 3 to 5 mm long giving an aspect ratio of about 100 (based on the hollow fiber). Rays are composed of brick-like, often living cells called parenchyma. Parenchyma are food storage cells that exist in hardwoods as well. These function in radial fluid conduction and food storage, and frequently contain extraneous materials such as starch, fats, oils, various sugars and inorganic deposits such as calcium oxalate crystals or silica. The rays of some species also contain cells called ray tracheids which are similar to parenchyma but are dead at maturity. Whether with tracheids or not, rays are usually several cells high. In most softwoods they are only one cell wide but can be several cells wide. A few softwood species contain a noticeable number of longitudinal parenchyma but this is uncommon.

Resin ducts are tube like voids in the xylem of some softwoods which are either longitudinally or radially oriented. These ducts are lined with special parenchyma called epithelial cells that secrete oleoresin into the duct. This anatomical feature is distinct to softwoods.

Hardwoods, as mentioned above, contain mostly fibers but also the much wider cells called vessel elements. These cells, from about 0.02 to 0.5 mm in length, are stacked endwise to form tubes (or pores). The ends of all vessel segments are perforate, or open, for free flow of liquids between cells. In some species the segment ends are completely open while others contain a series of parallel cross bars (scalariform) or some other design (reticulate). This morphology is different from wood fibers which are completely imperforate. Hardwood fibers occupy a proportionally smaller volume of wood tissue than softwood fibers due to the presence of pores. The fibers are smaller in width by about one half and length by about one third.

A variety of cell types are found in hardwoods. They can be classified with respect to their orientation in the xylem. The cells vertically oriented are fibers (libriform fibers, fiber tracheids and vasicentric tracheids), axial parenchyma and vessel elements. Those horizontally oriented are ray parenchyma (procumbent cells and upright cells), homocellular rays and heterocellular rays. The parenchyma cell content of hardwoods is on average much larger than that in softwoods. This is a result of the wider rays (1 to 50 cells), greater ray volume and a relatively high proportion of longitudinal parenchyma. Also, the rays of hardwoods are usually all parenchyma (i.e. no ray tracheids).

The wood tissue, including cells and intercellular material, is a composite system composed of a variety of organic polymers. The basic structural component of all wood cell walls is cellulose. It is a long chain linear polysaccharide (and carbohydrate) composed of glucose, a six carbon sugar (contains a hexagonal ring with 5 carbon and 1 oxygen). It has a general formula of $(C_6H_{10}O_5)_x$. The glucose in cellulose accounts for approximately 40–45% of the oven dry weight of wood tissue.

The cellulose superstructure has a matrix of lower molecular weight polysaccharides that contain short side chains. These carbohydrates are mostly combinations of various five carbon sugars (xylose and arabinose) and six carbon sugars (glucose, mannose and galactose). Those carbohydrates are different from cellulose in structure and molecular weight but have enough similarities to be called hemicelluloses. Together, the carbohydrates of cellulose and hemicellulose comprise about 65% to 75% of the dry wood.

The third major component of the wood tissue is lignin which comprises about 18% to 35% of the dry wood. It is a three dimensional, highly branched polyphenolic molecule of complex structure and high molecular weight. It permeates cell walls and intercellular regions (middle lamella) giving the wood its relatively high hardness and rigidity. The middle lamella region is typically about 70–80% lignin by weight. It acts as a glue which bonds together all wood cells. Even though the middle lamella has a very high lignin content, the cell walls usually contain about 70% of the total lignin in the wood due to their high volume fraction.

Proportions of the three major components of wood varies from tree to tree and between species. In general, softwoods contain a higher proportion of lignin than do hardwoods.

During the early stages of wood cell growth the cell wall is thin and deformable. This early wall, termed the primary wall, is typically added to near the end of cell growth by a secondary wall manufactured on the lumen side. Wood fibers, vessels and certain other elements that function in passive conduction and/or support typically develop a secondary wall.

The cellulose polymer comprises about 40 to 50 wt % of dry wood and is partially crystalline. The crystalline regions have a space group symmetry of $P2_1$ with parameters of a=16.34, b=15.72, c=10.38 Á, and gamma=97.0°. A unit cell contains eight cellibiose moieties and the molecular chains pack in layers which are held together by van der Waals' bonds. The cellulose molecules are unbranched chains with 8–10,000 glucose residues in a typical wood. There is considerable molecular weight distribution and variation between species and individuals.

In the mature cell, partially crystalline cellulose is aggregated into larger structural units called elementary fibrils which, in turn, form threadlike aggregates known as microfibrils which aggregate into macrofibrils. The microfibrils combine to form sheets of the cell wall which ultimately laminate to form discrete wall layers. In the primary wall the cellulose microfibrils form a layer with a random interwoven network. At the secondary wall the microfibrils tend to be aligned about the fiber axis in a helical fashion at a specific angle (microfibril angle) with respect to the fiber axis. There are three distinguishable layers in the secondary wall each with a specific average microfibril angle (average of several lamella of different orientation). The outermost layer is very thin (about 0.1–0.2 micron) and has an average microfibril angle of about 50° to 70°. The next layer forms the bulk of the secondary wall and is several microns thick. The average microfibril angle is relatively small, usually about 5° to 20°. This layer contributes significantly to the mechanical properties of the wood parallel to the grain. The alignment of microfibrils results in a preferred orientation of cellulose crystallites detectable by x-ray diffraction analysis. The layer closest to the lumen is generally similar to the outermost layer except that it is a little thinner and has an average sublamella microfibril angle of about 60° to 90°.

Both softwood and hardwood fibers have closed ends but small openings in the cell walls allow for fluid conduction from one fiber to another, from fiber to vessel elements, and from fibers to rays. These small voids, termed pits, in the secondary wall occur in adjacent cells opposite from one another forming a pit pair. The pit pairs are separated by a pit membrane which is a remnant of the original primary walls of the cells before the secondary walls were added. This membrane may be either porous (as in softwoods) or nonporous as is generally found in hardwoods. When it is nonporous, fluids must rely upon diffusion to move through the pit from one cell to an adjacent cell rather than by free liquid transport. When a pit appears as a plug of material removed from the cell wall it is called a simple pit. If, on the other hand, the pit has a more elaborate, domelike shape, it is called a bordered pit. Different types of cells typically contain one or the other type of pit. The pits also are arranged in specific patterns on the cell walls and can be used as an identification aid for a particular wood species.

A consequence of the hydrophilic nature of wood is that it will seek to maintain an equilibrium moisture content with the surrounding atmosphere. If sufficient moisture exists, the cell walls swell until a saturation state is reached. This moisture content is called the fiber saturation point. Loss of water from this saturation point (from diffusion and evaporation) results in cell wall shrinkage which translates to bulk wood shrinkage. When the tree is living, the lumens of the wood are generally filled with fluid. Thus, the loss of this free water upon the cutting of the tree does not contribute to shrinkage of the wood. That occurs only because of the loss of water below the fiber saturation point.

Extraneous materials are present in most woods (typically about 5 to 10 wt %) that do not contribute to its structure. Various complex organic chemicals, called extractives, are found which can be removed from the wood by use of solvents. The amount of extractives varies from about 4–10 wt % (up to 20 wt % in unusual cases) depending on species and growing conditions, and can include gums, resins, tannins, oils and starch. They can serve various functions such as intermediates in tree metabolism, defense against microbial attack and food reserves. These organics can impart color, odor and decay resistance to the wood.

Other extraneous materials found are minerals which are drawn from the soil. Elemental analysis has identified calcium, potassium, magnesium, sodium and manganese. Anions include, silicates, carbonates, phosphates and sulfates. The most often found inclusions are calcium crystals or silica grains. Though they are found in some softwoods, crystals normally occur in hardwoods, especially those of tropical origin. The most common are calcium oxalate, but calcium carbonate and calcium phosphate have also been found. Grains of silica are found in many tropical hardwoods and are often responsible for the dulling of cutting tools.

There are many different chemical constituents that form the material referred to as wood. Most, by weight, are of organic nature. If one excludes the minor amounts of minerals and trace metal ions, dry wood has an elemental content of about 50 wt % carbon, about 44 wt % oxygen and about 6 wt % hydrogen.

Some extremes exist in the plant kingdom as far as composition is concerned. One genus, Equisetum, is a remnant of primitive vascular plants which is characterized by jointed hollow stems. The stems are lined with ridges which are rough to the touch due to a covering of small tubercles of a siliceous material. Equisetum, also known as scouring rush, was used by pioneers for the washing of pots and pans. The content of siliceous compounds can be considerably high in such plants.

Wood properties are of considerable importance in the process of selecting a particular piece for a specific application. This may entail choosing between different species based upon properties such as density, stiffness, strength, hardness, permeability, decay resistance, workability, availability or cost.

The composite material which comprises wood has a true density of approximately 1.5 g/cm$^3$. On the other hand, the average bulk density of wood ranges from about 0.16 g/cm$^3$ for balsa (*Ochroma pyramidale*) to about 1.14 g/cm$^3$ for lignum vitae (Guaiacum spp.). A species with a bulk density of 0.5 g/cm$^3$ (a typical density for many species) is therefore 66% void by volume. The bulk density is quite variable within a species owing to both variations in moisture content and the ratio of earlywood to latewood. Also a contributing factor is the ratio of heartwood to sapwood. All other factors being constant, the bulk density of wood is dependent upon cellular diameters and wall thickness. For example balsa has very large fibers with thin walls which is contrasted by northern red oak (*Quercus rubra*) which has fibers of small diameter and very little void space in the lumen.

The wood precursors used in accordance with the preferred embodiment of the present invention are cut from the desired species of tree and dried. Kiln drying is particularly suitable. The dried wood is then cut to shape, allowing for shrinkage during the carbonization process. The wood may be cut to any desired shape. For example, the wood may be cut into pieces having lengths of greater than about 1 inch. Such pieces may have widths of at least about 0.5 inch, and may have heights of at least about 0.1, 0.25, 0.5 inch or greater. In many cases, the piece of wood extends at least about 0.5 inch in at least two of the L-R, L-T and R-T planes. As a particular example, the piece of wood may extend at least about 0.5 inch in each of the L-R, L-T and R-T planes. The precursor wood pieces used in accordance with the present invention may have any suitable maximum size depending on the desired end use. Thus, relatively large blocks, sheets, strips, rods and other shapes may be carbonized according to the present method.

After the appropriate size and shape has been selected, the piece of wood is preferably heated in an inert atmosphere to achieve carbonization. The inert atmosphere is preferably non-oxidizing, e.g., containing less than 5 volume % $O_2$ gas, preferably less than 1 volume % and more preferably less than 1000 ppm $O_2$ gas. Suitable non-oxidizing atmospheres include vacuums, inert gases and noble gases. Nitrogen is a particularly preferred non-oxidizing medium. The piece of wood may be heated at subatmospheric, atmospheric and superatmospheric pressures, and combinations thereof. The use of substantially atmospheric pressure is suitable for many operations.

The piece of wood is heated in the substantially non-oxidizing atmosphere to a sufficient temperature at a sufficiently slow heat-up rate to carbonize the wood while substantially maintaining the cellular structure of the precursor wood. The piece of wood is preferably heated to a temperature of at least about 300° C. up to a temperature of about 1500° C. or higher. Where graphitization is desired, temperatures of at least about 2000° C. may be used. However, in one embodiment, graphitization catalysts may be used to reduce the temperature required for graphitization to less than about 2000° C. as more fully described below. Heating to a temperature of from about 400 to about 1000° C. is particularly suitable for achieving carbonization of most wood pieces. Maximum temperatures of from about 500 to about 700° C. typically achieve the desired degree of carbonization without the necessity of reaching extremely high temperatures.

During the heating process, sufficiently slow heat-up rates are used to avoid macro cracking of the wood and to maintain its cellular structure. Heat-up rates of less than about 20° C./hour are preferred, particularly between the temperatures of about 200 and about 400° C. In accordance with the present invention, a sufficiently slow heat-up rate between the temperatures of 200 and 400° C. has been found to produce the desired cellular structure in the resultant carbonized wood. The heat-up rate is preferably from about 1 to about 10° C./hour between the temperatures of 200 and 400° C. Heat-up rates of from about 2 to about 5° C./hour are particularly suitable within this temperature range. After a temperature of about 400° C. has been reached, heat-up rates of less than about 20° C./hour are preferred. For example, where a piece of wood is heated to a maximum temperature of from about 500 to about 1000° C., it is preferably heated at a rate of less than about 20° C./hour between the temperature of about 400° C. and the maximum temperature.

The piece of wood may be heated to an initial temperature of from about 50 to about 100° C. for at least about 0.5 hour to dry the wood prior to carbonization. Thus, while kiln-dried wood of relatively low moisture content may be used as the wood precursor, it may be dried further at elevated temperatures prior to heating to the carbonization temperature of at least about 400° C., for example.

The carbonized wood may be at least partially converted to graphite by heating to high temperatures of at least about 2000° C., typically 2500° C. Alternatively, in accordance with an embodiment of the present invention, the precursor wood may incorporate a graphitization catalyst which facilities conversion of the carbonized wood to graphite at lower temperatures, e.g., less than about 2000° C. Preferred graphitization catalysts comprise elements such as Cr, Cu, Ni, B, Ti, Zr and Fe. For example, the precursor wood may be treated with a wood preservative comprising at least one of these elements which acts as a graphitization catalyst. A suitable wood preservative comprises copper chrome arsenate which, when impregnated into the wood prior to the present heat treatment process, reduces the temperature required for graphitization.

Upon carbonization, the piece of wood may undergo various degrees of shrinkage. For example, some wood species may shrink from about 20 to about 25% in the axial direction upon carbonization. Shrinkage of from about 20 to about 35% in the radial direction and from about 20 to about 40% in the tangential direction is typical.

Various cooling rates may be used in accordance with the present invention to reduce the temperature of the carbonized wood. Cooling rates of less than about 100° C./hour may be used. However, for some applications such as activated carbon, cooling rates of greater than about 100° C./hour may be utilized.

After the carbonized wood has been cooled, it may be shaped by conventional wood-working techniques. For example, the carbonized wood may be cut by processes such as sawing, drilling, routing, milling, turning, grinding, sanding and the like.

In one aspect of the present invention, the pores of the carbonized wood may be at least partially filled with materials such as metals, polymers, carbon and ceramics. Suitable metals include magnesium and other metals which do not adversely react with the carbon cellular structure. Suitable polymers include thermosetting resins and thermoplastic resins such as phenolformaldehyde, polyetheretherketone (PEEK), polytetrafluoroethylene, polymethylmethacrylate (PMMA), and the like. Epoxies, phenolics and pitch are particularly suitable polymers for at least partially filling the voids of the carbonized wood. Where the polymer is subsequently converted to carbon to form a carbon—carbon composite, phenolic resin polymers may be preferred.

In an alternative embodiment, the carbonized wood may be at least partially converted to a ceramic such as silicon carbide. The ceramic substantially retains the cellular structure of the precursor wood, including its porous structure. The pores of the ceramic material may optionally be at least partially filled with a metal. Alternatively, the pores of the ceramic may be at least partially filled with a ceramic material. For example, the pores of a silicon carbide material may be filled with residual silicon, which is converted to silicon nitride by reaction with nitrogen.

A variety of wood species were selected for processing in accordance with the present invention. These were cut to various sizes and thermally treated in one of several furnaces. The objective was to produce monolithic pieces of carbonized wood, substantially free from the cracks normally associated with wood charcoal. Characterization of the resulting materials was done by measurement of length changes, bulk density, helium density, acoustic velocity, mechanical properties and crystallinity by x-ray diffraction. Thermal analysis by DTA/TGA was also performed. In addition to producing monolithic carbonized wood, conversion to composites and ceramics was also performed.

The wood chosen for this work was obtained from a specialty lumber supplier and was selected based on straightness of grain, and absence of knots or decay. All pieces were room dry (approximately 12%) and visually crack-free. Where possible, boards thicker than 3.8 cm were used, but dimensions differed among various species. Samples were cut from these boards with a 25 cm power miter saw equipped with a smooth cutting carbide-tipped combination blade. When wood cubes were made for testing, the grain was oriented such that the cube faces corresponded to the LR, LT and RT planes, as shown in FIGS. 2 and 3. Wood with little curvature or variation in growth rings was also selected for the cubes. A list of some of the wood species used in accordance with the present invention is provided at Table 1.

TABLE 1

Latin and Common Names of Wood Species

| Latin Name | Common Name |
| --- | --- |
| Acer saccharum | maple, hard maple, sugar maple, bird's-eye maple |
| Guaiacum spp. | lignum vitae |
| Juniperus virginiana | Eastern redcedar |
| Liriodendron tulipifera | poplar, tulip poplar |
| Nyssa sylvatica | black tupelo |
| Ochroma pyramidale | balsa |
| Pinus spp. | Southern yellow pine, yellow pine |
| Pinus strobus | Eastern white pine, white pine, pine |
| Quercus alba | white oak |
| Quercus rubra | Northern red oak, red oak |
| Sequoia sempervirens | redwood |
| Swietenia spp. | mahogany, Central American mahogany |
| Tectona grandis | teak |
| Tilia americana | basswood, American basswood |

Figure 4:
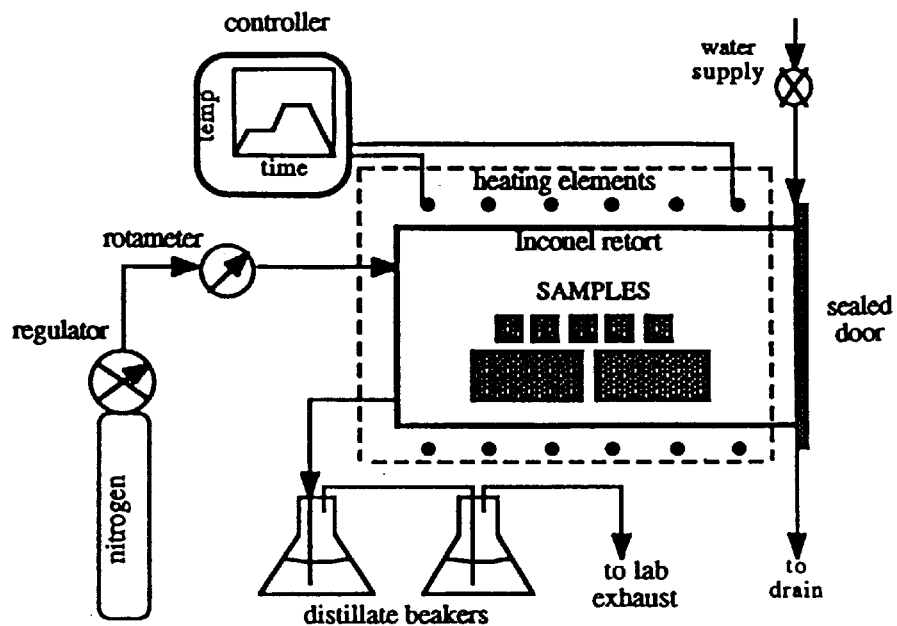
FIG. 4 is a schematic illustration of an apparatus used to carbonize wood in accordance with the present invention.

Three different furnaces were utilized. The furnace used in many of the carbonization runs was a Rapid Temp 1218 FL manufactured by CM Inc. It was equipped with an Inconel retort 21 cm wide and high by 42 cm deep. The polymer gasket used to seal the retort door was cooled by a water jacket. Ports allowed for inert gas flow into the sealed retort. The outlet port was connected to a copper tube which passed into a series of two beakers (usually partly filled with water so that bubbling indicated gas flow through retort) to distill some of the evolved vapors before being sent to a laboratory vent. A nitrogen gas cylinder equipped with a pressure regulator served as gas supply and was metered by a calibrated rotameter. A flow rate of 0.5 L/min was used in most examples. Retort pressure was maintained at, or slightly above, ambient. The furnace controller allowed for temperature ramp and dwell settings. The maximum operating temperature of this furnace (referred to as "retort furnace") was 1200° C. FIG. 4 is a schematic illustration of this setup.

Figure 5:
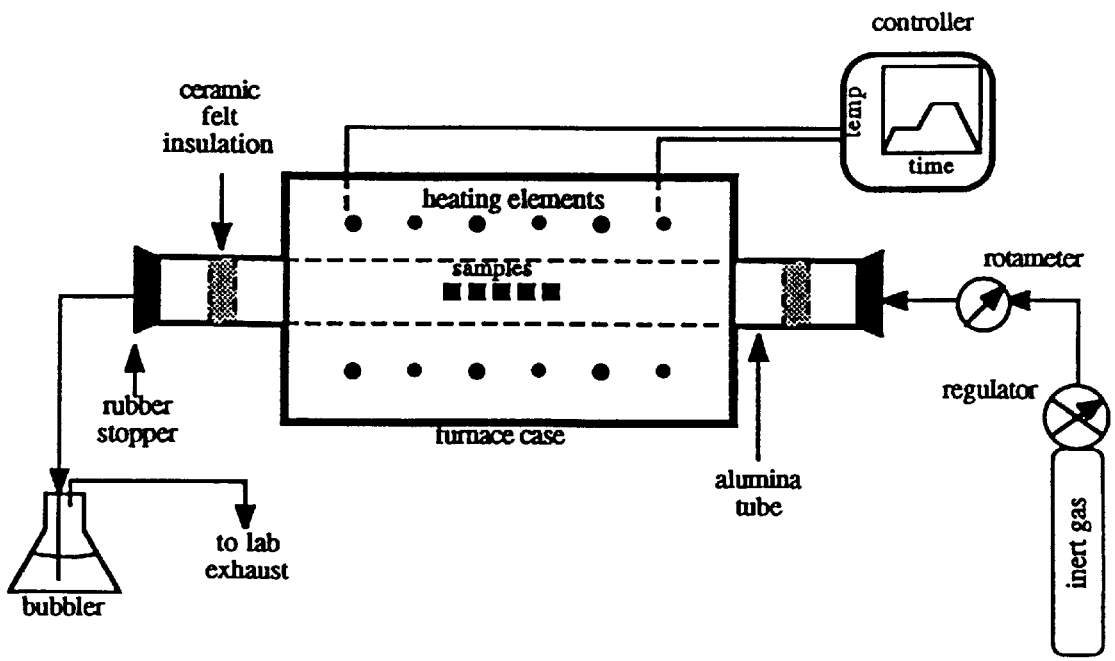
FIG. 5 is a schematic illustration of another apparatus used to carbonize wood in accordance with the present invention.

The second furnace used had a maximum temperature of 1600° C. It was a Rapid Temp tube furnace (model 830426) equipped with either an alumina or mullite ceramic tube (referred to as "tube furnace"). The tube diameter was 5.8 cm with a furnace length of 70 cm and a hot zone 16 cm long. Tube ends were sealed with rubber stoppers with through holes for copper tubing. Stoppers were held in place with springs. Ceramic felt insulation was placed just inside the ceramic tubes to prevent the rubber from overheating. This insulation was porous so that gas flow could be maintained. On the outlet end of the tube furnace vapors were passed through Tygon tubing to a bubbler beaker to indicate gas flow. Inert gas was supplied to the inlet end of the furnace tube by regulator equipped cylinders. Gas flow was controlled by a calibrated rotameter. Tube pressure was maintained at, or slightly above, ambient. For this furnace molydisilicide resistance heating elements were energized by a phase-angle fired SCR without current limiting. Because of this, heating rates had to be kept to a minimum to avoid overcurrent to the elements. Slow heating rates (240° C./hr) were also used to prevent thermal shock of the ceramic tubes. Furnace controller allowed multiple temperature ramps and dwells. FIG. 5 is a schematic illustration of the tube furnace.

Figure 6:
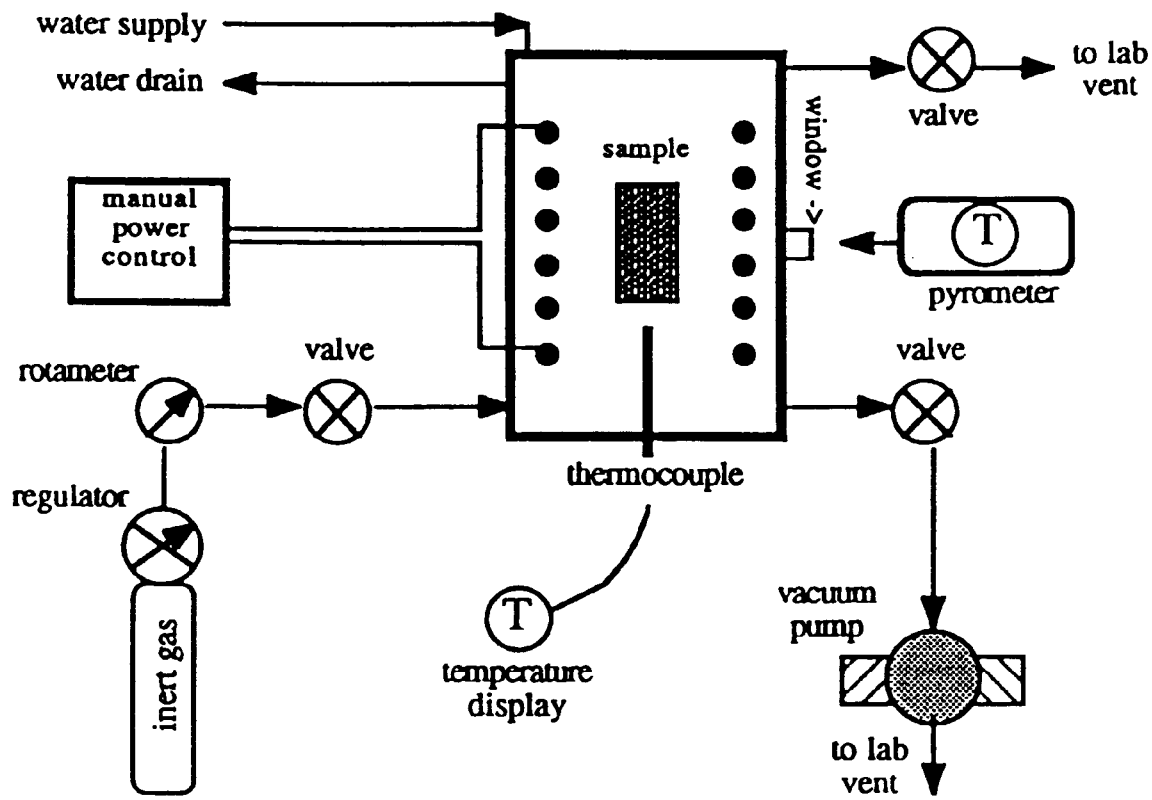
FIG. 6 is a schematic illustration of a further apparatus used to carbonize wood in accordance with the present invention.

The third furnace used was an Astro Industries Group 1000 Graphite Element Furnace (referred to as "graphite furnace"). The maximum temperature was 2500° C. which was attained by graphite resistance elements. This furnace had a hot zone of 11.4 cm diameter and 12 cm high, and was gas fed by a rotameter and outlet vented to laboratory exhaust. Vacuum capability allowed for evacuation of air prior to heating which was typically performed in nitrogen at, or slightly above, ambient pressure. The temperature was manually controlled by adjustment of element power. Temperature was measured with either a graphite/graphite-boron thermocouple or a two-color pyrometer (Ircon Modline type R-99005). The upper end of the temperature range of the thermocouple was 2000° C., and the pyrometer, 2200° C. Pyrometer readings of 2500° C. were observed and considered to represent the target temperature within 50° C. FIG. 6 schematically illustrates the graphite furnace setup.

Helium density measurements were performed by weighing the sample mass (0.1 mg resolution) and then using a pycnometer for determining open pore volume. A stereopycnometer (Quantachrome Corporation) was employed with helium gas supply at 18 psig. An attached mechanical vacuum pump enabled samples to be degassed prior to volume measurement. Volume measurements were performed at ambient temperature, and a high pressure of approximately 18.0 psig and low of 0.0 psig. Samples were typically measured whole and after grinding with mortar and pestle. Measurements of lump silicon and graphite flakes gave results which were close to their theoretical densities.

Bulk density was done by measuring sample mass, and dividing by volume determined from dimensions measured with micrometer (0.0005 inch resolution). Samples were measured before and after carbonization to obtain shrinkage data. Wood was measured at room dry conditions (approximately 12%).

Ultrasonic velocity was measured by contact methods. The equipment consisted of a Panametrics 5055 PR spike pulser/receiver and a Hewlitt Packard model 1743A 100 MHz two channel analog oscilloscope equipped with a delta time function. Two compressional wave resonance transducers with center frequencies of 1.0 MHz and diameters of 1.25 cm were used (Ultran WC50-1). Coupling to specimen was through either a liquid (Sonotech) or a polymer film (Parafilm). The through transmission technique allowed for adequate signal to noise in the attenuative samples (especially in transverse direction). Time of flight was measured by overlapping the first significant break in the received signal with the zero (in time) reference point on the transmitting signal. The zero reference point was established by putting the transducers in contact and observing the resulting change in the transmitting transducer signal. The point where the transmitting signal first indicated a change was used for the zero time reference. The accuracy of this technique for time of flight values was found to be satisfactory.

Thermal analysis was performed on sawdust obtained from scraping wood specimens (other powders were also analyzed). A TA Instruments SDT 2960 simultaneous DTA-TGA was used with inert gas flow monitored by a calibrated rotameter. Sample cups used were either of platinum or alumina, depending on the temperature of the particular test. Gas flow rates and temperature ramp rates were chosen for each specific test.

Crystal phase identification was conducted by conventional x-ray diffraction techniques. Samples were either ground or scanned whole. The equipment used consisted of a GE goniometer, an x-ray tube fitted with a copper anode, and a Diano Corporation generator control, amplifier, and pulse height selector. X-ray bandwidth was reduced by filtering with a nickel foil. The system had a computer controlled upgrade package from Materials Data Incorporated. It consisted of a Databox microprocessor which controlled goniometer movement, and collected x-ray intensity data. The intensity versus $2\Theta$ data was down-loaded to a PC for analysis. Jade software, also from Materials Data Inc., was used to match the diffraction scans to files (powder diffraction file, PDF) on a compact disc assembled by the International Center for Diffraction Data (ICDD).

Mechanical testing was done on an MTS 810 load frame in a manner similar to that used for compression testing of thick carbon/epoxy laminates. Specimens were cut to approximately 25 cm in cross-section and 76 cm high. Load was applied parallel to the axial direction of the wood and carbonized wood. Scanning electron and optical microscopies, and x-ray radiography were used for assessing microstructure and uniformity of impregnation, respectively.

Figure 7:
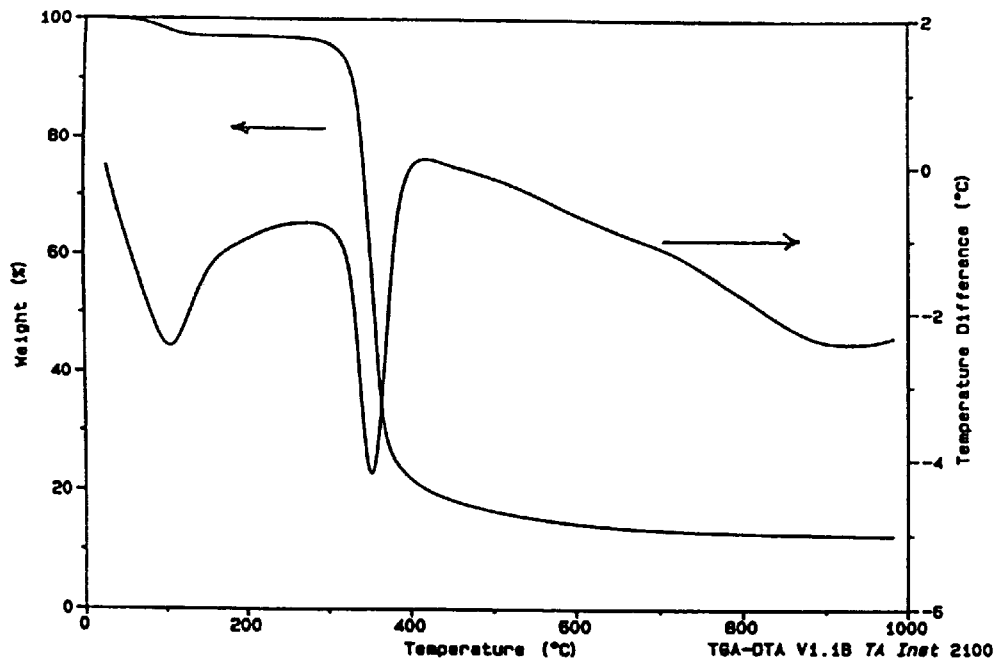
FIG. 7 is a graph of weight and temperature difference versus temperature.

Thermal analysis was performed on several wood species and, in general, little difference in the data was found. Pure regenerated cellulose powder (Aldrich Chemical #31,069-7) was analyzed as a reference for the analysis of wood. The weight and differential temperature are plotted against temperature in FIG. 7. Initial weight loss and endotherm below 100° C. results from loss of moisture. At approximately 300° C. the cellulose begins to decompose and loose considerable weight in an endothermic reaction. The carbonization is essentially complete by 400° C. with a corresponding 80% weight loss. Further heat treatment to 1000° C. results in an additional 6% weight loss (14% carbon yield). The smooth trough-like endotherm, and lack of discontinuities in the weight loss, is typical for polymers decomposing in a continuous reaction (at an even rate).

Figure 8:
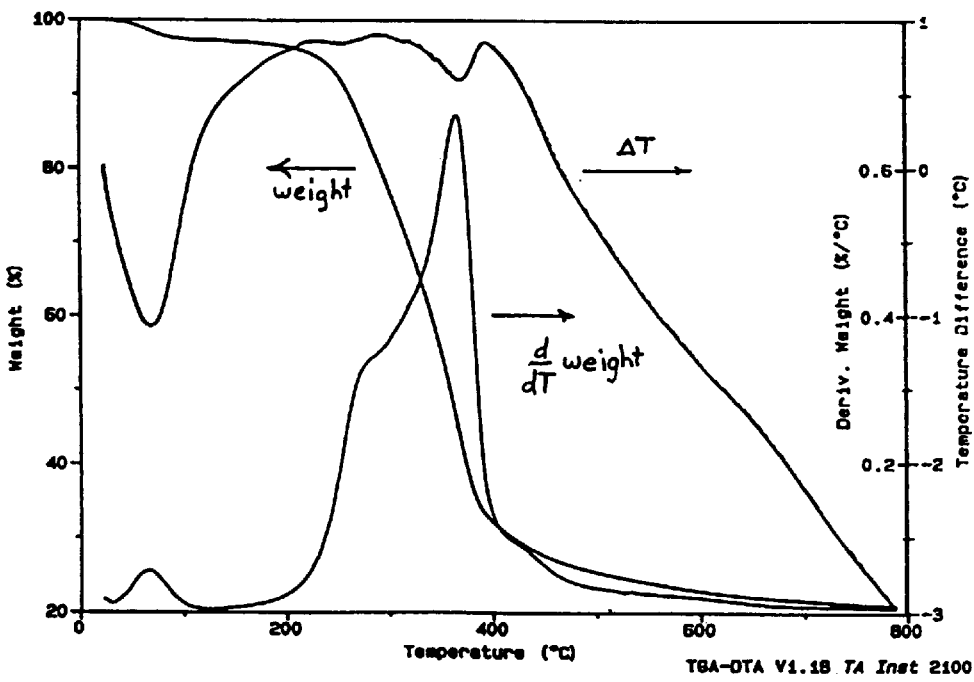
FIG. 8 is a graph of weight and temperature difference versus temperature.

Wood carbonization proceeds through a series of overlapping decomposition reactions. A typical DTA/TGA example is given in FIG. 8 for the carbonization of lignum vitae. An initial weight loss and endotherm corresponds to loss of adsorbed water. Polymer decomposition is indicated by weight loss beginning under 200° C. and is likely the hemicellulose component of the wood. The rate of change in weight loss rapidly rises above 200° C. until approximately 275° C. where a reduction of this rate is found. Presumably, the hemicellulose decomposed in this temperature range. Above 275° C. the rate of change in weight loss again increases and reaches a maximum at 360° C. Here the cellulose has largely decomposed and the lignin components continue to break down. By 400° C. there is a 70% loss in weight and the wood is essentially decomposed. Further heat treatment to 800° C. gives a 21% yield of solid carbon.

All other species analyzed gave similar results, although some variation in yield was detected. Those examples performed with slower furnace ramp rates gave higher yields than those performed at higher ramp rates. There was also some small variation in yield between different species carbonized with similar ramp rates. More quantitative information concerning solid carbon yields was collected by weight measurements of monolithic samples, as discussed below.

The effect of heating rate on monolithic pieces of wood can have an effect on the integrity of the final product. Conventional wood charcoal is broken and cracked due to shrinkage stresses developed from the surface of the material decomposing faster than its interior. This often results when heating rates are too high for a uniform temperature to be maintained in the decomposing wood. Each species will require specific heating rates based on both its density, permeability and thickness. Permeability in this case refers to the mass transfer of gases through the wood. If permeability is very low, by-product gasses build up pressure causing stress within the monolith and alteration of decomposition mechanisms, which may lead to cracking. To illustrate the effect of improper carbonization conditions the following example is given.

A piece of white oak measuring 5×10×15 cm (radial, tangential, axial) was placed in the retort furnace packed with a layer of about 1 cm of sawdust on all sides to promote uniform heating. The furnace was programmed for a temperature ramp rate of 20° C./hr, up to 500° C. The furnace then cooled at 100° C./hr to ambient temperature. The specimen turned out cracked on all sides. Other specimens of basswood, teak, Honduran mahogany, and bird's-eye maple which were cut to similar dimensions and carbonized in the same experiment came out intact and crack-free. It is believed that the abundant tyloses found in white oak which render the heartwood impermeable, also influence the rate at which decomposition vapors escape. This causes pressure buildup, which in turn changes the rate of decomposition of the wood interior causing internal stresses. These internal stresses then lead to cracking of the carbonized wood.

Figure 9:
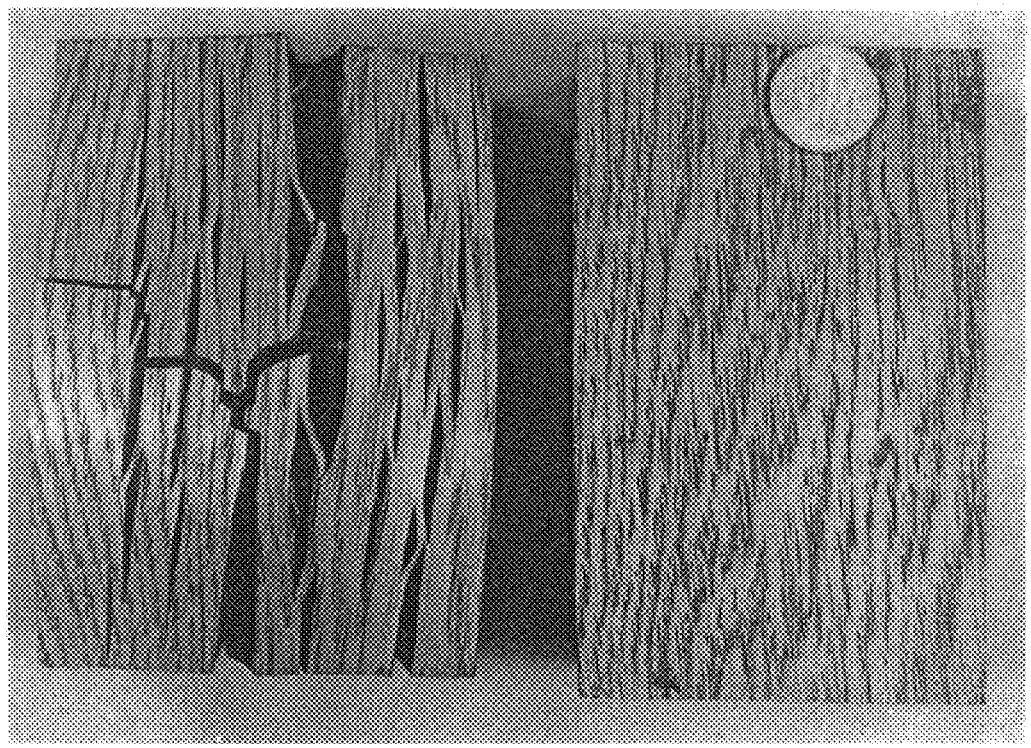
FIG. 9 is a comparative photograph showing a carbonized wood sample having severe macrocracks in comparison with a crack-free sample prepared in accordance with the present invention.

A second piece of white oak from the same board was cut and packed in the furnace in the same manner as the first. A ramp rate of 5° C./hr was used but all other parameters were the same as the first run. The specimen produced was crack-free. A photograph of both specimens is shown in FIG. 9 with the cracked specimen on the left side.

Other large specimens were carbonized by selecting a sequence of temperature ramp and hold segments. The following is the heating schedule used for most of the large pieces:

1) 60° C./hr to 85° C., hold for 2 hrs to thoroughly dry the wood;
2) 5° C./hr to 200° C.;
3) 3° C./hr to 400° C.;
4) 10° C./hr to 600° C.;
5) 50° C./hr to room temperature.

The following wood specimens were carbonized using this schedule with a nitrogen flow rate of 0.5 L/min: red oak (3.5×8×37 cm); basswood (4.7×6.7×37 cm); black tupelo (6.25×20×20 cm); bird's eye maple (3.3×8×15 cm); bamboo (40 cm long by 2 cm diameter).

Figure 10:
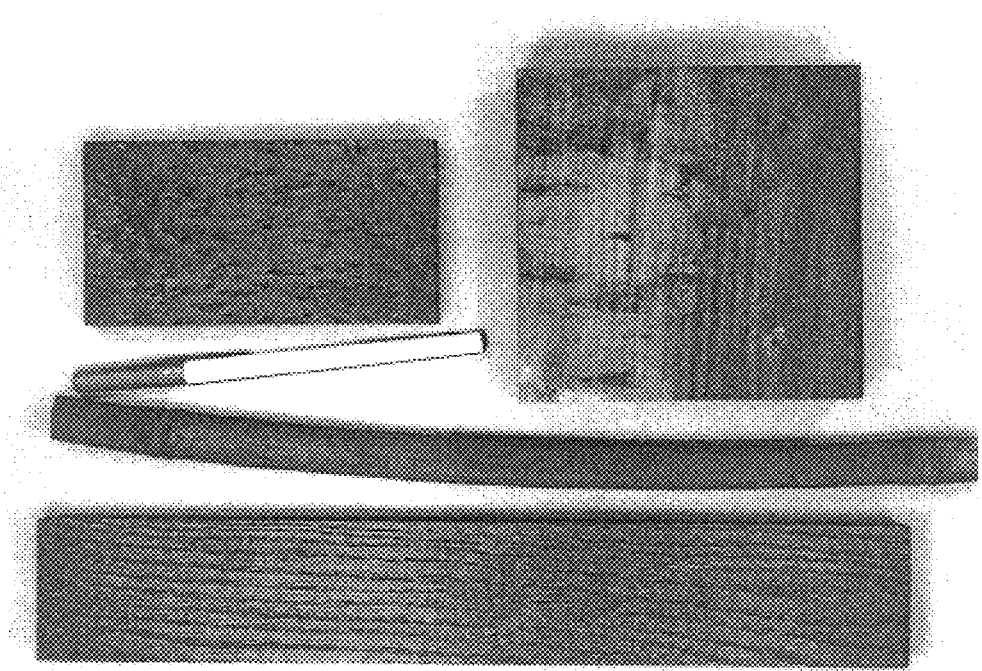
FIG. 10 is a photograph of various carbonized wood articles produced in accordance with the present invention.

All of these specimens turned out crack-free. Variation of dimensions in some specimens resulted from non-uniform shrinkage due to the orientation of grain. The result was a limited amount of warpage and twisting. The specimens were then machined to uniform dimensions on a machinist's mill fitted with a ceramic grinding wheel. Some of these are shown in FIG. 10.

Most of the carbonized specimens were of uniform, straight grain. One example was performed on Eastern red cedar which contained live, or intergrown, knots. Specimens 2×12×12 cm were packed in sawdust and carbonized with a slightly faster heating rate than described above (100° C./hr to 90° C., hold 3 hrs, 10° C./hr to 200° C., 5° C./hr to 400° C., 15° C./hr to 600° C., cool 100° C./hr to ambient). These specimens turned out crack-free, but with some warping. The knots and the wood grain around them carbonized without visual signs of cracks. This indicates that a large-scale heterogeneity does not necessarily destroy the integrity of the wood during carbonization.

Figure 11:
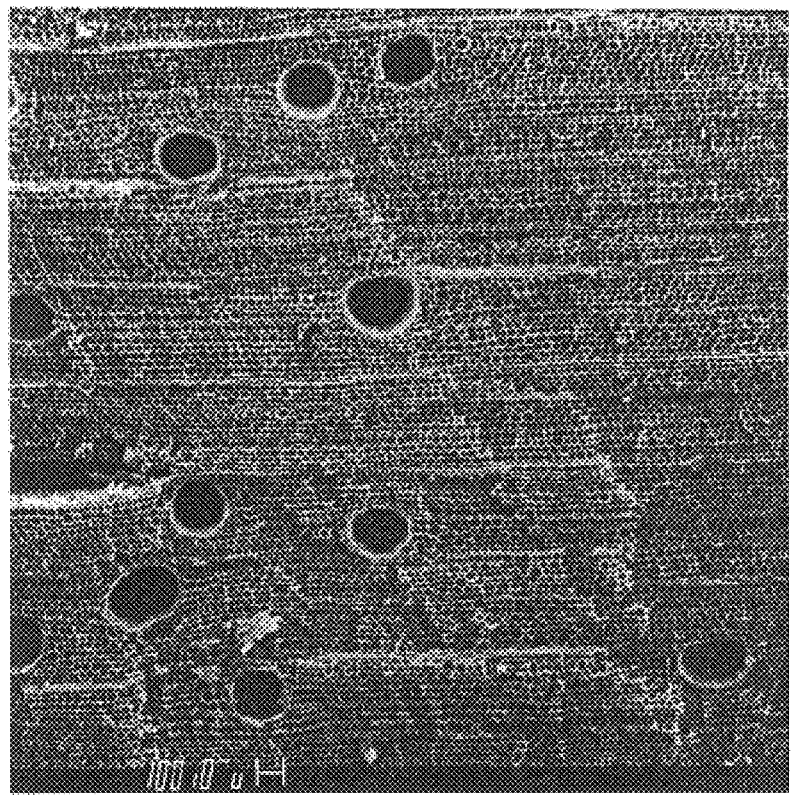
FIG. 11 is a photomicrograph showing the structure of a carbonized wood sample prepared in accordance with the present invention.
Figure 12:
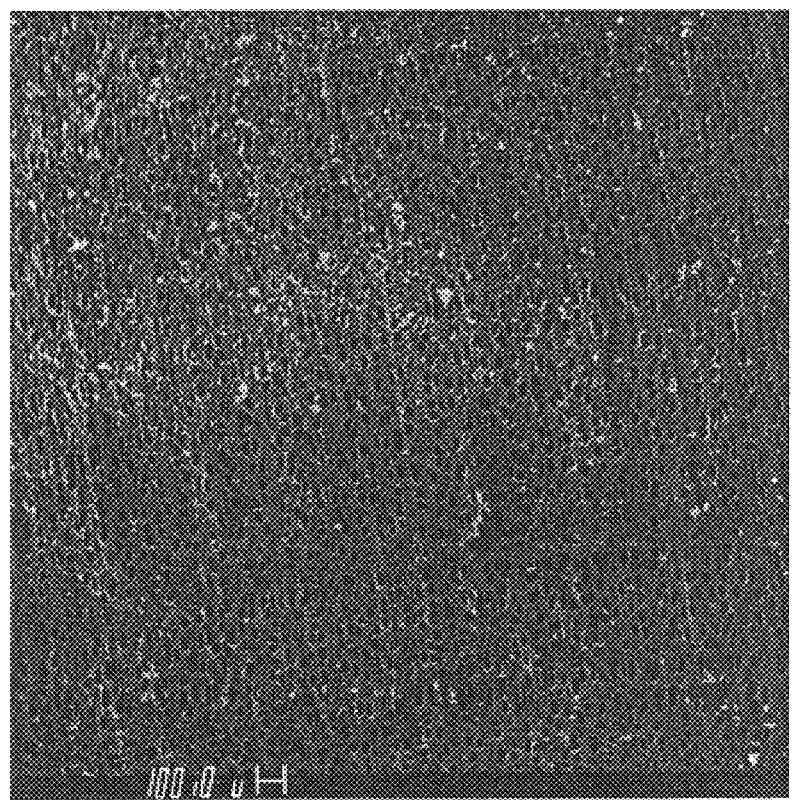
FIG. 12 is a photomicrograph showing the structure of a carbonized wood sample prepared in accordance with the present invention.
Figure 13:
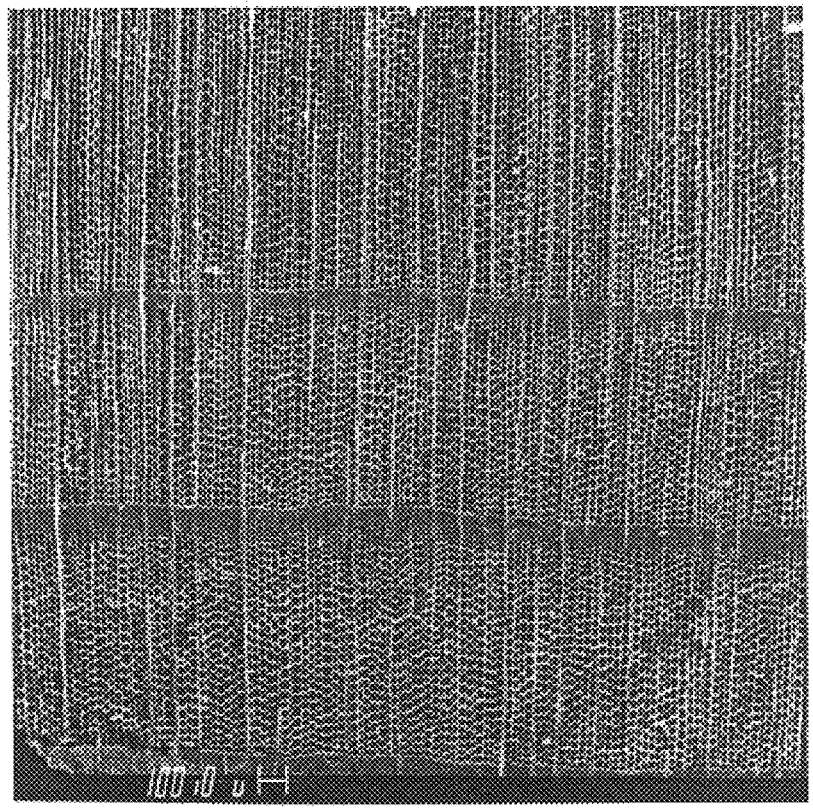
FIG. 13 is a photomicrograph showing the structure of a carbonized wood sample prepared in accordance with the present invention.
Figure 14:
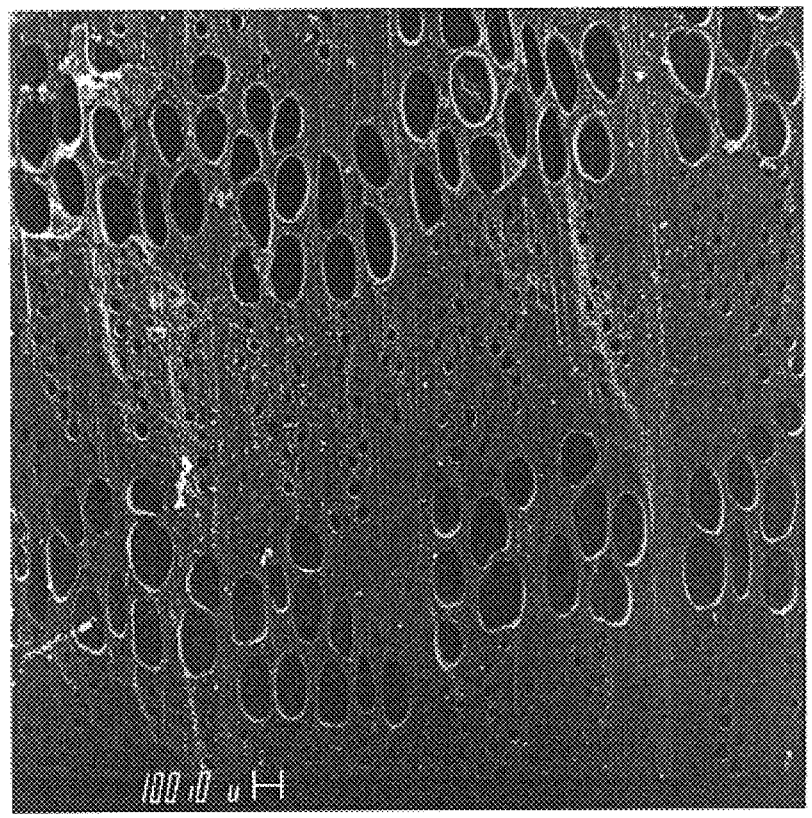
FIG. 14 is a photomicrograph showing the structure of a carbonized wood sample prepared in accordance with the present invention.

Scanning electron microscopy was used in order to give the depth of field or contrast needed to fully investigate the morphology of the anatomical features. The specimens to be examined were heat treated to 900° C. to increase electrical conductivity and thus avoid charging by the electron beam. Many species and orientations were observed in this manner. The specimens were prepared by scoring a surface, followed by applying pressure or impact to the opposite side. This method created a slightly rough and non-planar surface. When examined, all anatomical features of the species were identified and found to be intact, without any evidence of macrocracking. The observations confirmed that carbonization of wood results in a solid carbon material which retains all of the anatomical features of the precursor. Photomicrographs of a representative group of these porous carbons are shown in FIGS. 11–14. FIG. 11 is carbonized balsa wood, while FIG. 12 is carbonized basswood. FIGS. 13 and 14 are carbonized redwood and carbonized red oak, respectively.

Carbonization of a set of seven species representing a wide range of wood bulk densities was performed. All wood specimens were cut to cubes measuring approximately 2.54 cm between faces and weighed. Dimensions and acoustic velocities in each of the three principal directions were measured before and after carbonization. Carbonized specimens were weighed immediately after removal from furnace. Helium density was attempted on several carbonized species (whole specimens) but drifting of pressure readings for all but the hard maple made values unreliable. This was alleviated by grinding samples to a powder. Carbonization was performed in the retort furnace with a heating schedule of 15° C./hr to 900° C., hold 0.5 hr, cool 50° C./hr to room temperature with a nitrogen flow rate of 0.5 L/min. Reduction in dimensions, bulk densities before and after, and mass yield were determined and are presented in Table 2.

The carbon yield obtained from these specimens ranged from 24.77% for basswood to 32.48% for lignum vitae. The average carbon yield for the seven species was 28.04%. These yields are considerably higher than those obtained from thermal analysis experiments. This can be explained by considering the heating rates used. The thermal analysis experiments are performed with relatively fast heating rates compared to those used for the carbonization of monolithic pieces (600° C./hr vs. 15° C./hr). Slower heating rates increase the probability of cross-linking and cyclization of the decomposing polymers and reduces the volatilization of organic molecules from the condensed phase.

TABLE 2

Data From Carbonization of Various Wood Species

| Lignum Vitae (3 each) | | Hard Maple (8 each) | | Red Oak (7 each) | | Basswood (6 each) | | White Pine (9 each) | | Redwood (9 each) | | Balsa (7 each) | |
|---|---|---|---|---|---|---|---|---|---|---|---|---|---|
| mean | st dev | mean | st dev | mean | st dev | mean | st dev | mean | st dev | mean | st dev | mean | st dev |
| Wood Density (g/cm$^3$)* | | | | | | | | | | | | | |
| 1.297 | NA | 0.7426 | 0.0042 | 0.7043 | 0.0156 | 0.5167 | 0.0101 | 0.3987 | 0.0088 | 0.3656 | NA | 0.0111 | NA |
| Carbonized Wood Density (g/cm$^3$)* | | | | | | | | | | | | | |
| 1.033 | NA | 0.5861 | 0.0049 | 0.5440 | 0.0152 | 0.4035 | 0.0076 | 0.2958 | 0.0077 | 0.2707 | NA | 0.0673 | NA |
| Axial Reduction in Length (%)** | | | | | | | | | | | | | |
| 21.67 | NA | 21.40 | 0.2564 | 20.69 | 0.1676 | 21.83 | 0.0516 | 23.48 | 0.2108 | 22.10 | NA | 21.80 | NA |
| Radial Reduction in Length (%)** | | | | | | | | | | | | | |
| 26.80 | NA | 28.90 | 0.5707 | 28.56 | 0.3457 | 33.85 | 0.3082 | 28.92 | 0.2774 | 35.30 | NA | 23.10 | NA |
| Tangential Reduction in Length (%)** | | | | | | | | | | | | | |
| 28.83 | NA | 39.98 | 0.3412 | 37.60 | 0.1633 | 38.77 | 0.3266 | 35.44 | 0.4770 | 30.40 | NA | 20.10 | NA |
| Yield (%)*** | | | | | | | | | | | | | |
| 32.48 | NA | 26.48 | 0.0807 | 27.74 | 0.0368 | 24.77 | 0.1608 | 26.06 | 0.2088 | 29.72 | 0.5676 | 29.01 | 0.3614 |
| Helium Density of Powder (g/cm$^3$)•• | | | | | | | | | | | | | |
| NA | | 1.984 | | NA | | NA | | 1.972 | | 2.034 | | NA | |

NA: Data not available. Because specimen identification was lost, standard deviations were not available for redwood or balsa.
*Bulk density of specimen in g/cm$^3$
**Reduction of dimension of room dry wood to 900° C. HTT char, in percent of original dimension
***Yield based on mass loss from room dry wood to 900° C. HTT char, in percent of original mass
••Helium density from samples ground to powder, in g/cm$^3$
Carbonization conditions: Heat 15° C./hr to 900° C., hold 0.5 hr, cool 50° C./hr to room temperature. Nitrogen flow rate 0.5 L/min, pressure slightly above atmospheric.

Figure 15:
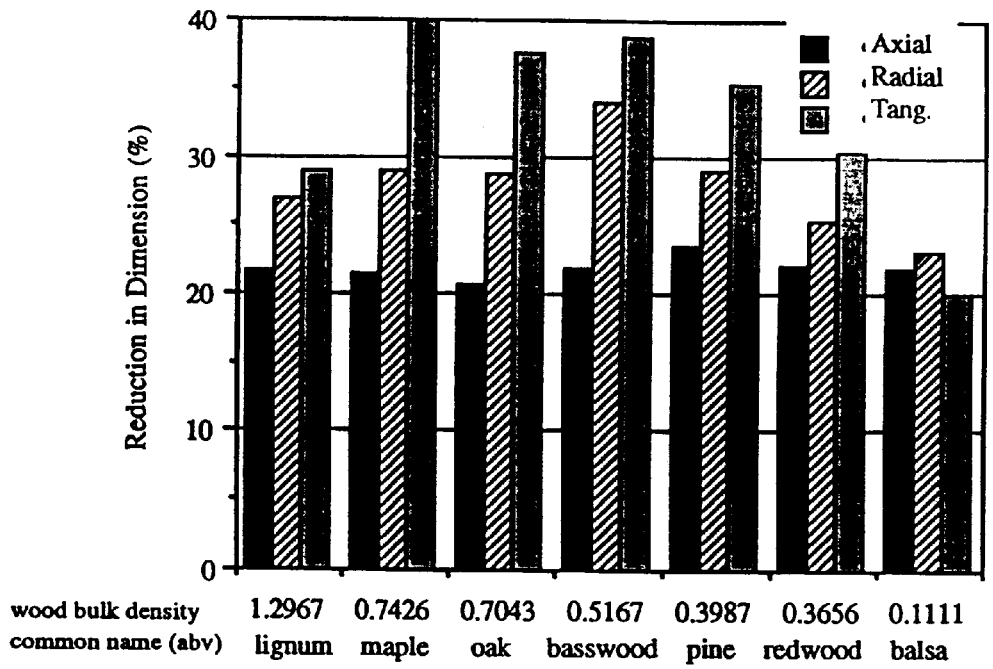
FIG. 15 is a graph illustrating reduction in dimension in the axial, radial and tangential directions for various species of wood.

Reduction of dimension from carbonization in each species was anisotropic with the exception of balsa, which was nearly isotropic. The data are presented in FIG. 15 as percent reduction plotted according to bulk wood density. The percent reduction in the axial direction for all species averaged 21.86% with a standard deviation of 0.85%.

While not intending to be bound by any particular theory, it is proposed that the microfibrils dominate the longitudinal (axial) dimensional change when wood is carbonized (when no boundary restrictions are imposed). A preferred orientation of small graphitic layers may occur in the carbonized wood. The alignment of molecules is not perfect, and there is likely to be cross-linking and variation in the cellulose decomposition reactions. Additional factors are likely to contribute in wood due to the many polymers which simultaneously decompose.

The dimensional changes due to carbonization in the radial and transverse directions reflect that shrinkage is greatest in the tangential direction. Dimensional changes for all woods carbonized was greatest in the tangential direction except for balsa which showed essentially isotropic shrinkage. Maple, which is a diffuse-porous hardwood with numerous rays, showed the greatest tangential shrinkage from carbonization. Basswood, also a diffuse-porous hardwood, showed high transverse shrinkage and the highest radial shrinkage. The data for redwood, which has an abrupt earlywood to latewood transition and dense latewood, demonstrates less transverse shrinkage.

Figure 16:
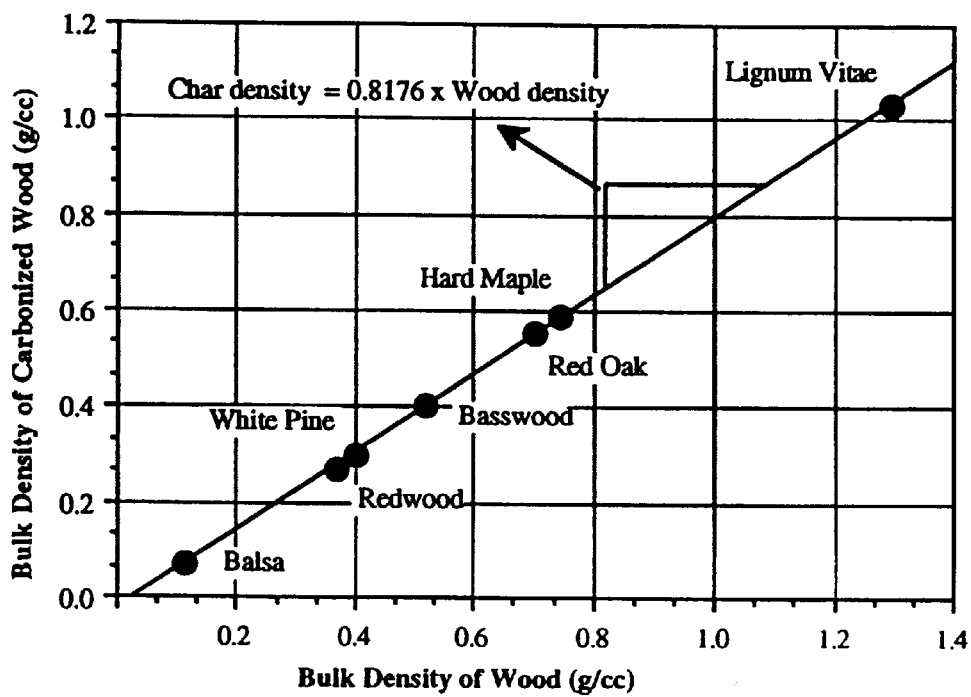
FIG. 16 is a graph showing bulk density of carbonized wood versus bulk density of precursor wood for various species.

The various species of wood demonstrated a reduction in bulk density due to carbonization. The results listed in Table 2 for carbonized wood demonstrate a range in bulk density was found from 0.0673–1.033 g/cm$^3$ for balsa and lignum vitae, respectively. When the measured values for wood bulk density are plotted against those for carbonized wood, a linear relationship is observed, as shown in FIG. 16. The data in FIG. 16 shows that, for the particular pyrolysis conditions, when a monolithic piece of wood is carbonized the resulting char has a bulk density which is about 81.76% that of the precursor. The close agreement of the data points to a linear relationship spans the entire density range of wood species. It is expected that other species would follow the same relationship under similar carbonization conditions. This allows the selection of a particular piece of wood based on the bulk density desired in carbonized wood.

The reduction in bulk volume of the wood species of Table 2 varied from 51.2% for balsa to 68.1% for basswood. Although difficulties were encountered when attempting to measure the helium density of the monolithic chars, a reliable value of 2.022 g/cm$^3$ was determined for the hard maple. A value as high as this suggests that the graphitic layer planes in the solid carbon have many defects which gives the carbonized wood open micro-porosity. The drifting of pressure readings for monolithic specimens of other species indicates a high level of tortuosity in the capillaries of a micro-porous material. With a bulk density of 0.5801 g/cm$^3$ the carbonized hard maple contains 71.3% void.

The specimens were ground to a powder and results became much more reliable for all but balsa wood char. These are listed in Table 2. The discrepancy between the helium density of the monolith and powder of hard maple (0.038 g/cm$^3$) is considered to be within experimental error. The relatively high helium densities of the powders indicates that the solid carbons have layer planes which are open. Heat treatment with carbon monoxide or steam may be done to open up the porosity when an activated carbon is desired.

Acoustic velocities of the seven species of wood and carbonized wood are presented in Table 3 along with the percent reduction in acoustic velocity. Since a liquid couplant was used for the ultrasonic measurements different specimens of wood and carbonized wood were used. It was found that the axial acoustic velocity in six species was reduced by the carbonization to 900° C. In lignum vitae the axial velocity increased. In all species carbonization caused an increase of acoustic velocity in the radial and tangential directions.

TABLE 3

Acoustic Velocity Data

|  | Lignum Vitae | Hard Maple | Red Oak | Basswood | White Pine | Redwood | Balsa |
|---|---|---|---|---|---|---|---|
| longitudinal, wood* | 4.27 | 5.54 | 6.01 | 6.11 | 5.88 | 5.92 | 5.05 |
| longitudinal, char* | 4.39 | 4.52 | 4.70 | 4.73 | 4.43 | 4.44 | 4.01 |
| longitudinal, % loss** | −2.83 | 18.46 | 21.68 | 22.64 | 24.63 | 25.00 | 20.63 |
| radial, wood* | 2.78 | 2.47 | 2.36 | 2.05 | 2.38 | 2.45 | 1.91 |
| radial, char* | 3.87 | 3.67 | 3.53 | 3.04 | 3.13 | 3.01 | 1.93 |
| radial, % loss** | −28.09 | −48.64 | −49.70 | −48.44 | −31.51 | −23.11 | −0.009 |
| tangential, wood* | 2.59 | 1.8S | 1.76 | 1.36 | 1.45 | 2.35 | 1.05 |
| tangential, char* | 3.57 | 2.67 | 2.28 | 1.82 | 1.80 | 3.06 | 1.29 |
| tangential, % loss** | −37.73 | −44.32 | −29.92 | −34.32 | −24.35 | −30.09 | −23.03 |

*Acoustic velocity of compressional wave, in mm/$\mu$s (1 MHz). Average of three specimens
** Reduction in acoustic velocity, in percent of original value. Average of three specimens.
Carbonization conditions: Heat 15° C./hr to 900° C., hold 0.5 hr, cool 50° C./hr to room temperature. Nitrogen flow rate 0.5 L/min, pressure slightly above atmosphere.

The measured acoustic velocities demonstrated that a change in elastic anisotropy occurs with carbonization. The increased radial and tangential velocities may result from an increase in shear moduli due to carbonization. There may also be a change in cellular anisotropy with carbonization of aligned microfibrils in the cell secondary wall.

To study the effects of heat treatment temperature 21 specimens of tulip poplar from the same board were carbonized. Each specimen (cube) was weighed and measured for dimension and acoustic velocity before and after carbonization. Helium density of bulk and powdered carbonized wood was also performed. Sets containing three random specimens were heat treated under similar conditions with each set reaching a different ultimate temperature. The temperatures for heat treatment temperature (HTT) were 400° C., 600° C., 800° C., 1000° C., 1200° C., 1500° C., and 2500° C. Table 4 gives the heating schedules used for these specimens. Each specimen was first carbonized in the retort furnace where they were packed in sawdust. For specimens heated up to 1000° C. that was the only furnace used. For higher temperatures specimens were first carbonized to 1000° C. in the retort furnace. The tube furnace was used to further treat specimens to 1200° C. and 1500° C. The graphite furnace was used to heat specimens from 1000° C. to 2500° C. Nitrogen gas at atmospheric pressure was used in all cases.

TABLE 4

| HTT | Carbonization Furnace Schedule |
|---|---|
| 400° C. | 50° C./hr to 90° C., hold 3 hr, 15° C./hr to 200° C., hold 0.1 hr, 8° C./hr to 400° C., hold 0.1 hr, cool 100° C./hr to ambient. |
| 600° C. | 50° C./hr to 90° C., hold 3 hr, 15° C./hr to 200° C., hold 0.1 hr, 8° C./hr to 400° C., hold 0.1 hr, 20° C./hr to 600° C., hold 0.1 hr, cool 100° C./hr to ambient. |
| 800° C. | 50° C./hr to 90° C., hold 3 hr, 15° C./hr to 200° C., hold 0.1 hr, 8° C./hr to 400° C., hold 0.1 hr, 20° C./hr to 600° C., hold 0.1 hr, 40° C./hr to 800° C., hold 0.1 hr, cool 100° C./hr to ambient. |
| 1000° C. | 50° C./hr to 90° C., hold 3 hr, 15° C./hr to 200° C., hold 0.1 hr, 8° C./hr to 400° C., hold 0.1 hr, 20° C./hr to 600° C., hold 0.1 hr, 40° C./hr to 1000° C., hold 0.1 hr, cool 100° C./hr to ambient. |
| 1200° C. | As for 1000° C. specimens, then from ambient to 1200° C. at 240° C./hr, hold 10 minutes, cool 240° C./hr to ambient. |
| 1500° C. | As for 1000° C. specimens, then from ambient to 1500° C. at 240° C./hr, hold 10 minutes, cool 240° C./hr to ambient. |
| 2500° C. | As for 1000° C. specimens, then from ambient to 1000° C. to 2500° C., cool at about 1000° C./hr. |

All heat treatments in nitrogen atmosphere.

All carbonized specimens were crack free and uniformly reduced in dimensions. That is, there was no warping or twisting from the carbonization. Weight was measured immediately after removal from furnace. The data assembled from dimension and weight measurements along with helium densities are given in Table 5. All values are averages from three equally prepared specimens.

TABLE 5

Dimension and Densiity Values for Carbonization of Tulip Poplar at Different Temperatures

| HTT | wood bulk ρ* | char bulk ρ* | mass yield % | loss of bulk ρ % | bulk He ρ* | powder He ρ* | shrink•• axial % | shrink•• radial % | shrink•• tang. % |
|---|---|---|---|---|---|---|---|---|---|
| 400° C. | 0.5338 | 0.3556 | 31.51 | 9.52 | 1.409 | 1.388 | 10.96 | 21.10 | 32.70 |
| 600° C. | 0.5284 | 0.3620 | 26.97 | 8.80 | 1.500 | 1.524 | 16.14 | 25.86 | 36.70 |
| 800° C. | 0.5316 | 0.4042 | 25.71 | 6.78 | 1.768 | 1.867 | 19.84 | 29.67 | 40.00 |
| 1000° C. | 0.5400 | 0.4203 | 24.85 | 6.44 | 1.778 | 1.971 | 21.16 | 31.59 | 41.26 |
| 1200° C. | 0.5296 | 0.4079 | 24.49 | 6.45 | 1.611 | 1.709 | 21.11 | 31.39 | 41.66 |
| 1500° C. | 0.5327 | 0.4104 | 24.43 | 6.52 | 1.175 | 1.459 | 20.83 | 31.4 | 41.61 |
| 2500° C. | 0.5127 | 0.3950 | 23.67 | 6.04 | 1.197 | 1.434 | 19.46 | 32.71 | 43.31 |

Figure 17:
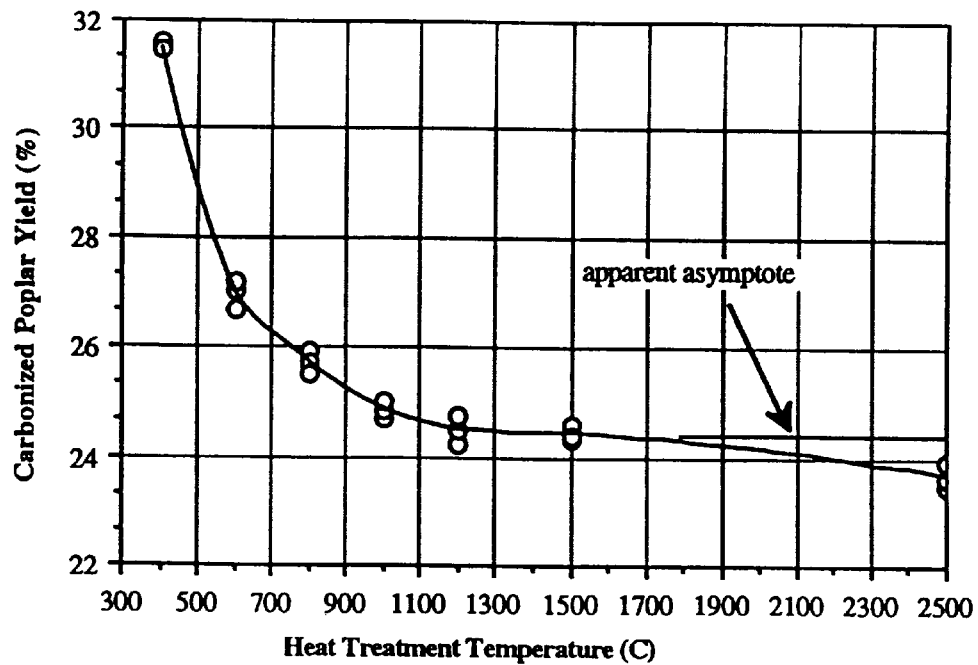
FIG. 17 is a graph of carbonized poplar yield versus heat treatment temperature.

Carbon yield for all specimens is plotted as a function of HTT in FIG. 17. The carbon yield obtained from carbonization diminished rapidly between 400° C. and 1000° C. By 1500° C. yield appeared to level off at 24.40%. Yield recorded for the 2500° C. specimens was considerably lower at 23.67%. The lower yield at 2500° C. could result from the use of the graphite furnace. Faster heating rates could have caused mass loss in excess of that found from heat treatments in the other furnaces. However, the lower yield is likely the result of further decomposition as a result of the extremely high temperature.

Figure 18:
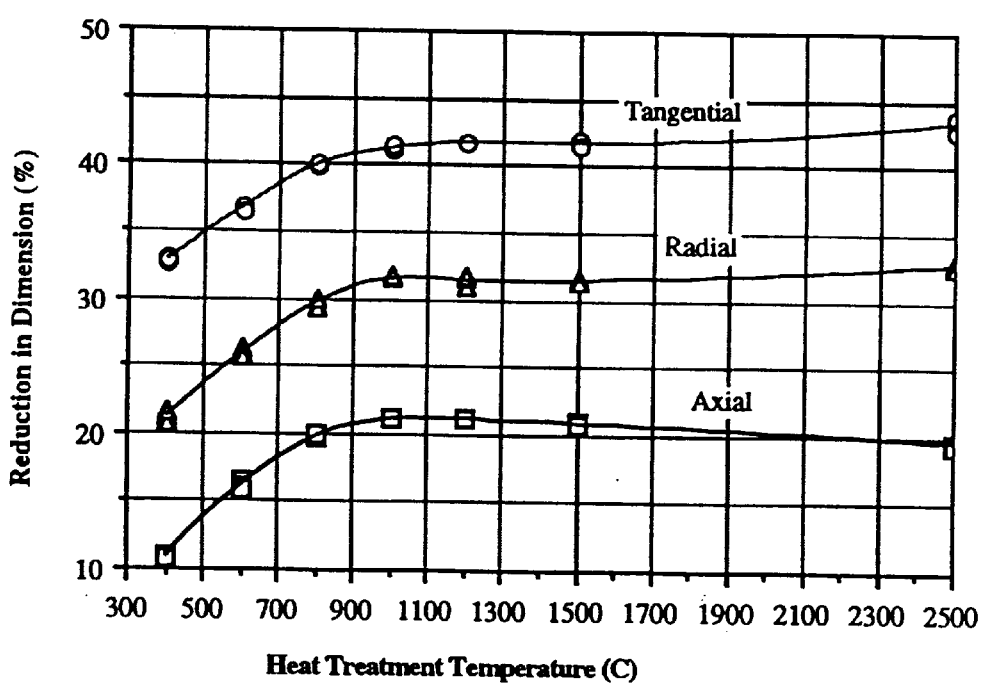
FIG. 18 is a graph of reduction in dimension versus heat treatment temperature for a wood sample in the tangential, radial and axial directions.

The shrinkage of tulip poplar was found to increase with carbonization temperature. As with other species, the reduction in dimension was least in the axial direction, and largest in the tangential direction. The data for all HTT's is shown in the graph of FIG. 18. Just as yield diminished with the highest temperatures, so does the dimension in the tangential and radial directions. However, the shrinkage in the axial direction goes through a maximum between 1000° C. and 1200° C. There is then an increase in axial dimension above 1200° C. while significant shrinkage occurs in the other two principal directions. This growth in dimension while mass is being lost can be attributed to atomic rearrangement in the solid carbon. Density measurement results are consistent with this theory.

The density of the carbonized tulip poplar was measured in three different ways. These values can be found in Table 5. A first feature of note is the fact that the measured helium densities are nearly identical for bulk and powdered specimens carbonized to 400° C. As HTT increases, so does the difference in the measured values. It is postulated that the anatomical features retained in the bulk (monolithic) carbonized wood causes a closing off of micropores by forming an impermeable skin. Grinding to a powder may break this skin and result in increased measured density. The bulk helium density measured at both 1500° C. and 2500° C. are lower than the value obtained with 400° C. specimens. The same phenomena did not occur in the powdered specimens, which reinforces the theory that the carbonized wood morphology causes a closing of the microporosity.

Growth of graphitic layer planes of random orientation would readily cause the reduction in density found in the carbonized tulip poplar. A random orientation of growing layers could not lead to the bulk dimensional changes observed. A preferred orientation in the axial direction could explain both the dimensional and helium density values found as HTT increased. Layer planes aligned in the axial direction of the carbonized tulip poplar may account for the trends in both density and dimension by giving axial growth and closed micropores at the higher temperatures studied. Since mass is lost, and interlayer spacing decreases, some radial and tangential dimension reduction would be expected. In addition, the theory of microfibril dominance for axial shrinkage establishes some degree of preferred orientation of layer planes in the longitudinal principal direction of carbonized wood.

Figure 19:
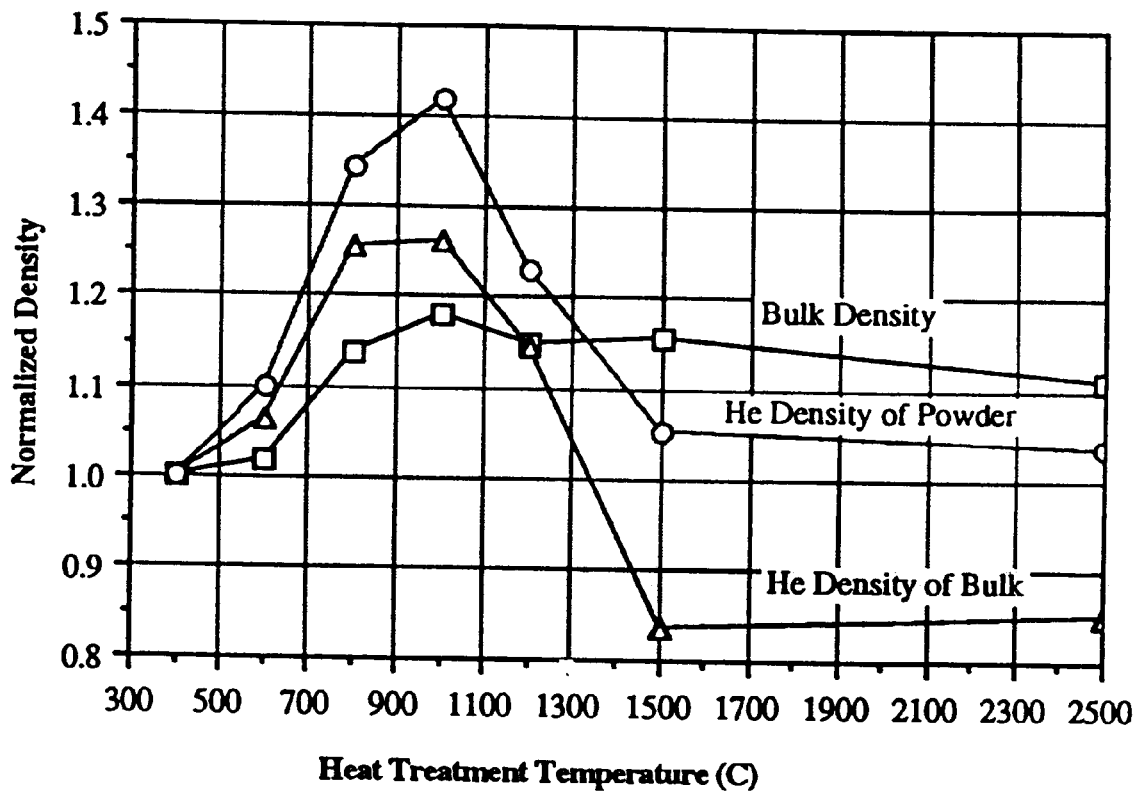
FIG. 19 is a graph of normalized density versus heat treatment temperature.

In FIG. 19, measured quantities for carbonized tulip poplar bulk density, helium density of bulk and helium density of powder, are normalized to their 400° C. value. All densities were found to increase up to 1000° C. At higher temperatures the helium densities dropped to less than, or close to, their value at 400° C. while the bulk density dropped off only slightly. This indicates that the mechanisms involved in restructuring the carbonized wood above 1000° C. affect the morphology of the microstructure much more than the morphology of the macrostructure.

The sets of carbonized tulip poplar were also measured for acoustic velocity in the three principal directions. The average values obtained are listed in Table 6 along with the velocities of the specimens before carbonization.

TABLE 6

Acoustic Velocities for Range of Carbonization Temperatures

| HTT | wood axial* | wood radial* | wood tang* | char axial* | char radial* | char tang* | delta axial•• | delta radial•• | delta tang•• |
|---|---|---|---|---|---|---|---|---|---|
| 400° C. | 5.90 | 2.18 | 1.53 | 2.17 | 1.62 | 0.75 | 172 | 25.8 | 51.2 |
| 600° C. | 5.90 | 2.17 | 1.51 | 2.97 | 2.18 | 1.11 | 98.9 | −0.276 | 26.4 |
| 800° C. | 5.88 | 2.17 | 1.49 | 4.05 | 2.87 | 1.22 | 45.1 | −32.4 | 18.1 |
| 1000° C. | 5.87 | 2.17 | 1.53 | 4.73 | 3.33 | 1.53 | 24.0 | −53.5 | 0.196 |
| 1200° C. | 5.86 | 2.18 | 1.51 | 4.95 | 3.46 | 1.63 | 18.5 | −58.7 | −7.91 |
| 1500° C. | 5.88 | 2.16 | 1.52 | 4.95 | 3.38 | 1.73 | 18.8 | −56.3 | −13.8 |
| 2500° C. | 5.77 | 2.18 | 1.44 | 4.92 | 2.98 | 1.48 | 17.3 | −36.7 | −3.06 |

*Acoustic velocity of compressional wave, in mm/μs (1 MHz). Average of three specimens.
••Reduction in acoustic velocity in percent of original value. Average of three specimens.

All three directions exhibit increasing velocity from the 400° C. value, with increasing carbonization temperatures up to 1200° C. Velocity in the axial direction levels off at approximately 5 mm/µs, a reduction of 15% from the value for wood. Velocities in the tangential and radial directions surpassed the counterpart velocities measured before carbonization by up to 58.7% radially (delta radial and delta tangential in Table 6). These velocities then diminished slightly at higher temperatures, the radial starting at 1200° C. and tangential at 1500° C.

The trends in acoustic velocity with HTT serve to support the mechanism of atomic ordering within the carbonized wood. Acoustic velocity was found to increase above 1000° C. where the powder density measurement begins to decline. A lateral growth of layer planes would account for this divergence in the two parameters. Lateral growth associated with atomic ordering will increase material stiffness if a preferred orientation of layers is present. Increased stiffness is indicated by the increased velocities up to about 1200° C. The decrease in radial and tangential velocities at the highest temperatures may result from growth in layer height within the solid carbon. This is plausible since the reduction in dimensions that occur would suggest shrinking cell diameters which should cause an increase in velocity owing to a shorter path-length which a stress wave traverses. An increase in layer height, with surface normals parallel to the propagation direction, will cause a reduced velocity. Thus, preferred orientation of growing graphitic layers leads to changing physical properties and dimensions in the carbonized wood.

Figure 20:
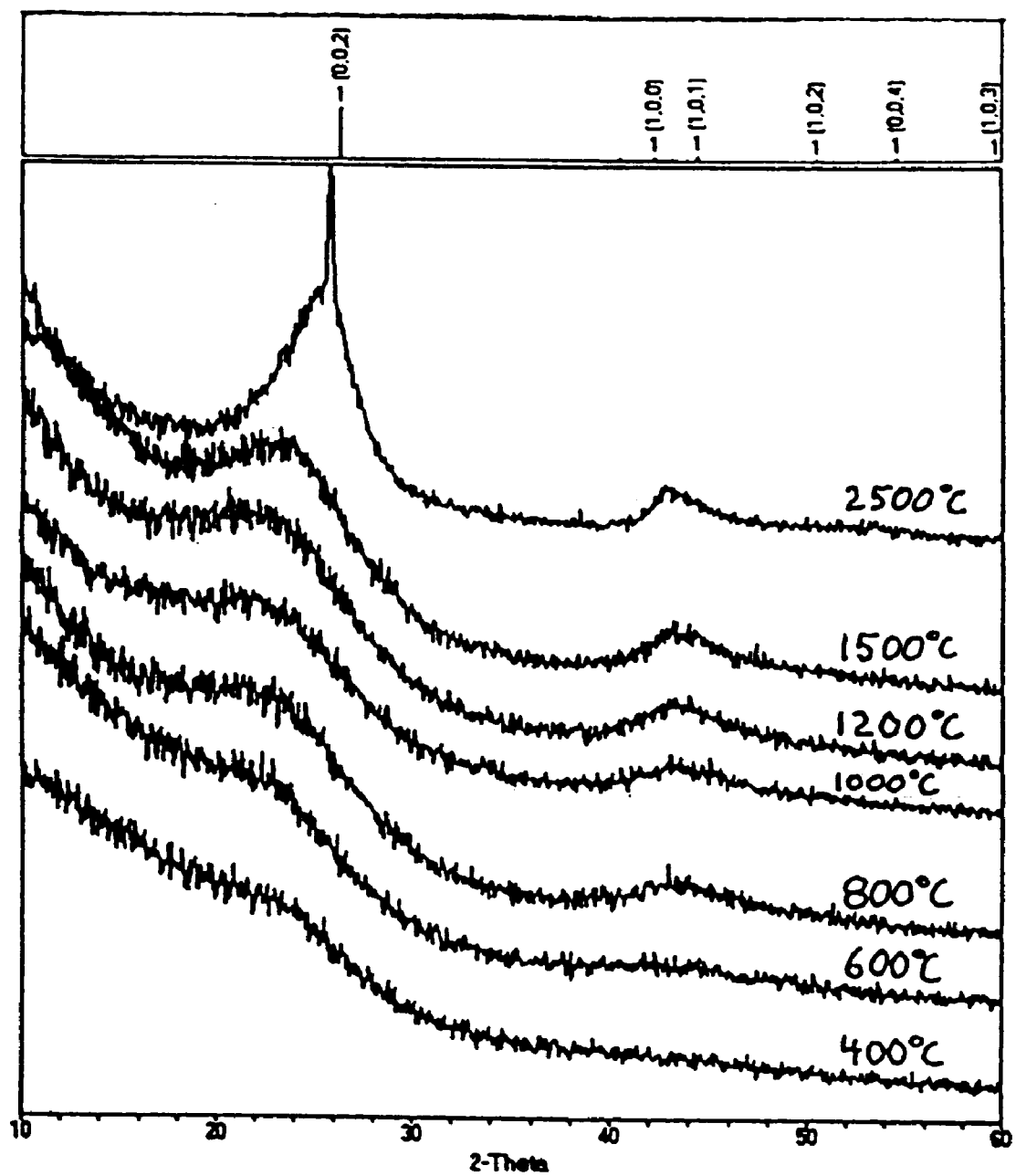
FIG. 20 is an X-ray diffraction plot of carbonized wood samples heated to various temperatures showing graphitization at the highest temperature.

Samples of the carbonized poplar were prepared for x-ray powder diffraction analysis by grinding in a mortar and pestle. Powder was placed on a sample holder using vacuum grease as a glue. Samples heat treated at 2500° C. down to 400° C. were scanned using identical procedures. FIG. 20 is in an overlay of the results from each specimen showing intensity of diffracted beam versus Bragg angle. Diffraction for the {002} (26° 2-Theta) planes and the overlapping {101},{100} (43° 2-Theta) planes clearly changes with increasing HTT. The narrowing of peaks is indicative of developing atomic order in the carbonized wood. Significant increase in the {002} reflection between 1500–2500° C. demonstrates that increased layer height and order occurred. The discontinuity in the peak may result from catalytic graphitization by inorganics within the precursor wood. Continued lateral growth of layer planes is indicated by the increasing intensity of the doublet at 43° 2-Theta.

Two samples of carbonized wood were investigated for mechanical properties. Uniaxial compression parallel to the carbonized wood axial direction was performed by end loading the specimens. Strain was measured with a 1 inch gauge length extensometer placed on specimen axial-radial face. Stress was determined by dividing load cell reading by specimen cross-sectional area. A load rate of 10 kip/min was used to bring specimens to failure.

Two specimens were carbonized for the mechanical testing, one tulip poplar and one southern yellow pine pressure treated with a conventional copper-chrome arsenate (CCA) formulation. Both were carbonized in the retort furnace to 600° C. and then to 1550° C. in the tube furnace. Once carbonized, they were ground to precise dimensions on a milling machine with a ceramic abrasive wheel. This was followed by a light sanding with 600 grit paper. Specimen dimensions were approximately 1" radial×1" tangential×2.75" axial. The tulip poplar contained approximately 11 growth rings, and had a bulk density of 0.398 g/cm$^3$. The yellow pine about 8 rings, bulk density of 0.376 g/cm$^3$.

Figure 21:
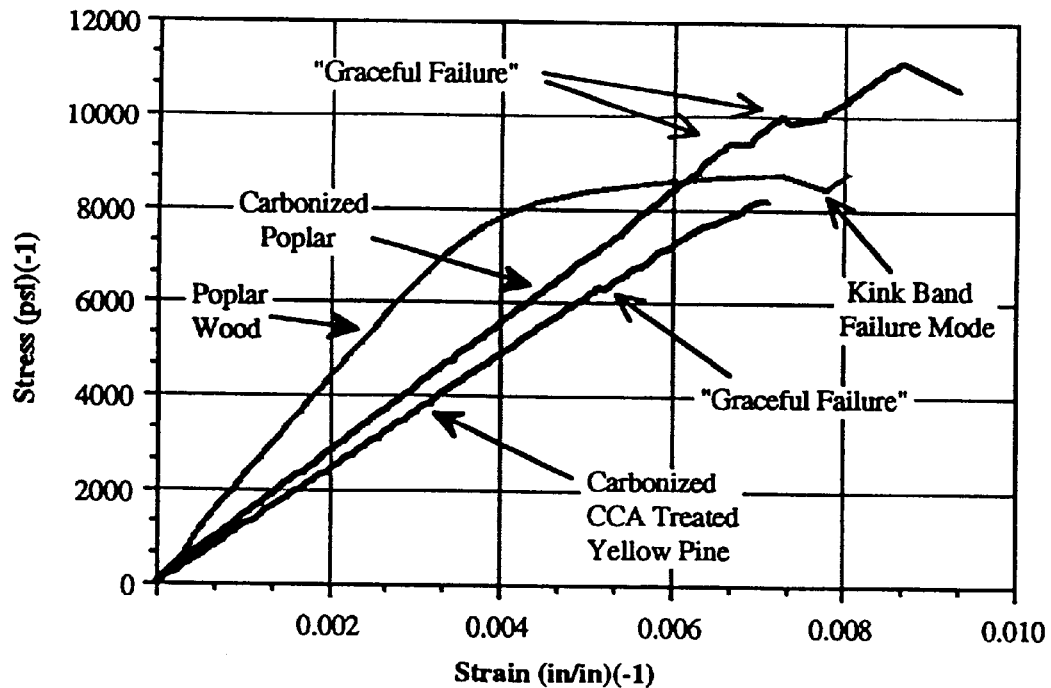
FIG. 21 is a graph of stress versus strain for various carbonized and precursor wood samples.

First a specimen of tulip poplar wood was prepared and tested in the manner described above. The specimen failed in the classical shear kink-band common to wood. The carbonized specimens were tested next. The results for all three are plotted in FIG. 21, modified by converting the measured values for stress and strain to positive values (conventional compression values are negative). The poplar wood displayed greater stiffness than the carbonized poplar but, surprisingly, less strength. The response of the wood was at first linear, then non-linear above 6000 psi stress. The kink-band mode of failure is indicated by a "dip" in the curve just prior to catastrophic failure. The response of the carbonized specimens was linear, then displayed graceful brittle failure. Specifically, there was some audible acoustic emission and noticeable longitudinal splitting of the specimens before complete catastrophic failure. Stiffness measured as the slope of the linear region was 2.06 Msi for poplar, 1.30 Msi for carbonized poplar and 1.23 Msi for the carbonized treated yellow pine. Ultimate strengths measured 8.6 ksi, 11.6 ksi and 8.2 ksi, respectively. Assuming no variation in the tulip poplar, the stiffness was reduced due to the carbonization by 37% and strength increased by 35%.

Thus, in accordance with the present invention, monolithic samples of carbonized wood can be produced by appropriate selection of time, temperature and atmospheric parameters. In particular, heating rates need to be slow enough to avoid the formation of cracks which are typically associated with the carbonization of wood. Heating rates proper for one wood species may not be appropriate for another. The critical temperature range, based on maximum decomposition rates, is from approximately 200° C. to 400° C., but care need also be taken outside of this range. Wood which has a high moisture content is preferably dried at temperatures below 100° C. to prevent steam pressurization and non-uniform shrinkage, both of which may lead to crack formation.

Crack-free specimens may be produced even when the wood contains intergrown knots. The anatomical features of the precursor wood were retained using the present method. The resultant carbonized wood has sufficient mechanical strength to be machined to exact dimensions using conventional tools.

The carbonization parameters of the present invention may be modified. For example, the use of increased pressure may substantially increase solid carbon yields. Modification of carbonization atmosphere could be studied with the intent of producing different decomposition mechanisms and, possibly, improvements in yields and properties. Chemical additives to precursor wood may give similar results.

Carbonized wood produced in accordance with the present invention may be used in applications where synthetic carbon foams are currently being employed. The morphological characteristics of the carbonized wood offer distinct advantages in some applications. For instance, the highly aligned and elongated longitudinal cells are ideally suited for gas transport in the axial direction of carbonized wood. A rough measure of the permeability of some specimens of carbonized wood was made by use of a small plastic funnel attached to a hose from a vacuum pump. Measurements of the pressure drop across a sample indicated some had high axial permeability compared to others. Permeability in radial and tangential directions was much lower. This approach aided in the selection of a carbonized wood with suitable permeability for infiltration by polymers. It also demonstrated that the anisotropic permeability of the precursor wood is maintained, a feature which distinguishes carbonized wood from carbon foams. The aligned cells in the carbonized wood also allows for higher stiffness than that found in carbon foams. This is certainly an advantage when structural applications are considered.

In accordance with an embodiment of the present invention, the adverse impact on the environment by pressure treated lumber may be remediated by recycling of these chemically treated forest products. Careful carbonization of pieces of CCA treated wood retains some, or all, of the copper, chrome and arsenic compounds in a highly porous solid carbon. At that stage the inorganics can be leached out and reclaimed. The remaining porous carbon can be sold for ore reduction, metallurgical processing or any other suitable industrial use. As an alternative, products such as monolithic ceramics and composites can be produced directly from the porous carbon derived from pressure treated lumber.

Several examples were performed to attempt to determine whether CCA treated wood could be carbonized in a manner similar to untreated wood, and whether the addition of the inorganics influences the decomposition. A sample of 2% CCA solution was obtained from Hickson Corporation (Conley G) which contained 0.95% $CrO_3$, 0.37% CuO and 0.68% $A_2O_5$ (percent on oxide basis). Some of the solution was left in an open furnace at about 100° C. for several hours to evaporate off the water. This produced a gummy residue of concentrated CCA which readily absorbed moisture from the air when left in an open room.

The resulting viscous liquid was placed in an alumina sample cup for thermal analysis (TGA). This was performed in an argon atmosphere and a furnace schedule of 10° C./min to 90° C., hold 10 min, 10° C./min to 1000° C., cool at 20° C./min. Weight loss was found through the entire hold period and increased as temperature raised above 90° C. At 200° C. approximately 28% weight loss had occurred which was attributed to water loss. Between 200° C. and 800° C. an additional 10% of the original material was lost, mostly in two steps at 340° C. and 500° C. Above 800° C. a rapid reduction in weight to 38% was observed. The data shows that the CCA concentrate decomposes at certain temperatures, ultimately loosing 62% of its weight.

Thermal analysis was used for studying the carbonization of CCA pressure treated wood. Commercially available CCA treated yellow pine was prepared in the same manner as the other wood specimens. Several sample runs were performed and each gave similar results. The results indicated that decomposition of CCA treated wood proceeds through the same stages as untreated wood. None of the decompositions found in the CCA concentrate appeared in the data for the treated wood. Considering the small quantity of CCA (0.4 lb/ft$^3$) it is possible that any alterations in wood decomposition mechanisms, or the presence of CCA decomposition, are undetectable by this method.

Elemental analysis by Energy Dispersive X-ray (EDX) technique of the Scanning Electron Microscope (SEM) was performed to determine whether any of the copper, chrome or arsenic remained in the carbonized pressure treated wood. The first approach taken was to coat a piece of untreated char with the CCA concentrate to establish the capability of detecting the elements in a best case scenario. This coated sample was examined at low magnification by EDX. The elements chromium, copper and arsenic were clearly detected.

Further elemental analysis was performed on commercially available CCA treated yellow pine and the same carbonized to 600° C., 800° C. and 900° C. In all cases positive identification of chromium, copper and arsenic was made. The data shows the retention of Cr, Cu and As, as well as the presence of sulfur, potassium and calcium. The results from the elemental analysis by EDX clearly indicate that the carbonization of CCA treated wood produces a porous solid carbon with some of the hazardous elements retained.

Attempts to characterize crystalline phases as a function of HTT in different samples of carbonized wood resulted in the discovery of catalyzed graphitization in CCA treated yellow pine. X-ray diffraction analysis of untreated carbonized wood indicated a low degree of atomic order in specimens heat treated to 1500° C. Broad peaks from {002} reflections indicated non-graphitic carbons. Reflections from the {100} and {101} planes were broad and overlapped.

Figure 22:
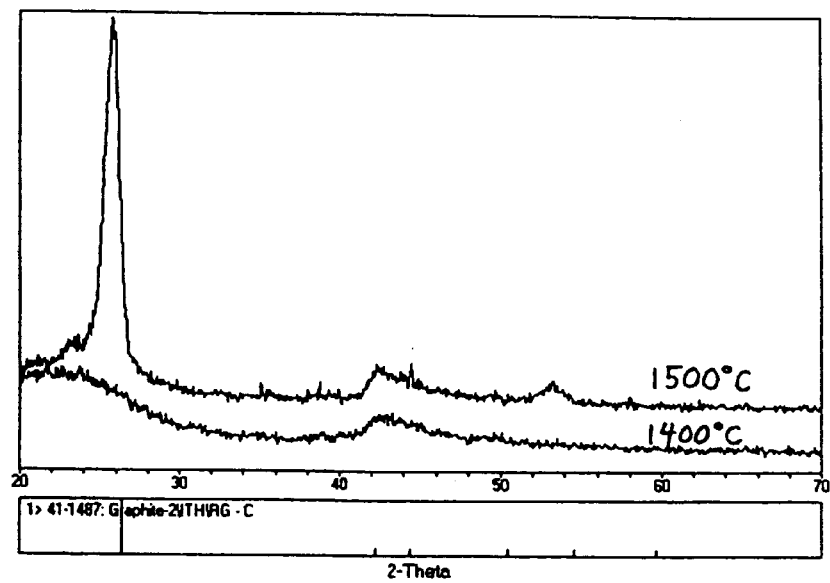
FIG. 22 is an X-ray diffraction plot of carbonized wood samples heated to various temperatures showing graphitization at the highest temperature.

Two precursors were selected for the heat treatment study, commercially available CCA treated yellow pine and Honduran mahogany as an untreated reference. Samples of both were carbonized at rates slow enough to avoid cracking (50° C./hr) then heat treated to either 900° C., 1100° C., 1300° C., 1400° C. or 1500° C. in an argon atmosphere. X-ray diffraction was then used to detect the onset of catalyzed graphitization. None of the prepared samples showed indications of three-dimensional long range order for graphite at 1400° C. or below. At 1500° C. the CCA treated sample gave a strong peak from the {002} reflection. This is shown in FIG. 22 where diffraction data from treated samples heat treated to 1400° C. and 1500° C. are plotted on the same graph. Catalyzed graphitization of the carbonized treated wood was found to occur between 1400° C. and 1500° C. HTT.

The presence of a graphitic phase in the carbonized treated wood suggested the possibility of being able to alter the mechanical properties of monolithic carbonized wood via micro-structural modification. One specimen of CCA treated yellow pine heat treated to 1550° C. was tested to failure in compression. These results are in FIG. 21. The measured stiffness from the test was 1.23 Msi, the same order of magnitude as poplar wood and carbonized poplar. Also, ultrasonic velocity measurements indicated no significant increase from catalyzed graphitization.

The use of the Honduran mahogany as a reference in the catalyzed graphitization experiment gave unexpected results. The wood, when carbonized to 1500° C., gave no indication for graphitic carbon by x-ray diffraction analysis. However, at HTT's of 1100° C., 1300° C., and 1400° C. the presence of calcium oxide (CaO, lime) was found. This presumably formed from thermal decomposition of calcium oxalate ($CaC_2O_4$) to calcium oxide. The tropical hardwoods are known for containing high levels of inorganics, especially silica and crystals of calcium oxalate.

In accordance with an embodiment of the present invention, carbon/polymer composites are fabricated from carbonized wood. The porous carbon monoliths produced by carbonization of naturally fibrous plants offer a unique framework from which a composite can be produced. Since anatomical features are retained during carbonization, a porous monolith can be infiltrated with gases or liquids creating a multi-phase material with properties different from its constituents. The anisotropy inherent in the precursor is at least partially retained during carbonization. Properties can also be tailored, as in CRP's, by stacking layers to make a laminate. The selection of precursor wood can be used to determine many of the properties of the final carbon reinforced composite. In particular, carbonized wood density can be selected based on initial wood density. Carbon reinforced polymer composites using wood monoliths as precursors may thus be formed.

To demonstrate the carbon/polymer composite embodiment, a polymer with low viscosity which readily wets carbon was selected for impregnation. The capability to work at room temperatures with minimum equipment was also preferred. An amine cured epoxy was selected which had sufficient working time to allow for thorough infiltration before hardening. Pro-set® 125 resin and 229 hardener produced by Gougeon Brothers Inc. met the processing criteria.

To be assured that the carbonized wood was permeable, specimens were tested for pressure drop as described previously. Tulip poplar, tupelo and yellow pine were found to have relatively low axial pressure drop, and therefore reasonable permeability. It was also determined that the carbonized sapwood was much more permeable than that from heartwood. Tulip poplar is a diffuse porous wood and is more likely to give uniform infiltration. Yellow pine has relatively good mechanical properties and high permeability, making it a preferred polymer composite precursor.

Figure 23:
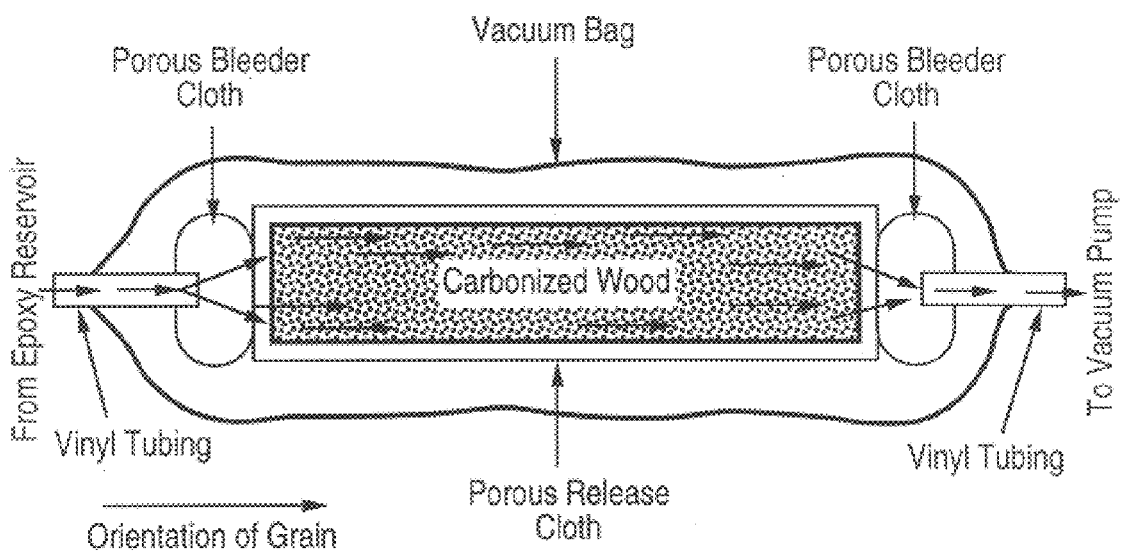
FIG. 23 is a schematic illustration of a polymer impregnation apparatus in accordance with an embodiment of the present invention.

To take advantage of the natural directional permeability retained in carbonized wood a method for resin transfer which used a vacuum assist was used. A schematic and illustration of the setup is shown in FIG. 23. A vacuum is applied to one end of a specimen to draw resin through from the other end. Many of the polymeric materials used in the vacuum assisted resin transfer setup were manufactured for producing conventional composites. A carbonized specimen was first wrapped in a porous release cloth. Next, small pillows of bleeder cloth were positioned at each end of the specimen to evenly distribute the resin flow. Tubing placed onto the bleeder cloth at one end passed to a vacuum pump by way of a fluid overflow flask. Tubing on the other end of the specimen acted as a resin supply line by connecting to a squeeze bottle filled with mixed epoxy. The flexible tubing used could be folded over to stop resin flow while a valve in the low pressure side enabled the release of the vacuum. The sample, cloths, and tubing ends were then enclosed in a sealed vacuum bag using conventional bagging film and sealant. Adequate seal was assured by a pressure gauge attached to the vacuum tubing.

Specimens with dimensions of several centimeters were infiltrated using the vacuum assisted resin transfer setup. A specimen was wrapped and placed into a vacuum bag as described. Drawing a vacuum caused the bagging film to shrink up tightly against the carbonized wood. No damage to specimens was noticed due to the atmospheric pressure. Resin and hardener were mixed in the squeeze bottle which was then attached to the crimped (flow shut off) material feed tube. Resin was gradually allowed to pass into the bag by uncrimping the tube for short periods. Resin flow was relatively slow. The vacuum was periodically interrupted to reduce the rate of resin boiling which occurred at the lowest pressures. Resin transfer was continued for several minutes after it began flowing into the vacuum tube. The release paper was continually observed for resin wetting, a sign that resin was flowing through the carbonized wood. When transfer was believed complete the vacuum and material tubes were closed off. Infiltration took approximately 25 minutes for specimens measuring approximately 3×3×8 cm. The epoxy was usually allowed to cure before the composite was removed from the bag.

Elevated temperatures from the epoxy cure were measured. A thermocouple was placed on the surface of a carbonized wood specimen which measured approximately 3×3×8 cm. After epoxy infiltration the measured temperature eventually reached 72° C. Internal temperatures were probably higher.

The first specimen infiltrated was carbonized CCA treated yellow pine measuring 4×3×8 cm (HTT 600° C.). Radiography of the resulting composite indicated infiltration of the porous carbonized wood was uniform.

Figure 24:
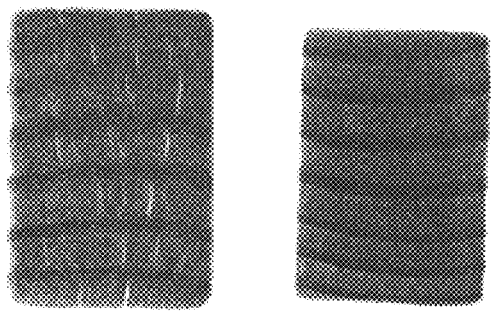
FIG. 24 is a radiograph of various carbon-polymer composites produced in accordance with the present invention.
Figure 24:
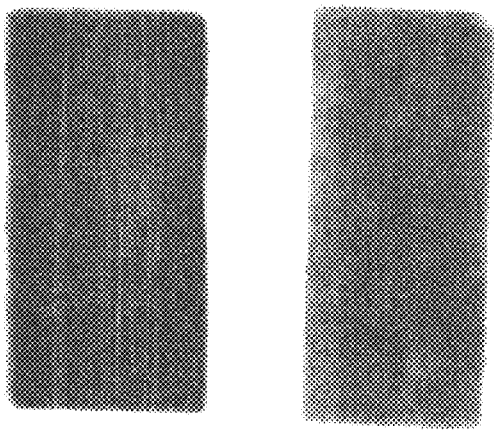

The next carbon-epoxy composites produced were from two specimens of CCA treated yellow poplar. One had been carbonized to 600° C. The other specimen had been heat treated to 1550° C. which produced a graphitic carbon. Each specimen measured approximately 2×4×5 cm. Infiltration was performed in separate bags. The composites produced were uniformly infiltrated as determined by radiography. These radiographs are shown in FIG. 24. The composite from the 600° C. specimen had a limited amount of earlywood cracking. The 1550° C. specimen had no cracks, perhaps due to increased stiffness and strength from the higher HTT. Also, the dimensional reduction was greater in the 1550° C. specimen so that the earlywood regions were slightly narrower and less prone to crack formation.

Figure 25:
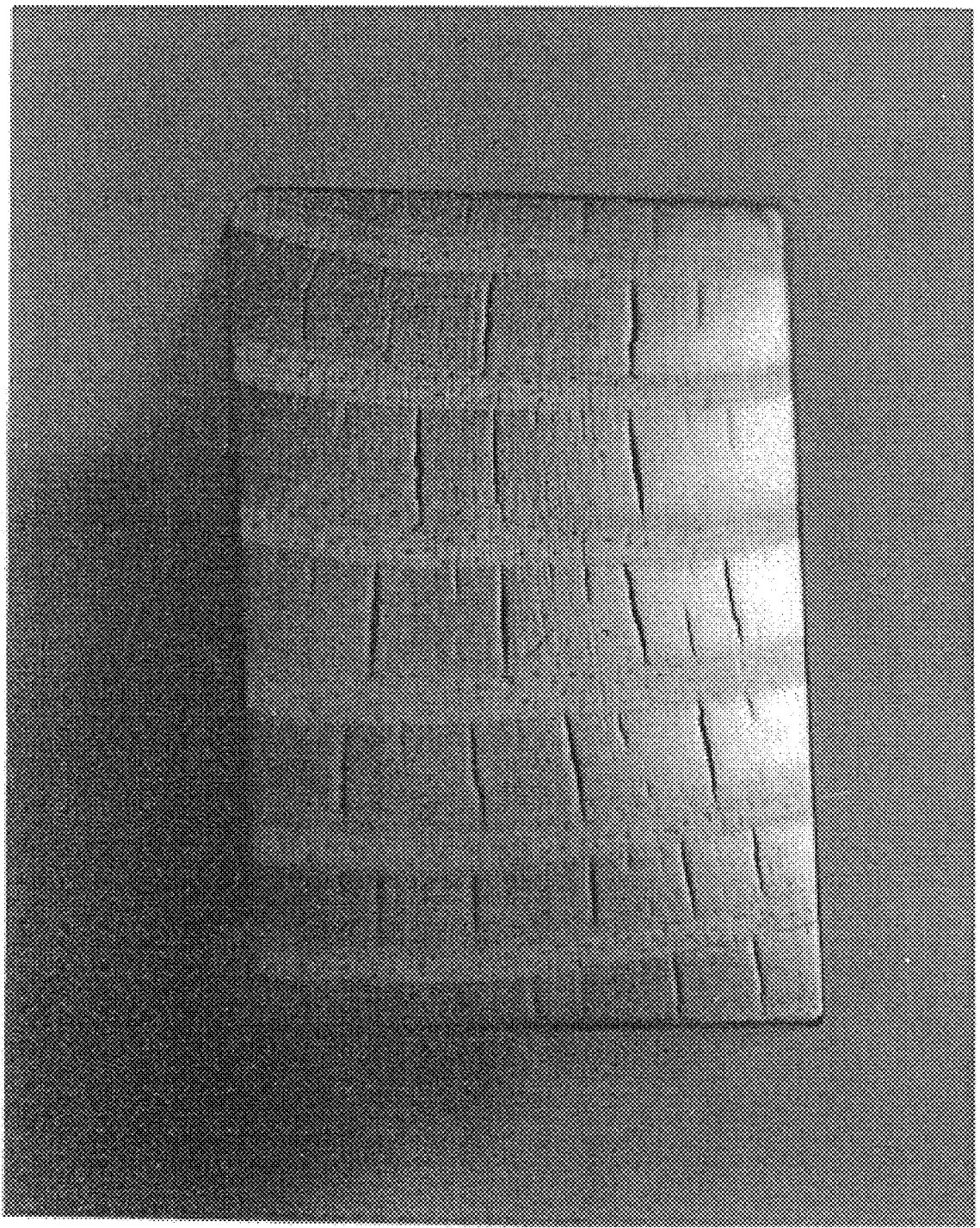
FIG. 25 is a photograph of a carbon-polymer composite produced in accordance with an embodiment of the present invention.

The carbon-epoxy composites were machined to precise dimensions on a milling machine using an abrasive wheel. The composites were then polished with increasingly finer abrasives (to 0.05 $\mu$m). The resulting carbon-epoxy composites exhibited all of the visual features found in the precursor wood grain. A photograph of the 600° C. composite is shown in FIG. 25.

Other carbonized wood species were successfully infiltrated with epoxy to form composites. Both tulip poplar and tupelo were successfully used as precursors. Other species can also be used, provided that they possess adequate permeability after carbonization.

Figure 26:
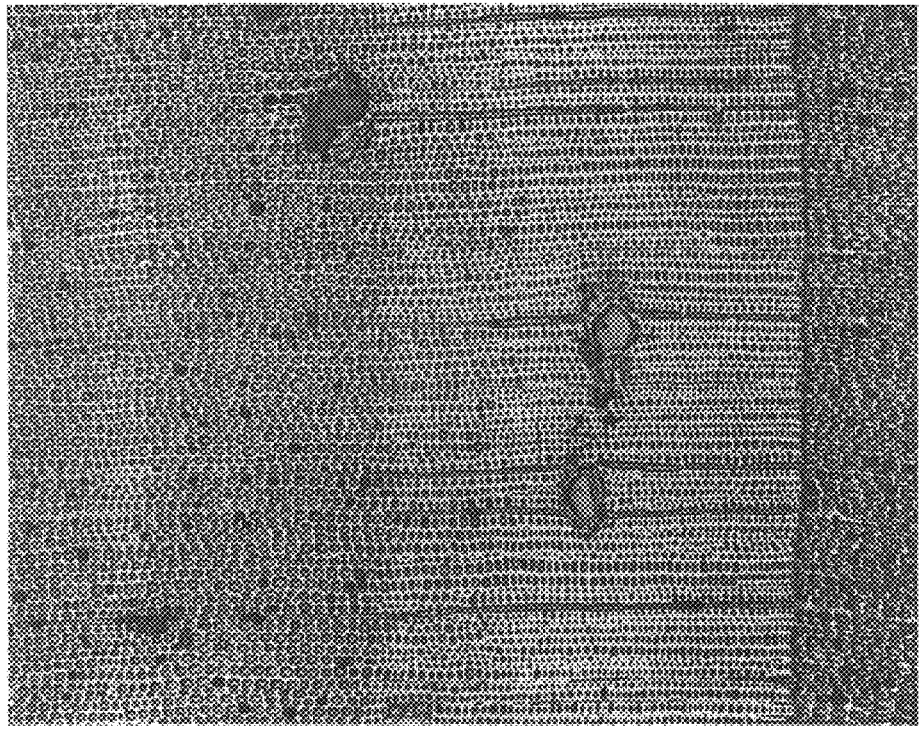
FIG. 26 is a photomicrograph showing the structure of a carbon-polymer composite of the present invention.
Figure 27:
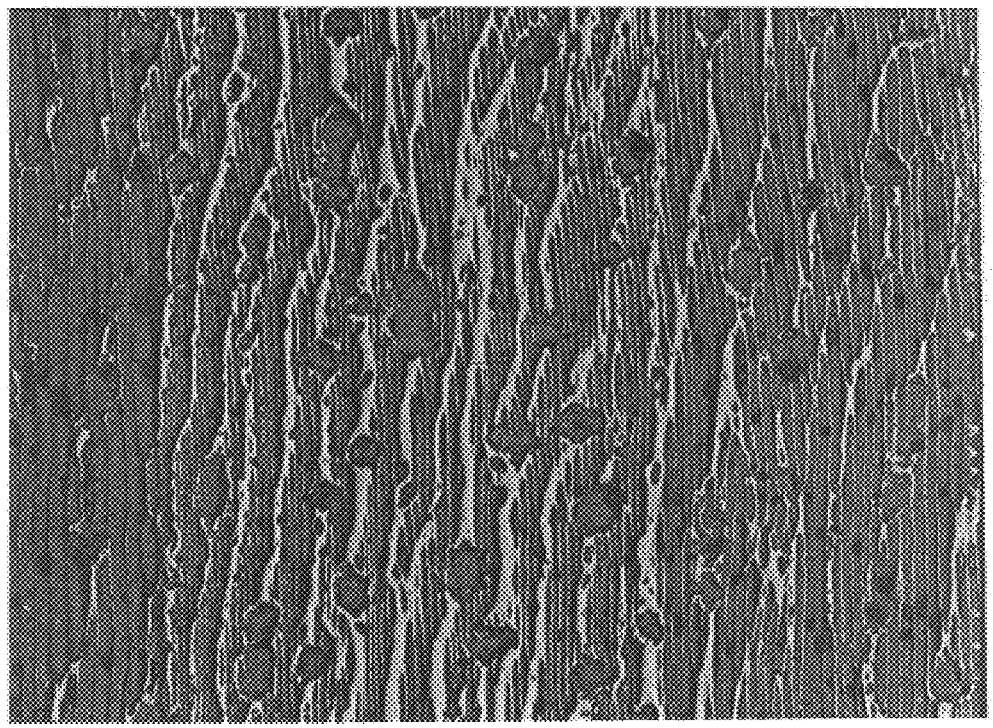
FIG. 27 is a photomicrograph showing the structure of a carbon-polymer composite of the present invention.
Figure 28:
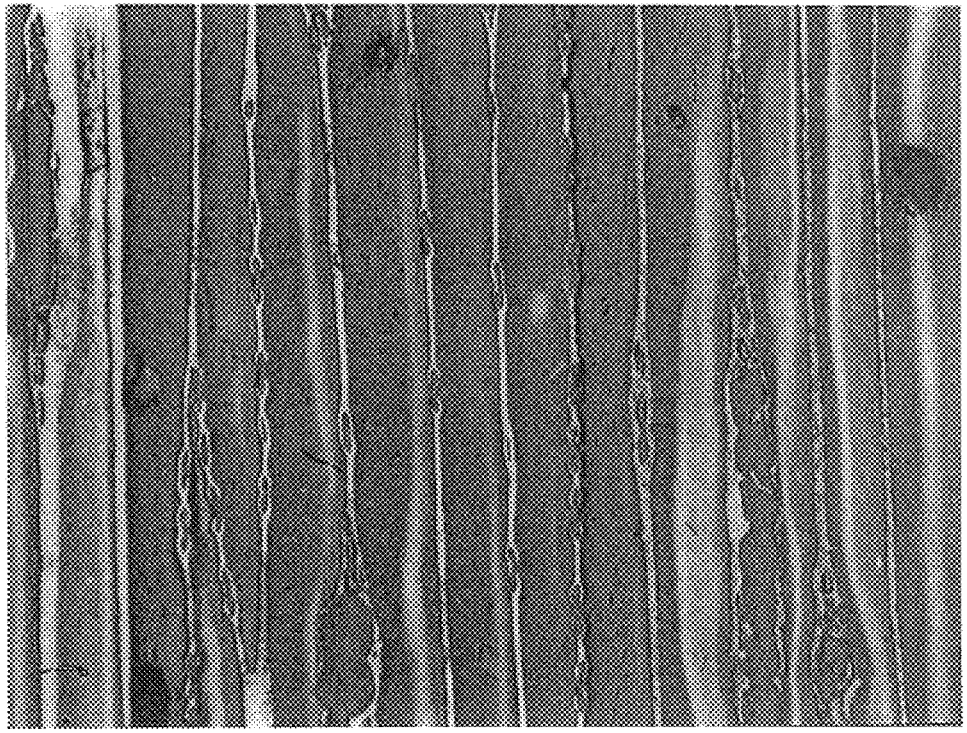
FIG. 28 is a photomicrograph showing the structure of a carbon-polymer composite of the present invention.
Figure 29:
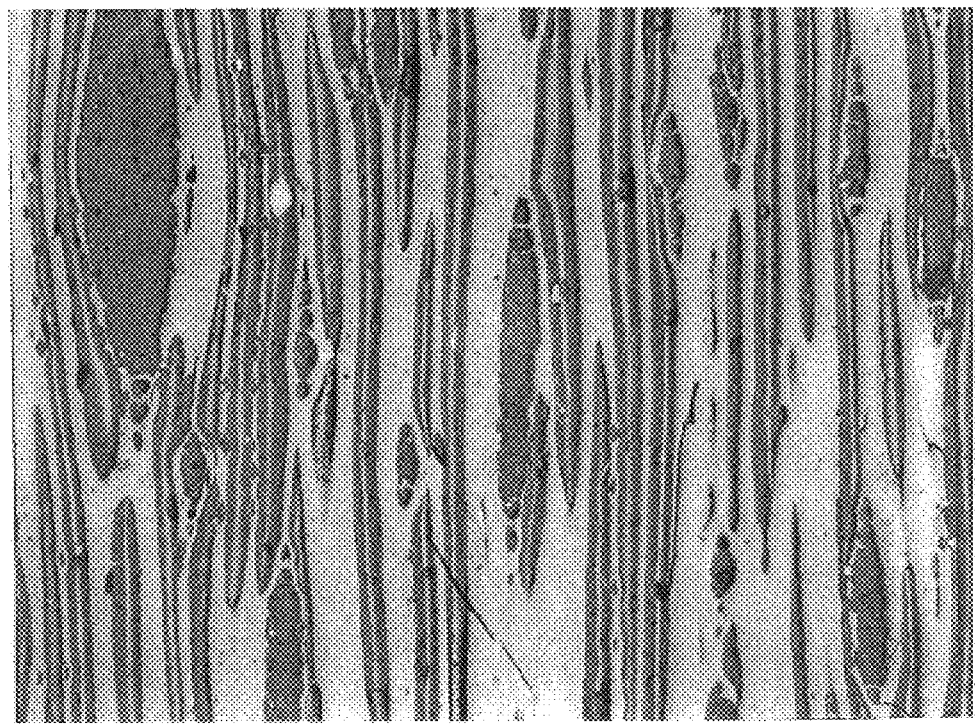
FIG. 29 is a photomicrograph showing the structure of a carbon-polymer composite of the present invention.

Optical microscopy of polished surfaces was used to assess the quality of the composites produced. Some specimens were cut in half to inspect their interior, others were inspected close to the original composite surface. FIG. 26 shows the abrupt earlywood-latewood transition in a composite produced from graphitized CCA treated yellow pine (HTT 1550° C.) in the RT plane at a magnification of 50×. The same specimen is shown in the micrograph of FIG. 27 in the LR plane at a magnification of 50×. The majority of the section is uniformly infiltrated. Additional micrographs of the specimen are presented in FIGS. 28 and 29. FIG. 28 is from the LT plane of the graphite-epoxy composite, showing the earlywood region at a magnification of 400×. FIG. 29 is also from the LT plane of the composite, showing the latewood region at a magnification of 200×. These micrographs show the anatomical features retained from the original wood.

Figure 30:
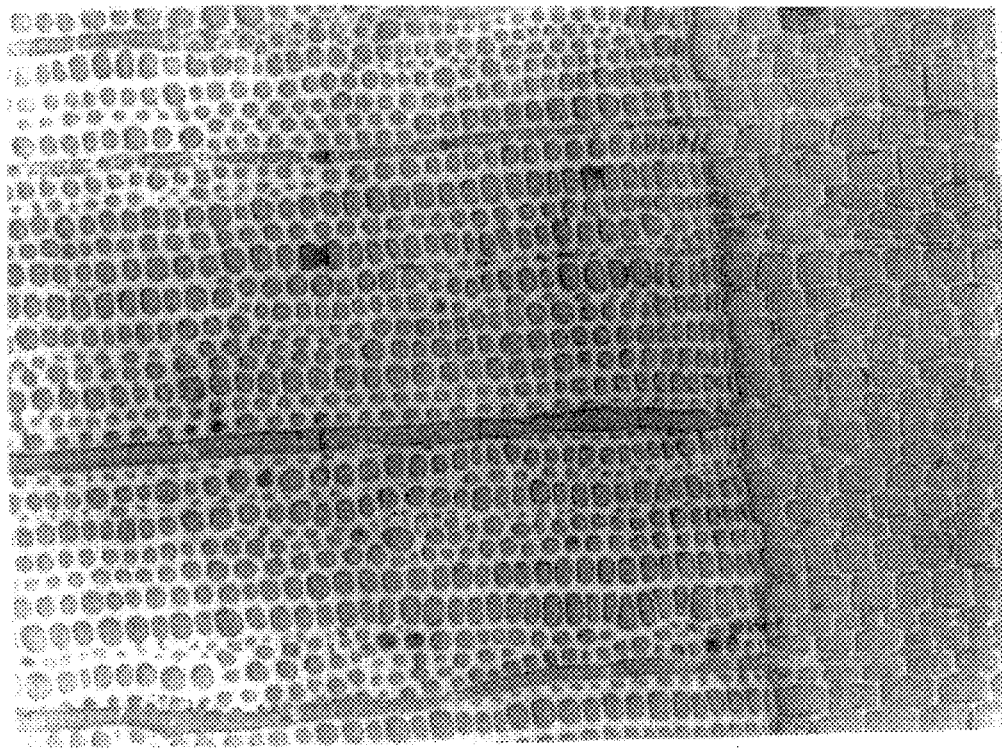
FIG. 30 is a photomicrograph showing the structure of a carbon-polymer composite produced in accordance with an embodiment of the present invention.
Figure 31:
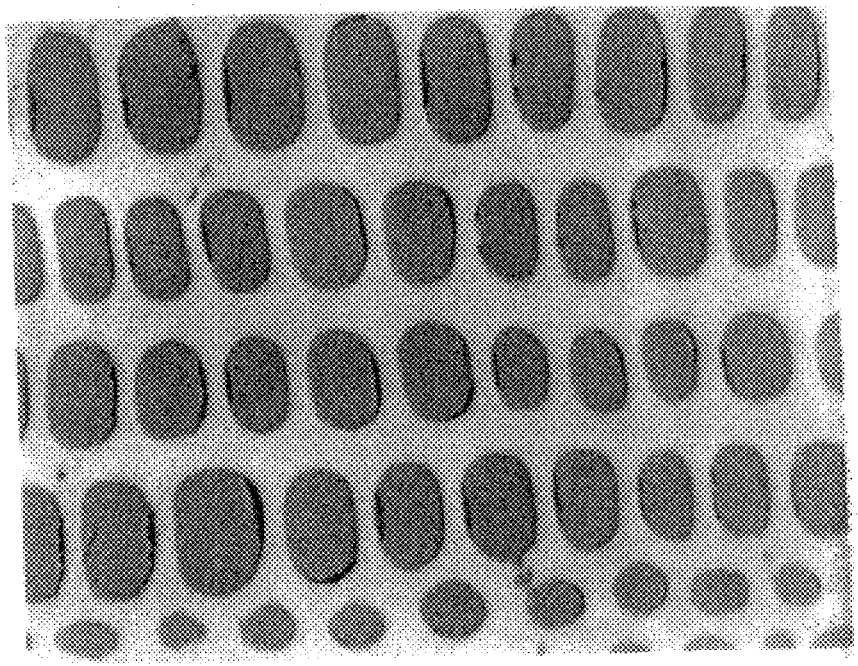
FIG. 31 is a photomicrograph showing the structure of a carbon-polymer composite produced in accordance with an embodiment of the present invention.

Composites prepared from CCA treated yellow pine carbonized to 600° C. were inspected after polishing. FIGS. 30 and 31 are micrographs showing different magnifications of a section revealing the RT plane. FIG. 30 shows the earlywood-latewood transition at a magnification of 125×, while FIG. 31 shows the latewood region at a magnification of 500×. Few voids were found in the areas examined. The graphite-epoxy composite described above had a bulk density of 1.16 g/cm$^3$. Using a helium density of 1.20 g/cm$^3$, a bulk density of 0.381 g/cm$^3$ for the graphitized yellow pine, and a density of 1.14 for the epoxy, the porosity contained in the epoxy phase accounted for less than 1% of the total composite volume.

The vacuum assisted resin transfer method was useful for achieving uniform infiltration of epoxy in the carbonized wood specimens. Improvements can be made to speed up the process and to enable larger pieces to be produced. Placing the bagged specimen and material reservoir into a vessel capable of applying an over-pressure would enable a higher pressure gradient to be achieved. An additional benefit would be that resin boiling could be avoided. Bagging the carbonized wood was done to promote directional flow of resin along the grain. This may be unnecessary and a chamber capable of pulling a vacuum and applying pressure may be all that is needed.

Figure 32:
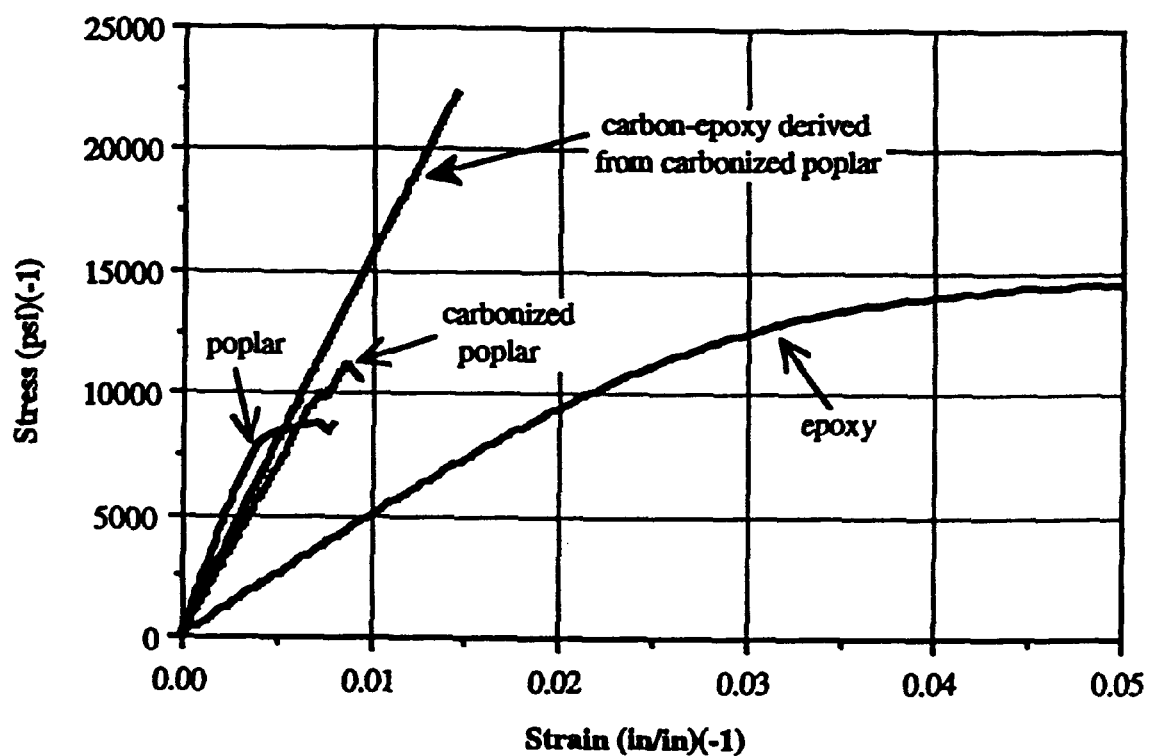
FIG. 32 is a graph of stress versus strain for precursor wood, carbonized wood, carbon-epoxy composite and epoxy samples.

Mechanical testing was performed on one specimen of carbon-epoxy composite derived from poplar (HTT 1550° C.). The composite was prepared by vacuum assisted resin transfer as described above. An epoxy specimen was also prepared for mechanical testing. Both specimens measured approximately 2.5×2.5×7 cm. The results from these mechanical tests are shown in FIG. 32 along with those from the testing of poplar and carbonized poplar.

The mechanical tests reveal excellent results. Table 7 gives a summary of the measured values.

TABLE 7

Mechanical Properties of Carbon-Expoy Composite Derived from Poplar

| | | | |
|---|---|---|---|
| Carbonized poplar bulk density | $\rho_{BC}$ | = | 0.4104 g/cm$^3$ |
| Carbonized poplar monolithic helium density | $\rho_{CHe}$ | = | 1.175 g/cm$^3$ |
| Epoxy density | $\rho_E$ | = | 1.143 mg/cm$^3$ |
| Carbon-epoxy composite density | $\rho_{CE}$ | = | 0.9294 g/cm$^3$ |
| Stiffness of bulk carbonized poplar | $E_{BC}$ | = | 1.380 Msi |
| Stiffness of epoxy | $E_E$ | = | 0.500 Msi |
| Stiffness of carbon-epoxy composite | $E_{CE}$ | = | 1.550 Msi |

These values may be used to analyze the appropriateness of using a rule of mixtures for assessing the stiffness of the composite. The rule of mixtures used here for stiffness is based upon each phase being considered as a spring in parallel to the next phase. This implies that each phase is continuous and of uniform cross-section throughout the height of the load bearing section.

The density of the composite was 0.9294 g/cm$^3$ which is less than predicted from a rule of mixtures analysis. Using a helium density for monolithic carbonized poplar of 1.175 g/cm$^3$ and a bulk density of 0.4104 g/cm$^3$, a volume fraction for the carbon phase is 0.3493. That leaves a volume fraction of 0.6507 for epoxy to fill. These volume fractions and the density values in Table 7 give a predicted density for the composite of 1.154 g/cm$^3$. This indicates a void percentage of 19.65% in the composite (actually, this is the porosity contained in the epoxy).

The measured stiffness of the carbon-epoxy and the carbonized poplar were less than the precursor wood. The carbonized wood bulk density divided by the helium density gives the fraction of carbon acting as load support under idealized conditions, $V_C$=0.3493. This indicates the stiffness of the carbonized wood phase was:

$$E_{BC}/V_C = E_C = 3.951 \text{ Msi,}$$

giving a rule of mixtures for the composite with no void content of $$V_C E_C + V_E E_E = E_{CE} = 1.705 \text{ Msi.}$$

This gives a higher value than that measured for the composite, 1.550 Msi. If the void volume fraction of 0.1965 ($V_V$) is included in the rule of mixtures, $$V_C E_C + (1-V_C-V_V)E_E = E_{CE} = 1.607 \text{ Msi,}$$

a closer value is obtained. This does not consider the distribution of the void content or the closed porosity within the solid carbon. Also unaccounted for is the volume fraction of ray cells. It does suggest that a rule of mixtures may be appropriate for the composite when loaded parallel to the longitudinal cells of the carbonized wood.

The strength of the composite was 22.4 ksi. This is 200% higher than the carbonized poplar and 250% higher than the poplar. The higher strength of the composite may be attributed to the epoxy providing lateral support of the thin walled carbon cells resulting in decreased tendency for Euler buckling. Failure was preceded by an audible acoustic emission from splintering of the specimen edge. Failure occurred in a brittle manner. The composite exhibited mode I fracture by tensile failure perpendicular to the LR plane. This type of compression failure is similar to that found in cross-ply composite laminates. The poplar derived carbon-epoxy composite demonstrates that ray cells act as lateral reinforcement to the longitudinal cells. Failure occurred in the unreinforced transverse direction (tangential) and appeared very similar to delamination in cross-ply composite laminates.

The composite specimen was not fully impregnated with resin. The radiograph indicated significant porosity which was verified by density measurement and inspection of the specimen interior after failure. Less porosity would probably improve composite mechanical properties.

Increased stiffness of the carbon phase could substantially improve composite strength. The composite tested exhibited a relatively high strain to failure, approximately 1.5%. Strain to failure is typically used as a design criteria when composites are produced. For example, high modulus PAN carbon fibers show less than 1.5% strain to failure when tensile loads are applied. Increasing the stiffness of the carbonized poplar would significantly increase composite strength if a similar strain to failure was achieved.

Increasing the stiffness of the carbonized wood may be accomplished by producing a higher degree of preferred orientation of the graphitic domains within the solid carbon. This could possibly be accomplished by stretching of the monolith at some latter stage of carbonization. Alternatively, the carbonized wood could be infiltrated with a polymer such as PAN which could then be carbonized.

Figure 33:
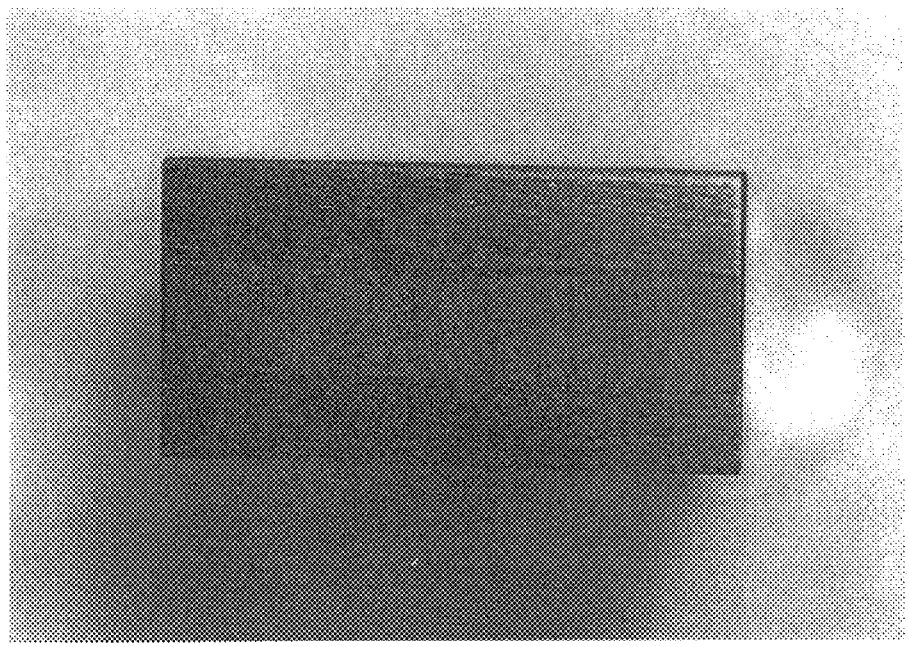
FIG. 33 is a photograph of a laminated carbon-polymer composite produced in accordance with an embodiment of the present invention.
Figure 34:
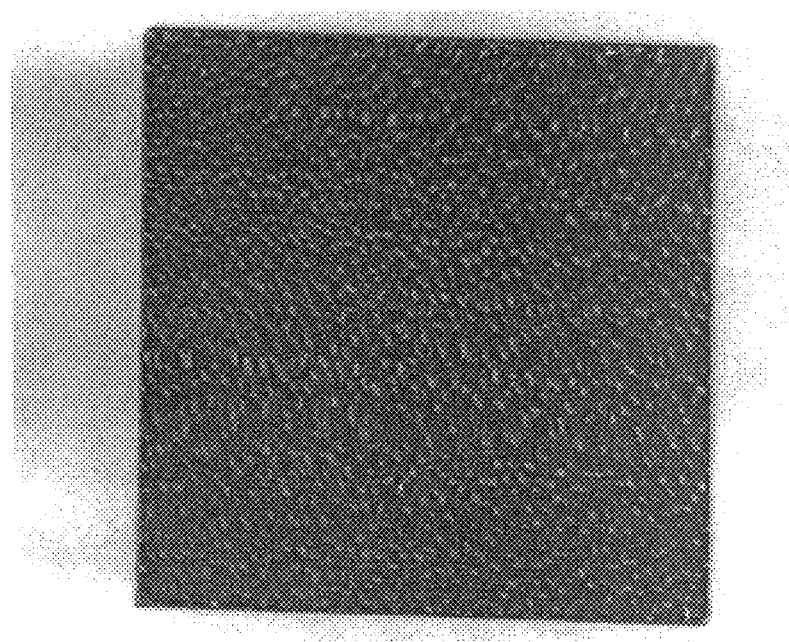
FIG. 34 is a photograph of a laminated carbon-polymer composite produced in accordance with an embodiment of the present invention.

The carbon-epoxy composites described above were produced from relatively thick samples of carbonized wood. Some thinner specimens were produced which were laminated to form a carbon-epoxy composite resembling plywood. An example is shown in FIGS. 33 and 34. The laminated composite was made by gluing together three pieces of carbonized poplar with epoxy. Once cured, the laminate was immersed in uncured epoxy and placed in a vacuum desiccator. A series of vacuum hold and release cycles was capable of forcing the epoxy into the permeable carbonized poplar. After the epoxy matrix cured, the sample was machined and polished. The photograph of FIG. 33 shows an edge view of the cross-ply composite (0, 90, 0). FIG. 34 gives a top view of the same specimen which reveals multiple ray flecks.

The carbon-epoxy laminate appeared fully impregnated with epoxy. The fact that this was accomplished by atmospheric pressure may be attributed to the relatively small size and high permeability of the carbonized poplar. The initial impregnation experiments described previously were successfully performed on less permeable species. The results from the composite laminate indicates that inducing a directional flow may not be needed for resin impregnation in all cases.

These results also demonstrate the potential for producing complex composite structures with sections cut and joined by techniques similar to those used in woodworking. It should be possible to use complex joinery for building structures with easily worked carbonized wood. Once joined and held together by adhesives such as epoxy, full impregnation could be performed in a suitable pressure vessel. Pieces may also be impregnated with epoxy before joining.

Both the carbonized wood and the resulting composites are easily machined with standard tools.

Other resin impregnation experiments were performed on different wood species and on bamboo. Other features of this embodiment include the possibility of using wood chips, sawdust, weaves of rattan or cotton or wood strips, and many other naturally fibrous plants.

One of the unique features of producing composites by infiltration of carbonized wood is that net shape processing is easily achieved. The carbonized wood can readily be machined to close tolerances before impregnation. The infiltration of the polymer can be accomplished without disturbing the geometry of the carbon structure. Also, molding is not necessary.

In accordance with another embodiment of the present invention, carbonized wood is used as a precursor for carbon—carbon composites. A similar process to that described above for the production of carbon-polymer composites using phenolic resins as the impregnate was conducted. Two carbonized wood specimens were selected for impregnation, one poplar (HTT 600° C.) and one CCA treated yellow pine (HTT 1500° C.). Both specimens measured approximately 2.5×3 cm in cross section. The pine was 4 cm long, while the poplar was 6 cm long. Each specimen was placed in a vacuum bag for resin transfer as described previously. Phenolic resin in an organic solvent (SC-1008 from Durite Inc.) was used for infiltrating each specimen. Due to the viscosity of the phenolic, it was warmed with hot water prior to impregnation. Vacuum assisted resin transfer was successful and the bagged specimens were placed in a warmed furnace to set the phenolic at 190° C.

Some of the phenolic which had impregnated the carbonized wood specimens flowed out while curing in the closed bags. The outgassing of vapors caused the bags to inflate so that the phenolic was not fully contained. The specimens were then carbonized in the retort furnace using a heating schedule of 50° C./hr to 700° C., cool 150° C./hr. The resulting specimens had a covering of glassy carbon bubbles which was readily sanded off. An increase in bulk density indicated porous carbon—carbon composites had been made.

The porous carbon—carbon specimens were then reimpregnated using a different method. The viscosity of phenolic resin was reduced by addition of propanol to improve flow. The specimens were then placed in a beaker filled with warmed phenolic and kept immersed by weights. The beaker was then put into a vacuum desiccator for a series of low pressure cycles. Specimens were then removed and placed in a warmed furnace for phenolic cure. The impregnation cycle was repeated and specimens allowed to cure. A second carbonization was then performed producing specimens with surfaces covered by glassy carbon bubbles which were sanded off.

Figure 35:
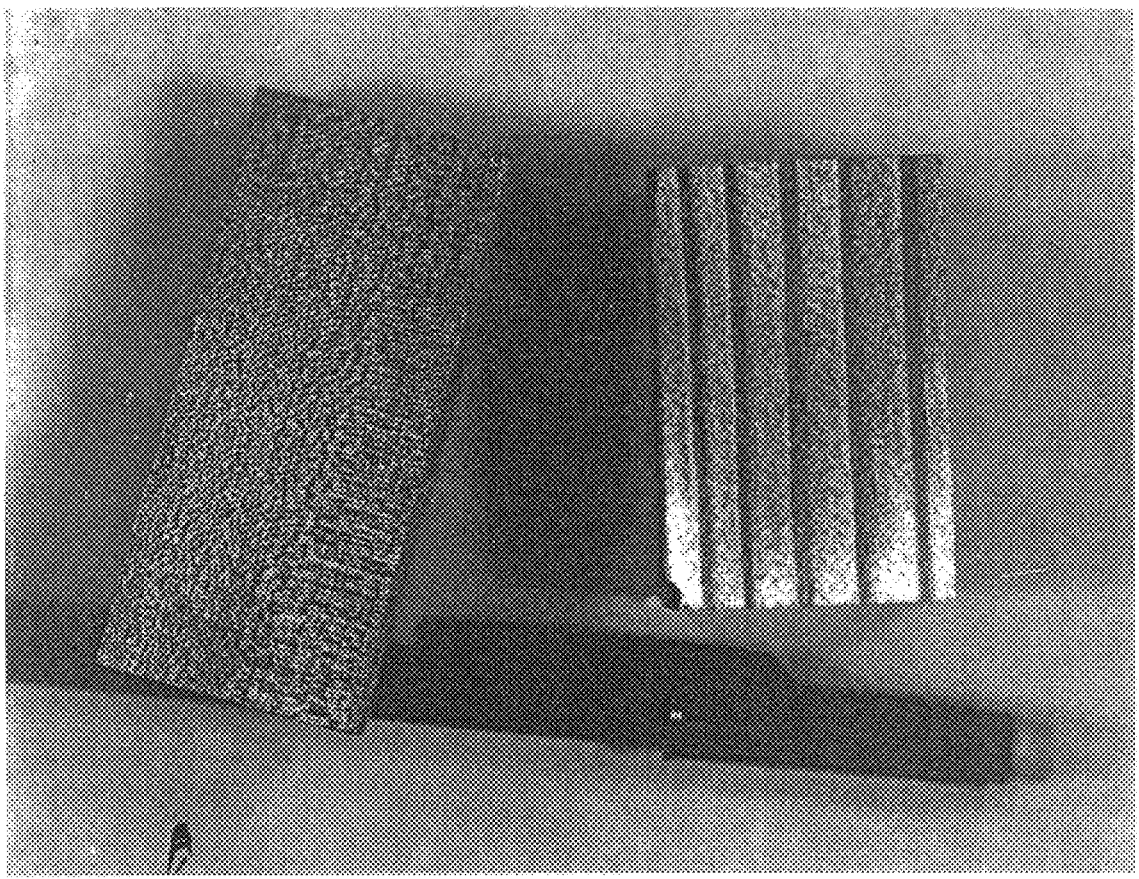
FIG. 35 is a photograph of carbon—carbon composites of the present invention.

The carbon—carbon composites were still relatively high in porosity. Bulk density measured 0.572 g/cm$^3$ and 0.576 g/cm$^3$ for the pine and poplar, respectively. This amounted to a 51% and 59% increase over their carbonized wood state. A third impregnation/carbonization sequence gave no increase in bulk density indicating the carbon—carbon composites contained considerable closed porosity. Radiography showed that the specimens had a uniformly distributed matrix. The specimens are shown in FIG. 35.

Alternative methods for polymer impregnation and carbonization of carbonized wood are possible. The use of a vessel capable of applying both vacuum and overpressure may improve impregnation. Carbonization of the matrix phase may give a higher yield if slower heating rates are used and a method for preventing outflow of the uncured phenolic is utilized. This could be accomplished by curing bagged specimens while external pressure is applied. Alternative precursor polymers for matrix carbon can be used in order to appropriately match the carbonized wood phase.

The carbon—carbon composites of the present invention may be used for various applications. For example, brake shoes and other high temperature applications are suitable. Testing of prototype products such as brake shoes or ablative shields may readily be performed in a laboratory scale apparatus. Wear testing of disc brake shoes could be performed on conventional disc rotors mounted on a machinists lathe or electrically driven automobile axle. Ablation studies may be performed in a high temperature furnace using high temperature gas streams provided by gas tanks. The utilization of ablation resistant coatings such as silicon carbide is also possible.

In accordance with a further embodiment of the invention, carbides can be produced using carbonized wood as a precursor. Not only can this provide for improved mechanical properties in a particular orientation, it can also allow for increased fluid flow along a specific direction. This allows for improved infiltration of reacting fluids and vapors. The directional permeability can even be retained in a porous ceramic giving it flow characteristics unattainable in reticulated carbon foams.

Three processes can be used to convert porous carbonized wood materials to ceramic. These are infiltration with molten precursor, infiltration with colloidal suspension of nano-sized particles and vapor infiltration. Examples of the three routes to conversion are:

(1) Liquid infiltration/reaction process,
  $Si+C \rightarrow SiC$;
(2) Sol-Gel infiltration/reaction process,
  $SiO_2+3C \rightarrow SiC+2CO$
  or,
  $2SiO_2+3C \rightarrow SiC+SiO+2CO$
  $SiO+2C \rightarrow SiC+CO$;
(3) Chemical vapor infiltration/reaction process,
  $SiH_4+C \rightarrow SiC+2H_2$.

Different approaches to making silicon carbide from carbonized wood were used. One entailed the infiltration of wood with a sol-gel of silica. The second used carbonized wood infiltrated with silica sol-gel. The third used liquid silicon infiltration and reaction to make silicon carbide.

Pine, red oak and mahogany wood samples were soaked in a sol-gel (Nyacol 2040 silica sol by PQ Corp.) along with carbonized pine and poplar. These were immersed in liquid and placed under a vacuum, then left overnight under atmospheric pressure. Samples were then dried in a furnace at 100° C. for two hours. Once dry, they were placed on a flat graphite boat with a specimen of carbonized poplar and carbonized red oak, both having a small (approximately 0.5 g) fragment of semi-conductor silicon placed on top (axial direction up). The boat and sample were placed in a tube furnace with an argon flow of 1 L/min. Temperature was manually raised to 1520° C. and then cooled manually. Total time above 1400° C. was approximately 30 minutes.

Figure 36:
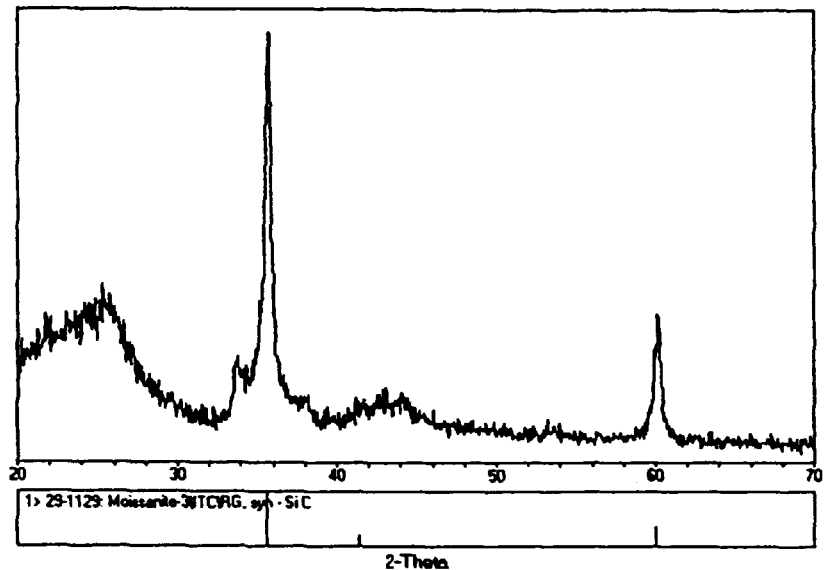
FIG. 36 is an X-ray diffraction plot showing silicon carbide peaks for carbonized wood samples which have been further treated with silicon.

All specimens appeared to have some regions of conversion by exhibiting colors ranging from light gray to green. The specimens soaked in silica sol were uniform in color, those with silicon fragments placed on them were greenish in some areas and still black in others. The samples were scanned whole by x-ray diffraction (XRD) for crystal phase analysis. All samples were found to contain some SiC. The results from XRD of the mahogany wood/silica sol precursor is given in FIG. 36. The diffraction pattern contained two sharp peaks matching those for beta SiC (zinc blend structure). Diffuse diffraction at 26° and 43° 2-theta indicate non-graphitic carbon still remains. The specimen had a faint green color mixed with black.

Figure 37:
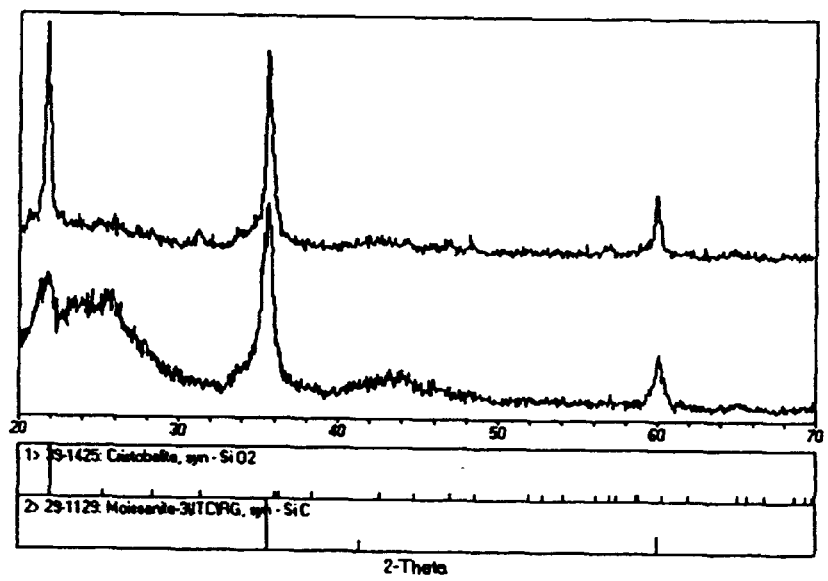
FIG. 37 is an X-ray diffraction plot showing silicon carbide peaks for carbonized wood samples which have been further treated with silicon.

The pre-carbonized specimens mixed with silica sol also gave an indication of SiC. In the carbonized oak/silica sol specimen a peak at 22° 2-theta indicated there was also some residual silica, detected as cristobalite. The specimen was scanned whole, once with the grain (axial direction) parallel to the scanned diffraction plane and once perpendicular. These are shown in the overlay of FIG. 37. The cristobalite peak disappears when the orientation is altered, suggesting a preferred orientation of the crystal silicate phase. There is also some change in the broad diffuse peaks for non-graphitic carbon, indicating a preferred orientation of that phase also.

Figure 38:
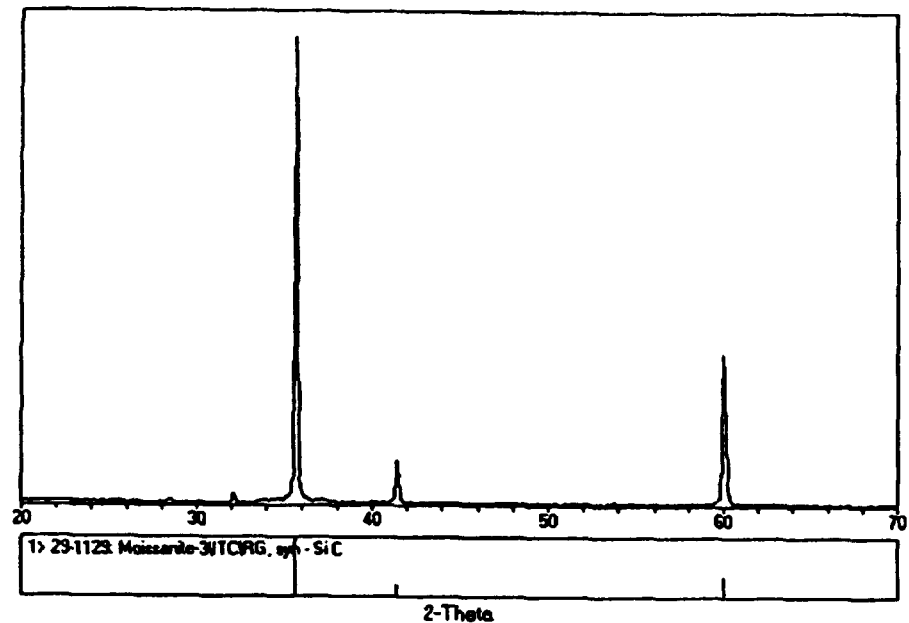
FIG. 38 is an X-ray diffraction plot showing silicon carbide peaks for carbonized wood samples which have been further treated with silicon.

The best results were obtained from the carbonized specimens with silicon placed on them. These had regions which were distinctly different due to the conversion to carbide. The converted regions were very hard and had a light green tint. Pores observable without magnification in the oak appeared to still be open. XRD results from the poplar specimen are presented in FIG. 38. Intense narrow peaks are indicative of highly crystalline SiC. X-ray radiography confirmed visual observations of non-uniform mixing of silicon in the porous carbons. Scanning electron microscopy revealed carbide crystallites and indicated the transition zone between carbide converted regions and the unconverted solid carbon.

In another process, specimens of carbonized wood (HTT 600° C., red oak, balsa and basswood) were cut to approximately 5×4×3 cm, the shortest dimension being in the longitudinal direction. The specimens were then machined on one end (RT plane) to form a shallow (about 3 mm) trough in which silicon was placed. Lump silicon (Aldrich Chem. Co. #26,742-2, 98.5% pure) was added to each trough in a stoichiometric amount for each specimen to be completely converted to SiC. The specimens were placed on a flat graphite boat in a tube furnace under an argon flow rate of 0.2 L/min. The furnace was programmed for a ramp rate of 240° C./hr to 1500° C., hold 20 min, cool at 240° C./min.

All three specimens showed signs of partial conversion to carbide. The regions which had converted were very hard and had a greenish metallic luster. Radiography confirmed that the carbonized wood had not been completely converted. It was apparent that the liquid silicon had passed through the porous carbonized wood converting regions where it had mixed. It did not readily flow outward and thus the sides of the specimens were unconverted. A piece of carbonized manila paper placed between the samples and graphite boat had signs of conversion to carbide and excess Si, also verifying that liquid Si had passed through the specimens. XRD of the specimens ground to a coarse powder identified beta-SiC and excess Si. SEM analysis of the specimens confirmed partial conversion to SiC.

In order to get complete mixing of Si in the carbonized wood monoliths, a recess in a graphite furnace boat was made for holding molten silicon. Specimens could be immersed, end grain down, in a shallow pool of liquid which could be drawn up by capillary forces. Carbonized wood blocks (one inch cubes before carbonization) were placed on a bed of lump silicon laying on the bottom of the furnace boat. Small pieces of silicon were placed on top of each to weigh down the light specimens. Six different species of carbonized wood (maple, red oak, basswood, white pine, balsa and redwood, HTT 900° C.) and a carbonized piece of bamboo were converted using greater than a stoichiometric quantity of silicon. These were heated in an argon atmosphere (0.02 L/min) with a furnace schedule of 240° C./hr to 1500° C., hold 10 min, cool 240° C./min.

The specimens appeared fully converted. Samples ranged in color from a black-green to light gray where some surface slag appeared. The specimens readily scratched metals and glass, and still retained all visible anatomical features of the precursor wood. Dimensions were measured before and after conversion and only minor (±3/1000 per inch) differences were found. Near-net shape specimens of SiC were therefore produced.

Figure 39:
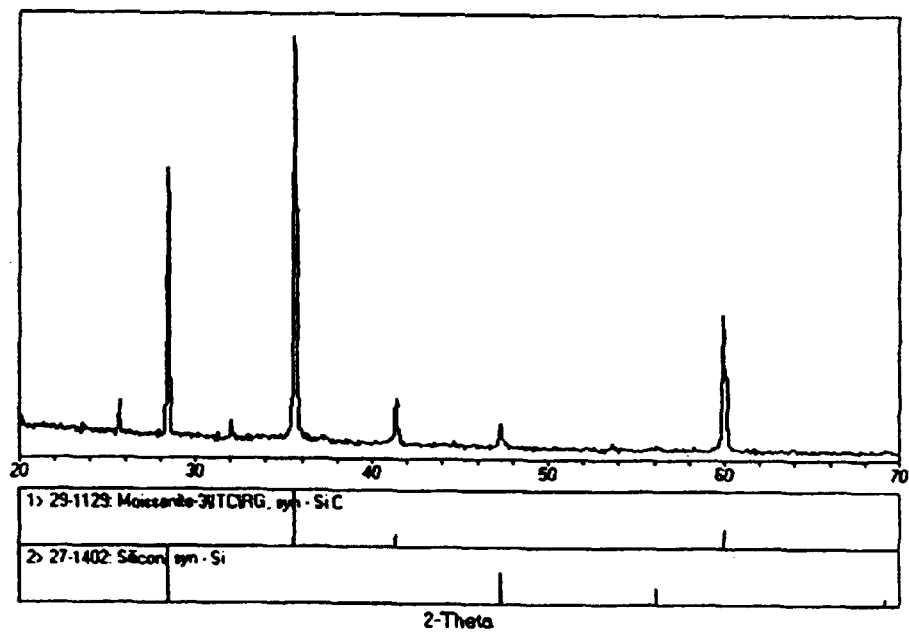
FIG. 39 is an X-ray diffraction plot showing silicon carbide peaks for carbonized wood samples which have been further treated with silicon.

Some surfaces of the specimens had lustrous regions or droplets (low wetting angle) of residual Si. XRD of whole specimens identified beta-SiC and residual Si. Some scans gave stronger indication of Si than others. FIG. 39 shows the result from XRD of red oak converted to SiC. Considerable Si was detected on the surface scanned. The pine specimen was crushed in a press and fragments examined in the SEM. Most of the original cell lumens were completely filled with residual Si. The cell walls were a different shade in the images indicating they had been fully converted to SiC. The Si in each lumen contained fracture surfaces of slightly different orientation suggesting each had a slightly different crystallographic orientation. The bamboo specimen was sectioned in a water cooled diamond saw revealing the anatomical features retained within it. The largest pores of the precursor bamboo were left unfilled by the residual Si, while most of the fibers were filled as seen in the micrograph. The bamboo retained its tubular shape without signs of distortion.

In another example, two board shaped specimens of carbonized redwood (HTT 900° C.) with dimensions of about 0.8×2.6×7 cm (long in axial direction) were packed in the graphite boat such that the grain lay horizontally. Silicon was placed underneath and on top, with the majority being piled near the endgrain with the intent of having the liquid Si wick horizontally into the porous carbon. More than twice the amount needed for full conversion was added, 50 gm of Si for 9.5 gm solid carbon (22 gm is stoichiometric amount). The specimens were heated in an argon atmosphere at 240° C./hr to 1500° C., hold 2 hr, cool 240° C./hr. The two redwood specimens appeared fully converted when observed visually. Each had gained more mass than needed for full conversion to SiC and all of the 50 gm of Si was depleted. Radiography indicated incomplete infiltration of the Si had occurred.

The process was repeated with a single board shaped specimen of carbonized redwood. The single specimen allowed more room in the furnace boat for Si to be added, so several times more than enough was used. Similar heat treatment resulted in the specimen being bound to the boat by a pool of solidified Si. The specimen was then covered with graphite flakes and reheated to absorb Si. The removal of excess Si was successful. The converted redwood specimen was readily removed from the boat. The specimen had a green appearance underlying some gray slag on the surface. The interior was uniformly green. Radiography indicated that a relatively uniform ceramic was produced.

Figure 40:
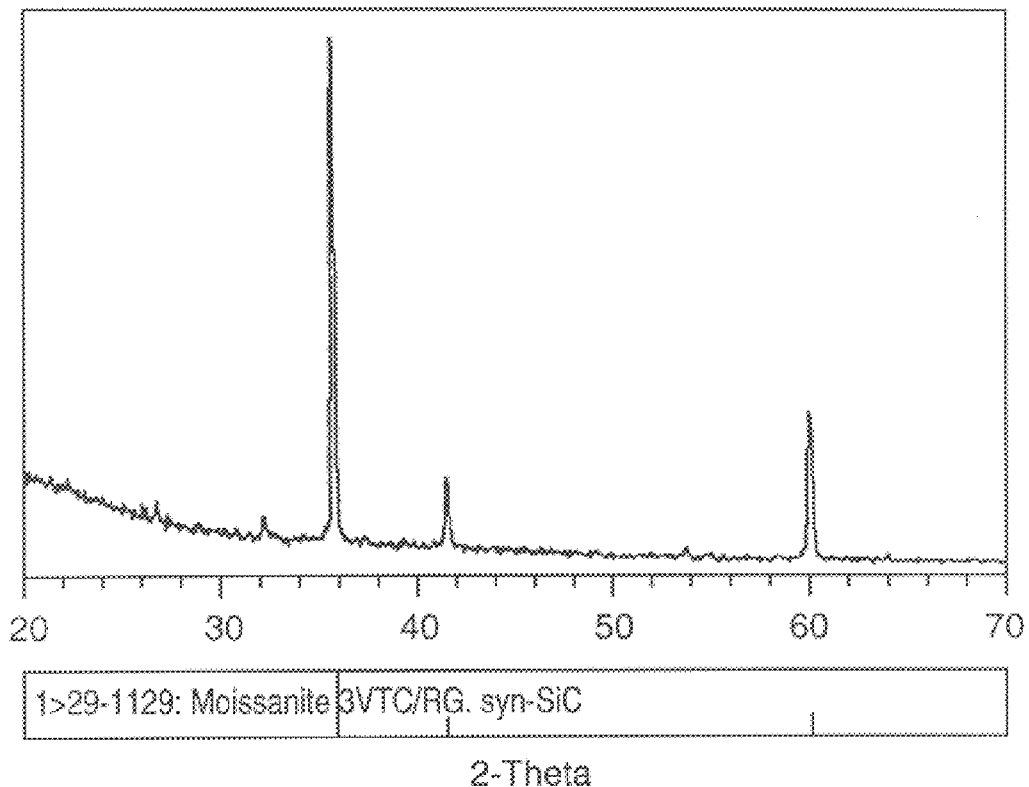
FIG. 40 is an X-ray diffraction plot showing silicon carbide peaks for carbonized wood samples which have been further treated with silicon.
Figure 41:
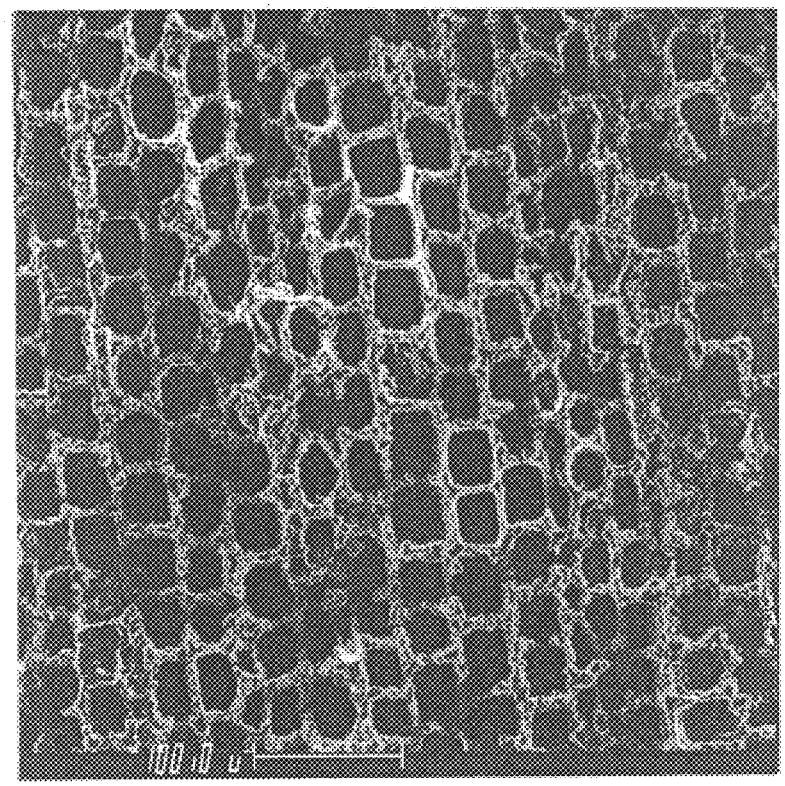
FIG. 41 is a photomicrograph showing the structure of a porous ceramic material derived from wood in accordance with an embodiment of the present invention.
Figure 42:
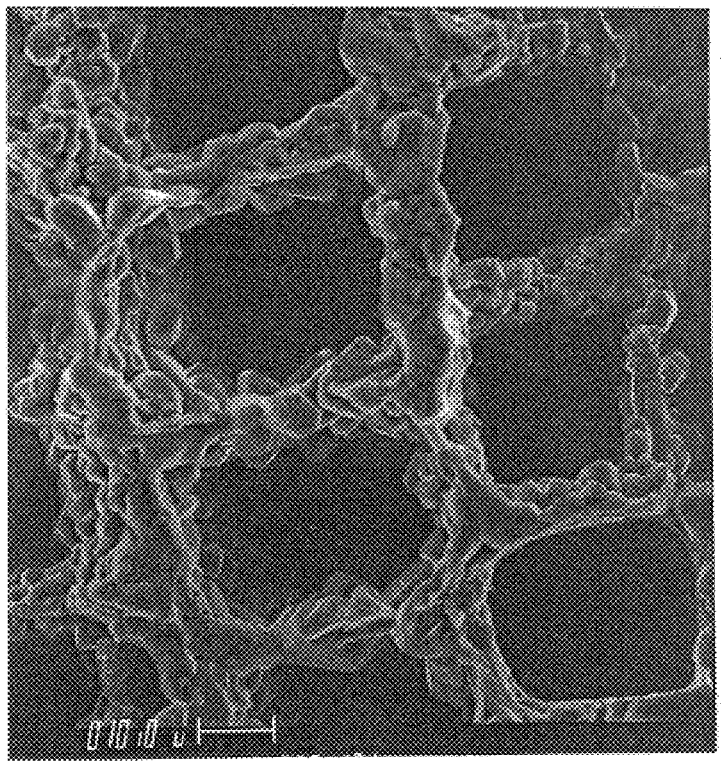
FIG. 42 is a photomicrograph showing the structure of a porous ceramic material derived from wood in accordance with an embodiment of the present invention.

An interior portion of the piece was scanned by XRD. The result, shown in FIG. 40, indicated only peaks for SiC. Another portion of the specimen was then sectioned with a water cooled saw. Micrographs from SEM revealed that the walls of the precursor wood were converted to a microcrystalline SiC. Two images are shown in FIG. 41 and 42, which reveal the micro-honeycomb morphology in the earlywood region of the redwood derived SiC. The higher magnification in FIG. 42 reveals the crystallite morphology of the converted precursor cell walls.

Figure 43:
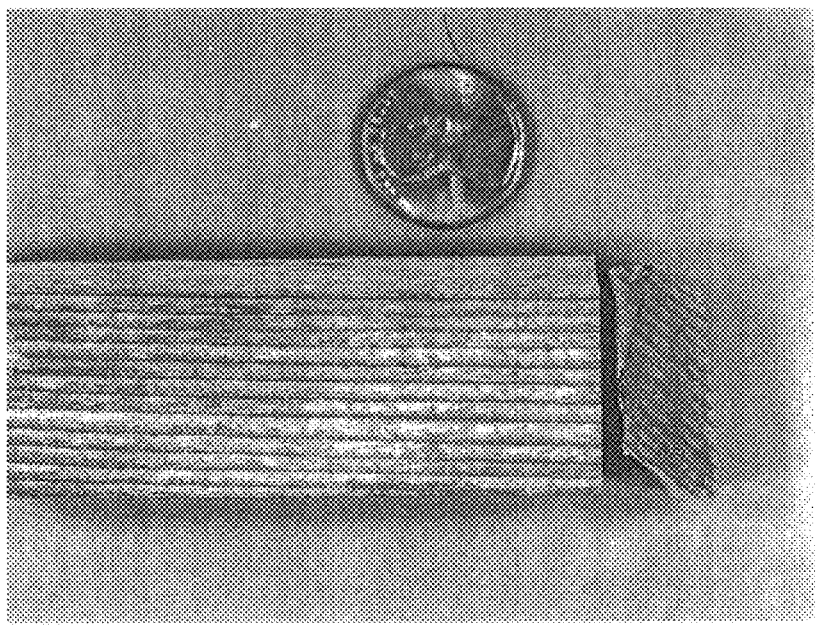
FIG. 43 is a photograph showing a piece of ceramic material derived from wood in accordance with an embodiment of the present invention.

A photograph of the specimen is shown in FIG. 43. The sectioned end reveals the darker latewood regions which were much denser. The latewood layers gave the specimen enough strength to allow for cutting and handling.

Figure 44:
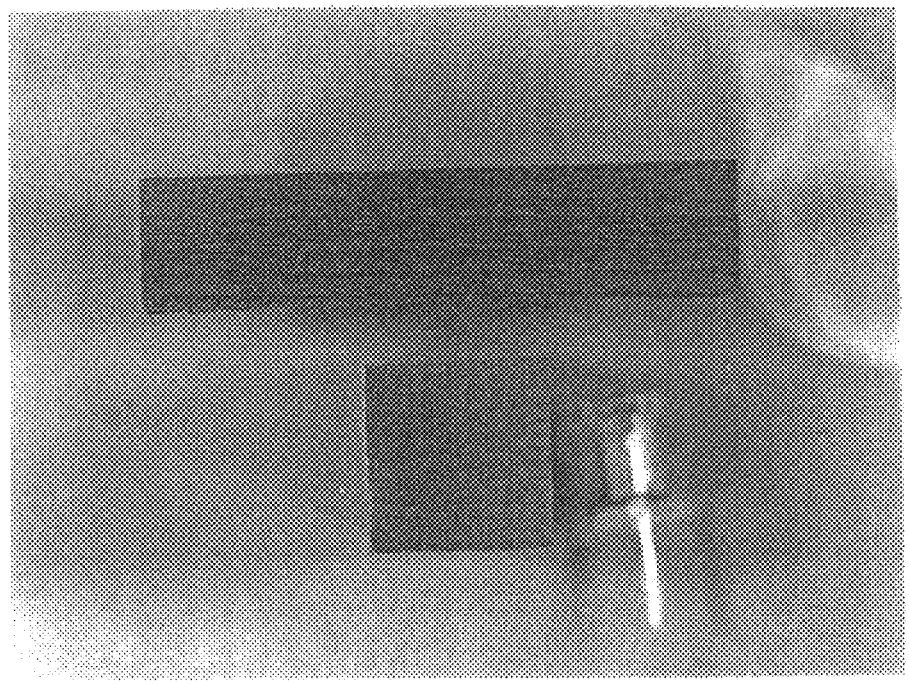
FIG. 44 is a photograph of a ceramic-metal composite material produced in accordance with an embodiment of the present invention.
Figure 45:
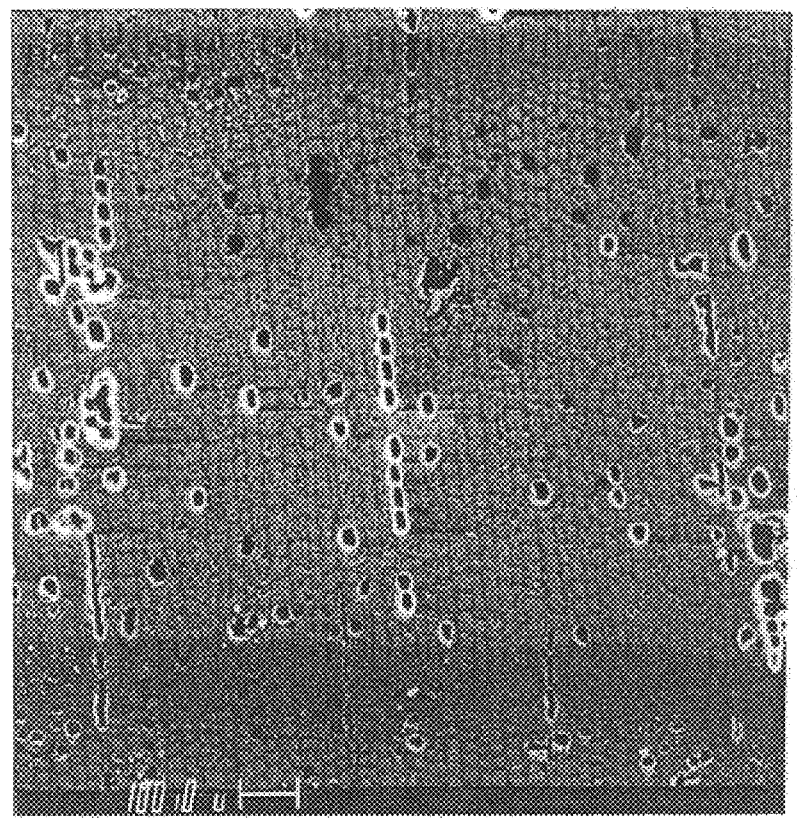
FIG. 45 is a photomicrograph of a ceramic—ceramic composite produced in accordance with an embodiment of the present invention.

Additional examples using the recessed furnace boat to hold molten Si were successfully performed. Specimens of similar size as the boards previously described, but with half the width, were converted to SiC. Residual Si was required for full conversion of the specimens. Several carbonized wood species were converted. Also repeated was the conversion of carbonized wood specimens with nearly cubic dimensions. All specimens converted with liquid infiltration had some residual Si in pores which were not closed off. FIG. 44 is a photograph of two specimens converted to SiC. Each sample was derived from carbonized redwood and were nearly saturated with unconverted Si. Each maintained near-net shape when converted. An electron micrograph of a cut section of one specimen is shown in FIG. 45. Latewood regions appear as dark bands in the image. Earlywood regions appear as a SiC honeycomb with Si filled pores, some left unfilled.

Figure 46:
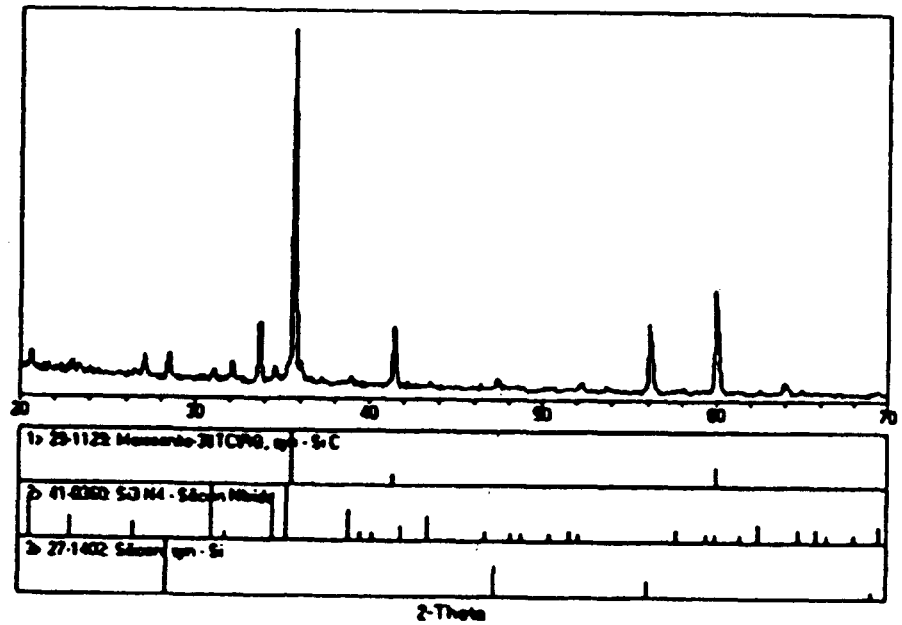
FIG. 46 is an X-ray diffraction plot for a silicon carbide sample derived from carbonized wood which has been further treated to convert residual silicon to silicon nitride.
Figure 47:
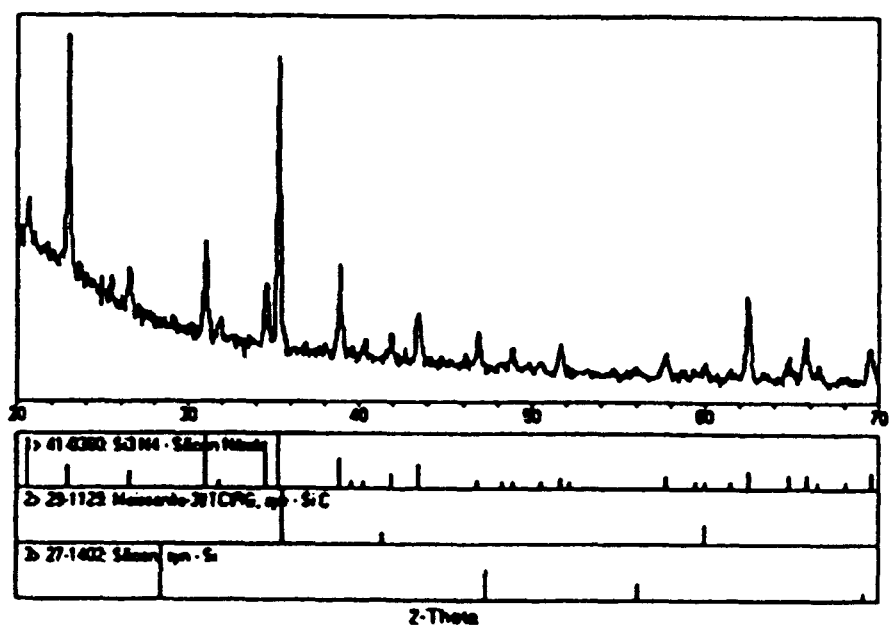
FIG. 47 is an X-ray diffraction plot for a silicon carbide sample derived from carbonized wood which has been further treated to convert residual silicon to silicon nitride.
Figure 48:
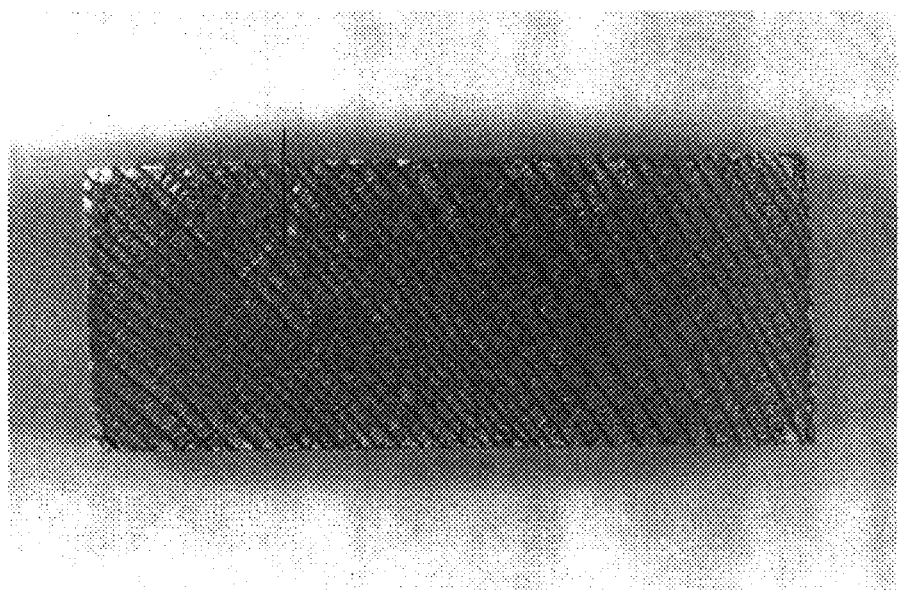
FIG. 48 is a photograph of a ceramic-containing composite produced in accordance with an embodiment of the present invention.

In a further study, a converted redwood specimen was placed on a flat graphite boat and heat treated in a nitrogen atmosphere. A furnace schedule of 240° C./hr to 1500° C., hold 4 hrs, cool 240° C./hr, and a nitrogen flow rate of 0.4 L/min were used. The specimen and boat were coated with a white/yellow-white film which in some places took the form of small whiskers. The film of whiskers was easily scraped off the sample and boat. The specimen and whiskers were separately investigated by XRD analysis. The specimen gave peaks for SiC, Si and $Si_3N_4$. The whiskers gave peaks for $Si_3N_4$ only. The diffraction patterns are presented in FIGS. 46 and 47. The specimen was scanned several times, including after removing a layer of the surface by abrasive paper. The strongest peaks in all scans of the specimen matched those for SiC and Si. But even after removal of the surface layer some silicon nitride was detected. This example demonstrated that the residual Si could be converted to form a ceramic/ceramic composite. A photograph of the specimen is shown in FIG. 48.

Further methods to develop a metal matrix composite from the carbonized wood are possible. For example, a mixture of powdered aluminum and silicon (90/10) may be placed on a specimen of porous SiC and heated. Other alloys can also be used to produce a more refractory metal matrix composite.

Figure 49:
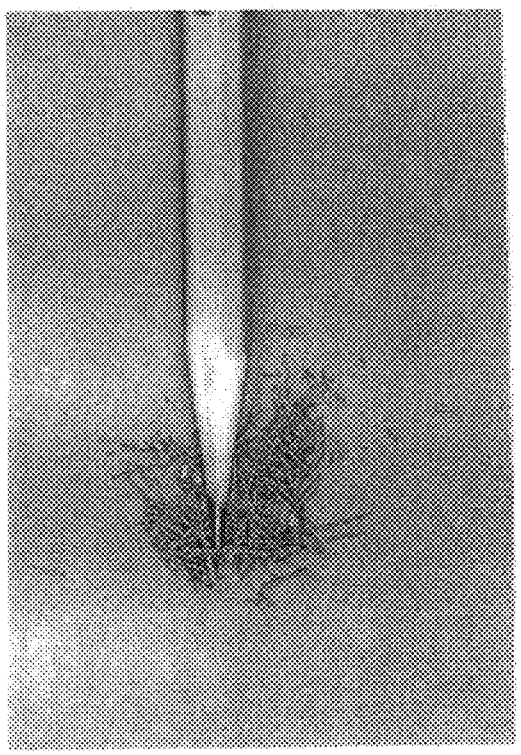
FIG. 49 is a photograph of silicon carbide fibers and a silicon carbide tube derived from bamboo.
Figure 49:
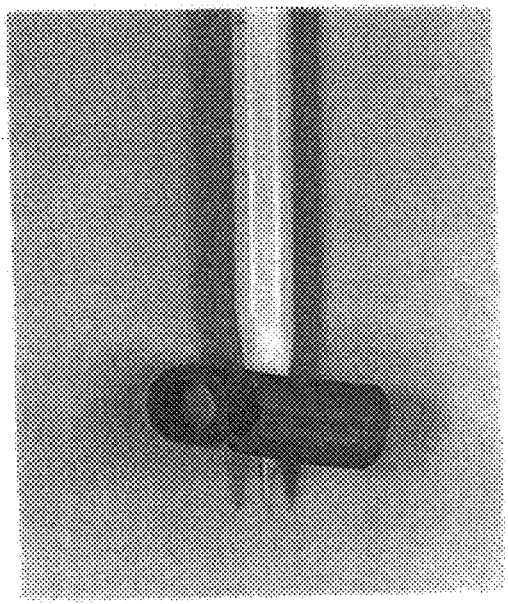

Additional examples were performed which produced more ceramic tubes from bamboo. One of those, in which residual Si was present, was packed in graphite flakes and heat treated to 1500° C. to draw out the Si. The specimen appeared dark gray on its surface but had a green interior. The specimen was fragile and was easily crushed to produce green SiC fibers. Fibers up to 4 cm long were produced by crushing the converted bamboo. These fibers were also fragile and easily broken. The experiment did serve to demonstrate that ceramic fibers can be produced from naturally fibrous plants. A photograph of the fibers and a specimen of SiC derived from bamboo are shown in FIG. 49.

In another conversion experiment, a sheet of carbonized manila paper was placed under a specimen. Liquid Si passed into the paper and converted it to ceramic. XRD analysis gave strong peaks for SiC. Small amounts of residual Si was also detected. Electron microscopy revealed the microcrystalline morphology of the converted cellulosic fibers. The converted paper was brittle but very rough. Given an appropriate backing it could be produced as abrasive or refractory coatings.

Figure 50:
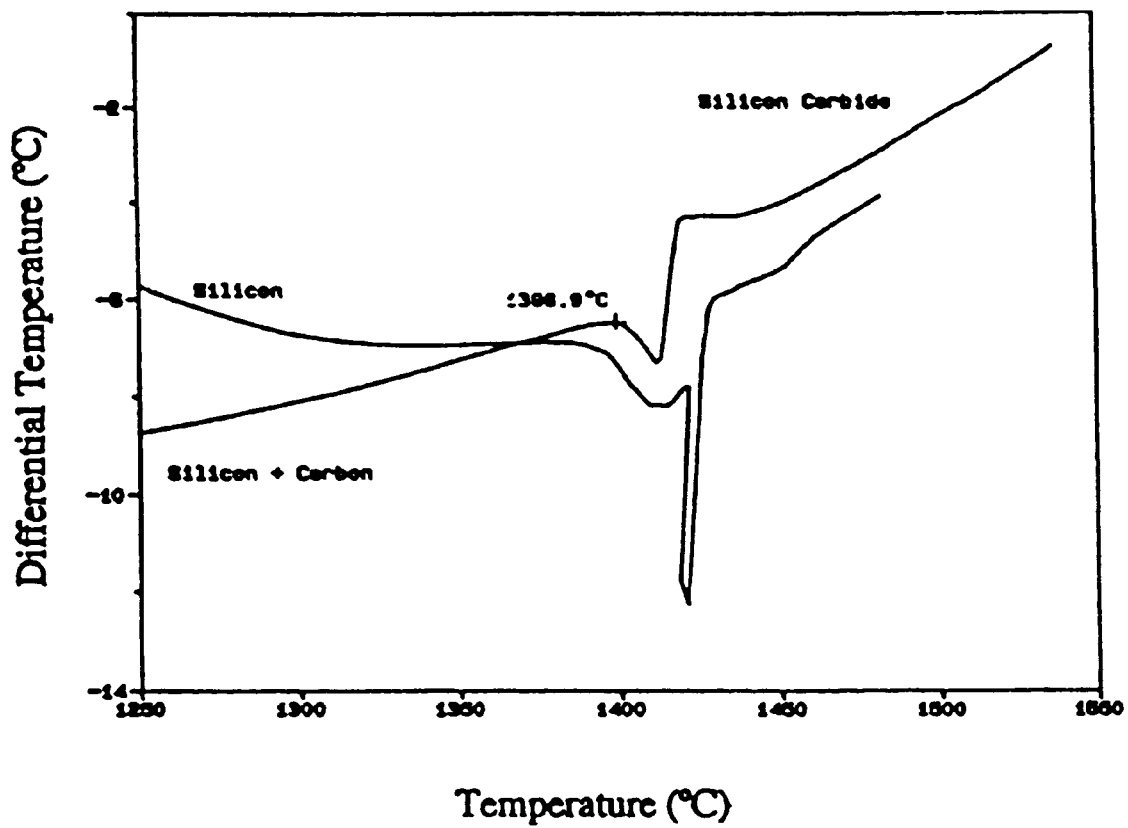
FIG. 50 is a graph of differential temperature versus temperature.

To investigate the SiC-forming reaction, thermal analysis (DTA/TGA) was performed. In one study, powdered Si was heated in an argon atmosphere to approximately 1500° C. Melting was indicated by an endotherm just above 1400° C. In a second study, a stoichiometric mixture of powdered carbon (from poplar) and Si was heated. The results from these are presented in FIG. 50. The exothermic reaction from conversion to SiC reduces the negative temperature differential found in the first experiment with Si only. The bi-modal endotherm of the Si was likely the result of the powder bonding to itself before completely melting. Once molten, increased thermal contact to the sample cup produced a rapid and sharp reduction in measured temperature. XRD analysis of reaction product showed peaks for SiC and residual Si. The residual Si was also detected during DTA cooling as a exotherm from solidification.

Thermal analysis indicated that the reaction of Si and C to form SiC occurs rapidly when the Si begins to melt. Therefore, when infiltrating porous carbonized wood, the pore size and volume fraction must be chosen carefully to avoid choking off when this processing approach is used. This is possible to accomplish by choosing a precursor wood species having anatomical features which meet these criteria.

Other carbide ceramics can be manufactured using carbonized lignocellulosics as precursors. Boric acid (granular) placed on carbonized wood and heat treated to 1500° C. in an argon atmosphere produced boron carbide ($B_4C$). Other processing approaches can be taken to produce carbides. The sol-gel method has the advantage of being composed of nano-sized particles which can be forced into carbonized wood specimens. Colloidal solutions with varying concentrations can be used to adjust the amount of precursor left inside the naturally porous material. Gas phase infiltration can also be used to convert the porous carbonized wood to ceramic.

The current technology for the production of high performance ceramics involves the preparation of high purity, submicron powders that require special handling and highly controlled consolidation followed by a high temperature sintering step. In addition, expensive machining and finishing operations are often needed to obtain the specified dimensions of the final component.

The processing method of the present invention demonstrates the potential for producing advanced ceramics of net shape using wood and other naturally fibrous plants as precursors. Three fundamental aspects of this approach give it the potential for significantly reducing processing costs. Inexpensive precursors are used. The need for special handling and sintering of powders is eliminated. Net shape processing of the carbonized wood eliminates the need for machining of a hard ceramic.

In accordance with this embodiment, ceramic which retains the cellular features of the precursor wood may be produced. A SiC micro-honeycomb ceramic, for example, may be produced which has potential applications for high temperature filters or as a catalyst support. These ceramic materials may also be suitable for high temperature structural applications.

Paper and fabrics of natural fibers offer design flexibility when producing materials using the method of carbonization of the present invention. Carbonized lignocellulosics retain all of the anatomical features of the precursors. In addition to the retention of features, carbonization of fabrics and papers allow for complex shapes to be produced with some preferred orientation of the natural fibers. Thus, if monolithic wood samples do not allow for enough design flexibility, the use of smaller portions of the plant formed into the desired shape can be used. To demonstrate this aspect of the invention, several experiments were performed.

Figure 51:
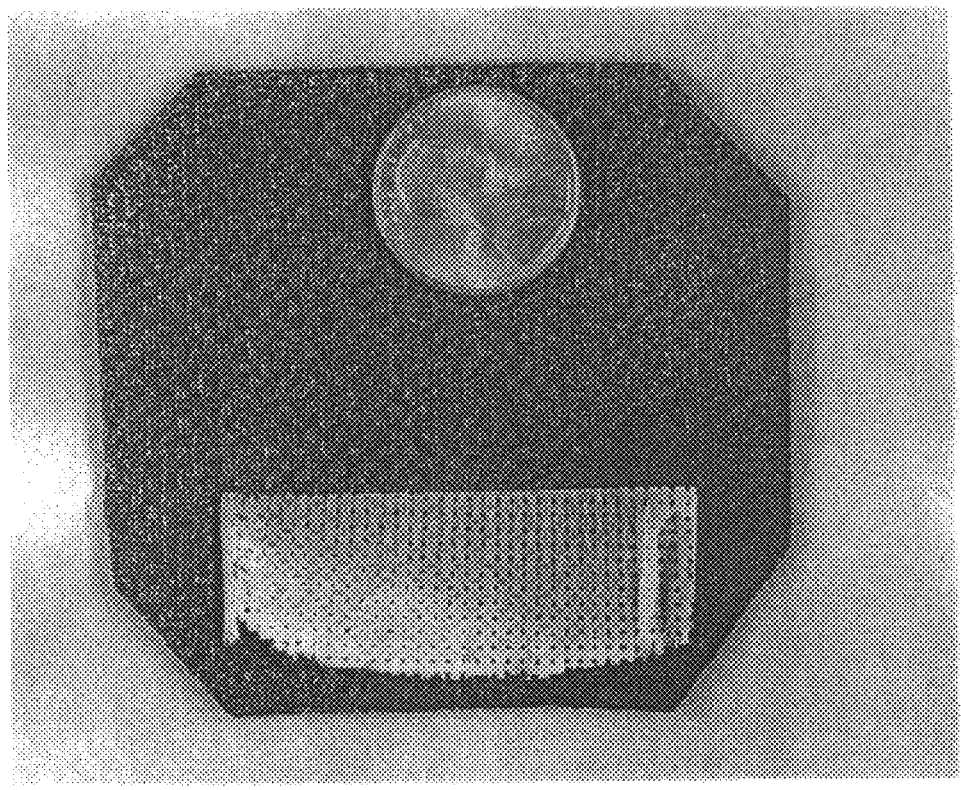
FIG. 51 is a photograph of carbonized fabric including a piece of fabric that has been converted to ceramic after carbonization in accordance with an embodiment of the present invention.

Several natural fiber fabrics were carbonized under controlled conditions to produce non-graphitic carbon fabrics. Cotton, muslin, linen, aida and rayon, with no coloring dyes, were all carbonized. In one experiment, carbonized specimens were soaked in a colloidal suspension of alumina (Nyacol AL-20). A vacuum assist was used to assure infiltration. The specimens were allowed to dry thoroughly for days. Then heat treatment in a nitrogen atmosphere to 1500° C. was performed. The specimens were white to gray-white, and intact. XRD analysis detected aluminum nitride (AlN) and some residual alumina ($Al_2O_3$). FIG. 51 is a photograph of converted aida cloth comprising aluminum nitride (light) overlying a piece of carbonized aida of coarser weave (dark). The solid carbon fabric acts as a carbon source for reduction of the oxide. When performed in a nitrogen atmosphere above 1400° C. the metal is less stable than the nitride. A similar example was performed by soaking the cellulosic cloths in the sol-gel, then carbonizing and converting in one process. Similar results were obtained.

Other examples using carbonized fabrics and silica sol-gel give results similar to those obtained using monolithic wood. Conversion products detected by XRD analysis are SiC and cristobalite. Other ceramics and carbides from carbonized fabrics and papers may also be produced in accordance with the present invention.

Another method of materials manufacture from carbonized lignocellulosics is the capability of using lower quality forest products such as wood chips and sawdust. These can easily be bound together by polymers, such as phenolics, to produce a precursor for carbonization. This enables design flexibility similar to that gained in using papers or fabrics, the difference being the size of the lignocellulosic starting material. Large pieces with relatively thick cross-sections may be produced using low cost precursors. Wafers of wood can be bound with a preferred orientation (as in glue-lam products) to produce a material with anisotropic properties. Anisotropic carbon-epoxy composites or ceramics may thus be produced.

Figure 52:
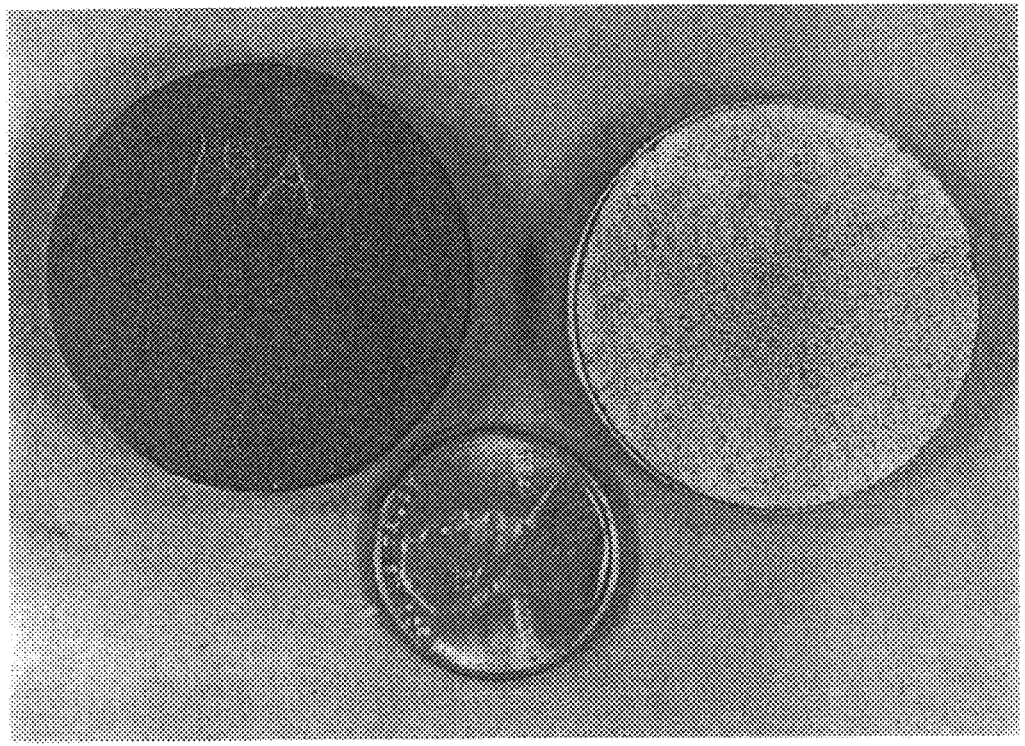
FIG. 52 is a photograph of carbonized wood samples derived from pressed wood including a sample that has been converted to ceramic after the carbonization step.
Figure 53:
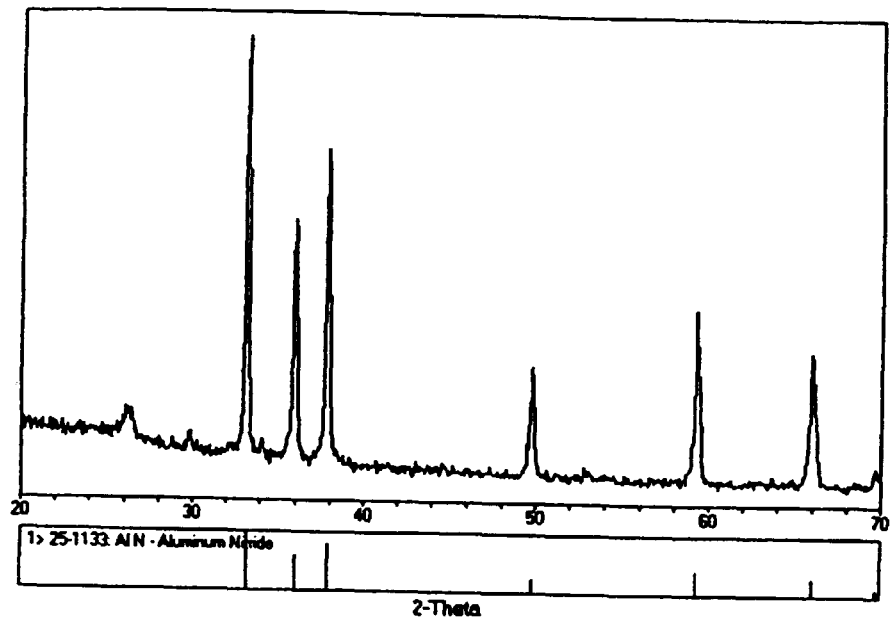
FIG. 53 is an X-ray diffraction plot of carbonized wood samples having silicon carbide peaks.

An example was performed to make monolithic AlN ceramics using wood sawdust as a precursor. A mixture of phenolic resin powder (Varcum 29217), mixed species wood sawdust and alumina powder was pressed into pellets. A series of tests indicated that 20 wt % phenolic provided adequate bonding of the mixture. The ratio of alumina to sawdust/phenolic mix was varied from a carbon-rich ratio, to a stoichiometric ratio, based on expected solid carbon yield of the organics and a one to one (C+O→CO) reduction ratio. Pellets were cured in a hot press at 180° C. for 4 minutes. Carbonization to 600° C. in a nitrogen atmosphere produced pellets which retained their shape. Further heat treatment for 4 hrs at 1550° C. in a nitrogen atmosphere was performed. The resulting pellets ranged in color from gray to white. The degree of whiteness decreased with increasing carbon to alumina ratio of precursor mix. A photograph of carbonized and converted pellets is shown in FIG. 52, with the carbonized sample on the left side and the AlN sample on the right side of the photograph. XRD scans of the converted pellets detected AlN. No residual alumina was found. Weak peaks at 26° 2-theta was detected in some of the specimens indicating the presence of some residual solid carbon. FIG. 53 is a typical diffraction pattern from the specimens produced. TGA experiments of the mix detected the weight loss associated with the oxide reduction at temperatures above 1400° C. No differential temperature was detected from the reaction. Furthermore, mixtures of sawdust, phenolic and Si may be converted to SiC. Carbon—carbon and carbon-polymer composites can also be produced by this processing method.

Additional processing was performed on plants naturally high in inorganics. The production of industrially important materials from such plants is one feature of the present invention.

Figure 54:
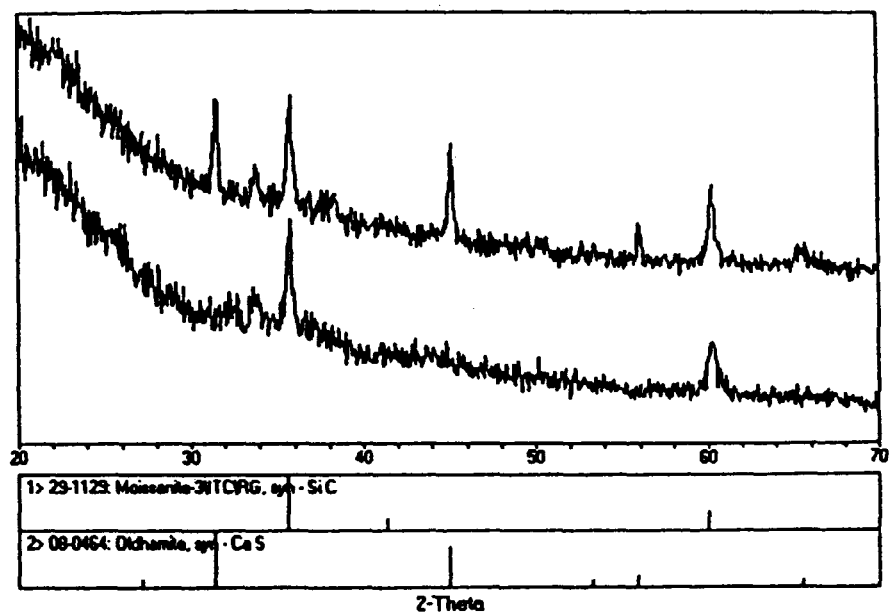
FIG. 54 is an X-ray diffraction plot of carbonized wood samples having silicon carbide peaks.

Two samples of scouring rush (Equisetum) were collected from different locations. This is a plant which contains high levels of inorganics, especially silica. Each were heat treated (separate experiments) in an argon atmosphere for 4 hrs at 1500° C. Crystal phase identification by XRD detected SiC in both samples. The results are presented in FIG. 54. One specimen gave peaks for SiC only. The other had additional peaks which match those in the ICDD PDF for Oldhamite, a compound of calcium and sulfur. The process demonstrates the capability to process plants which take up inorganics from the soil. It also demonstrates the capability of a single genus to extract different levels of inorganics depending upon growing conditions.

It is also possible to use plants to extract heavy metals and ions for bioremediation and then use them to manufacture a product using the carbonization process of the present invention. Whether the product is a raw material, or a ceramic monolith, would depend upon the composition of the particular plant.

While various aspects of the invention have been discussed above, it is to be understood that various modifications, adaptations and changes may be made without departing from the scope of the invention as set forth in the following claims.

What is claimed is:

1. A method of making a porous carbon article from wood, the method comprising:

providing a solid piece of wood having a cellular structure;

heating the piece of wood in a substantially non-oxidizing atmosphere to a temperature of at least about 300° C. at a sufficiently slow heat-up rate to carbonize the wood while substantially maintaining the cellular structure of the piece of wood; and cooling the carbonized wood.

2. The method of claim 1, wherein the piece of wood has a length of greater than about 1 inch.

3. The method of claim 2, where the piece of wood has a width of at least about 0.5 inch.

4. The method of claim 3, wherein the piece of wood has a height of at least about 0.1 inch.

5. The method of claim 3, wherein the piece of wood has a height of at least about 0.25 inch.

6. The method of claim 3, wherein the piece of wood has a height of at least about 0.5 inch.

7. The method of claim 1, wherein the piece of wood has longitudinal-radial, longitudinal-tangential and radial-tangential planes, and extends at least about 0.5 inch in at least two of the planes.

8. The method of claim 7, wherein the piece of wood extends at least about 0.5 inch in each of the planes.

9. The method of claim 1, further comprising cutting the piece of wood to shape prior to heating.

10. The method of claim 1, wherein the piece of wood is heated in an inert atmosphere.

11. The method of claim 10, wherein the inert atmosphere comprises nitrogen.

12. The method of claim 1, wherein the piece of wood is heated at substantially atmospheric pressure.

13. The method of claim 1, wherein the piece of wood is heated to a temperature of less than about 1500° C.

14. The method of claim 1, wherein the piece of wood is heated to a temperature of from about 400 to about 1000° C.

15. The method of claim 1, wherein the piece of wood is heated to a temperature of from about 500 to about 700° C.

16. The method of claim 1, wherein the piece of wood is heated to a temperature of at least about 400° C. at a heat-up rate of less than about 20° C./hour between the temperatures of about 200 and about 400° C.

17. The method of claim 16, wherein the heat-up rate is from about 1 to about 10° C./hour.

18. The method of claim 17, wherein the piece of wood is heated to a maximum temperature of from about 500 to about 1000° C.

19. The method of claim 18, wherein the piece of wood is heated at a rate of less than about 20° C./hour between the temperature of about 400° C. and the maximum temperature.

20. The method of claim 16, wherein the heat-up rate is from about 2 to about 5° C./hour.

21. The method of claim 16, wherein the piece of wood is heated to an initial temperature of from about 50 to about 100° C. for at least about 0.5 hour to dry the wood prior to heating to the temperature of at least about 400° C.

22. The method of claim 1, wherein the carbonized wood comprises graphite.

23. The method of claim 22, wherein the carbonized wood is converted to graphite by heating to a temperature of at least about 2000° C.

24. The method of claim 22, wherein the piece of wood comprises at least one graphitization catalyst, and the carbonized wood is converted to graphite by heating to a temperature of less than about 2000° C.

25. The method of claim 24, wherein the graphitization catalyst comprises at least one element selected from the group consisting of Cr, Cu, Ni, B, Ti, Zr and Fe.

26. The method of claim 25, wherein the piece of wood is treated with a wood preservative comprising at least one of the elements of the graphitization catalyst prior to the heating of the piece of wood.

27. The method of claim 26, wherein the wood preservative comprises copper chrome arsenate.

28. The method of claim 1, wherein the heating of the piece of wood causes it to shrink from about 20 to about 25 percent in an axial direction upon carbonization.

29. The method of claim 28, wherein the heating of the piece of wood causes it to shrink from about 20 to about 35 percent in a radial direction and from about 20 to about 40 percent in a tangential direction upon carbonization.

30. The method of claim 1, wherein the carbonized wood is cooled at a rate of less than about 100° C./hour.

31. The method of claim 1, wherein the carbonized wood is cooled at a rate of greater than about 100° C./hour.

32. The method of claim 1, further comprising shaping the carbonized wood after cooling.

33. The method of claim 32, wherein the carbonized wood is shaped by cutting.

34. The method of claim 33, wherein the cutting comprises a process selected from the group consisting of sawing, drilling, routing, milling, turning, grinding and sanding.

35. The method of claim 1, further comprising at least partially filling pores of the carbonized wood with a metal.

36. The method of claim 1, further comprising at least partially filling pores of the carbonized wood with a polymer.

37. The method of claim 36, further comprising at least partially converting the polymer to carbon.

38. The method of claim 37, wherein the polymer comprises a phenolic resin.

39. The method of claim 1, further comprising at least partially converting the carbonized wood to a ceramic.

40. The method of claim 39, wherein the ceramic comprises silicon carbide.

41. The method of claim 39, further comprising at least partially filling pores of the ceramic with a metal.

42. The method of claim 39, further comprising at least partially filling pores of the ceramic with a ceramic.

43. A method of making a carbon-polymer composite comprising:

providing a solid piece of wood having a cellular structure;

heating the piece of wood in a substantially non-oxidizing atmosphere to a temperature of at least about 300° C. at a sufficiently slow heat-up rate to carbonize the wood while substantially maintaining the cellular structure of the piece of wood;

cooling the carbonized wood; and at least partially filling pores of the carbonized wood with a polymer.

44. The method of claim 43, wherein the pores are at least partially filled with the polymer by infiltrating the pores with a polymeric fluid and curing the fluid.

45. The method of claim 43, wherein the polymer is selected from the group consisting of epoxies, phenolics and pitch.

46. A method of making a carbon-metal composite comprising:

providing a solid piece of wood having a cellular structure;

heating the piece of wood in a substantially non-oxidizing atmosphere to a sufficient temperature at a sufficiently slow heat-up rate to carbonize the wood while substantially maintaining the cellular structure of the piece of wood; and at least partially filling pores of the carbonized wood with metal.

47. A method of making a carbon—carbon composite comprising:

providing a solid piece of wood having a cellular structure;

heating the piece of wood in a substantially non-oxidizing atmosphere to a sufficient temperature at a sufficiently slow heat-up rate to carbonize the wood while substantially maintaining the cellular structure of the piece of wood;

cooling the carbonized wood;

at least partially infiltrating pores of the carbonized wood with a carbon-forming material; and converting at least part of the carbon-forming material to carbon.

48. The method of claim 47, wherein the carbon-forming material comprises a phenolic resin which is at least partially converted to carbon by heating.

49. A method of forming a ceramic-containing material comprising:

providing a solid piece of wood having a cellular structure;

heating the piece of wood in a substantially non-oxidizing atmosphere to a sufficient temperature at a sufficiently slow heat-up rate to carbonize the wood while substantially maintaining the cellular structure of the piece of wood;

cooling the carbonized wood; and converting at least part of the carbonized wood to a ceramic by reacting the carbon with a carbide forming metal.

50. The method of claim 49, wherein at least part of the carbonized wood is converted to silicon carbide by reacting the carbon with silicon.

51. The method of claim 50, wherein residual silicon is left in pores of the silicon carbide and at least part of the residual silicon is converted to silicon nitride by reacting the residual silicon with nitrogen.

52. A method of making a ceramic-metal composite comprising:

providing a solid piece of wood having a cellular structure;

heating the piece of wood in a substantially non-oxidizing atmosphere to a sufficient temperature at a sufficiently slow heat-up rate to carbonize the wood while substantially maintaining the cellular structure of the piece of wood;

cooling the carbonized wood;

converting at least part of the carbonized wood to ceramic by reacting the carbon with a carbide forming metal; and at least partially filling pores of the ceramic with metal.

53. A method of making a ceramic—ceramic composite comprising:

providing a solid piece of wood having a cellular structure;

heating the piece of wood in a substantially non-oxidizing atmosphere to a sufficient temperature at a sufficiently slow heat-up rate to carbonize the wood while substantially maintaining the cellular structure of the piece of wood;

cooling the carbonized wood;

converting at least part of the carbonized wood to a first ceramic by reacting the carbon with a carbide forming metal; and at least partially filling pores of the ceramic with a second ceramic.

54. The method of claim 53, wherein the first ceramic is of different composition from the second ceramic.

55. The method of claim 46, wherein the piece of wood is heated to a temperature of at least about 300° C.

56. The method of claim 47, wherein the piece of wood is heated to a temperature of at least about 300° C.

57. The method of claim 49, wherein the piece of wood is heated to a temperature of at least about 300° C.

58. The method of claim 52, wherein the piece of wood is heated to a temperature of at least about 300° C.

59. The method of claim 53, wherein the piece of wood is heated to a temperature of at least about 300° C.

* * * * *